US011760911B2

(12) United States Patent
Low

(10) Patent No.: US 11,760,911 B2
(45) Date of Patent: *Sep. 19, 2023

(54) HEAT TRANSFER COMPOSITIONS

(71) Applicant: Mexichem Amanco Holding S.A. de C.V., Tlalnepantla (MX)

(72) Inventor: Robert E. Low, Cheshire (GB)

(73) Assignee: MEXICHEM AMANCO HOLDING S.A. DE C.V., Tlalnepantla (MX)

( * ) Notice: Subject to any disclaimer, the term of this patent is extended or adjusted under 35 U.S.C. 154(b) by 0 days.

This patent is subject to a terminal disclaimer.

(21) Appl. No.: 17/094,434

(22) Filed: Nov. 10, 2020

(65) Prior Publication Data

US 2021/0198548 A1    Jul. 1, 2021

Related U.S. Application Data

(63) Continuation of application No. 16/391,554, filed on Apr. 23, 2019, now Pat. No. 10,844,260, which is a continuation of application No. 14/851,030, filed on Sep. 11, 2015, now Pat. No. 10,266,736, which is a continuation of application No. 13/701,328, filed as application No. PCT/GB2011/000952 on Jun. 24, 2011, now abandoned.

(30) Foreign Application Priority Data

Jun. 25, 2010  (GB) ..................... 1010712

(51) Int. Cl.
| | |
|---|---|
| *C09K 5/04* | (2006.01) |
| *C08J 9/14* | (2006.01) |
| *C09K 3/30* | (2006.01) |
| *C11D 7/50* | (2006.01) |
| *F03C 99/00* | (2010.01) |
| *B01D 11/02* | (2006.01) |
| *B01D 11/04* | (2006.01) |
| *G06Q 30/018* | (2023.01) |

(52) U.S. Cl.
CPC .......... *C09K 5/045* (2013.01); *B01D 11/0288* (2013.01); *B01D 11/0492* (2013.01); *C08J 9/146* (2013.01); *C08J 9/149* (2013.01); *C09K 3/30* (2013.01); *C11D 7/5018* (2013.01); *F03C 99/00* (2013.01); *G06Q 30/018* (2013.01); *C08J 2203/14* (2013.01); *C08J 2203/142* (2013.01); *C08J 2203/16* (2013.01); *C08J 2203/162* (2013.01); *C08J 2203/202* (2013.01); *C08J 2325/06* (2013.01); *C08J 2363/00* (2013.01); *C08J 2375/04* (2013.01); *C09K 2205/12* (2013.01); *C09K 2205/122* (2013.01); *C09K 2205/126* (2013.01); *C09K 2205/22* (2013.01); *Y02A 40/963* (2018.01); *Y10T 29/49716* (2015.01)

(58) Field of Classification Search
CPC .............. C09K 5/045; C09K 2205/126; C09K 2205/22; C09K 3/30; C09K 2205/12; C09K 2205/122; C09K 5/04; B01D 11/0288; B01D 11/0492; C08J 9/146; C08J 9/149; C08J 2203/14; C08J 2203/142; C08J 2203/16; C08J 2203/162; C08J 2203/202; C08J 2325/06; C08J 2363/00; C08J 2375/04; C08J 9/14; F03C 99/00; G06Q 30/018; Y02A 40/963; Y10T 29/49716; C11D 7/50
USPC ........................................................ 252/67
See application file for complete search history.

(56) References Cited

U.S. PATENT DOCUMENTS

| | | | |
|---|---|---|---|
| 2,012,255 | A | 8/1935 | Binnall |
| 2,013,145 | A | 9/1935 | Goetz |
| 3,723,318 | A | 3/1973 | Butler |
| 3,884,828 | A | 5/1975 | Butler |
| 5,053,155 | A | 10/1991 | Mahler |
| 5,616,275 | A | 4/1997 | Chisolm et al. |
| 5,714,083 | A | 2/1998 | Turner |
| 5,788,886 | A | 8/1998 | Minor et al. |
| 6,258,292 | B1 | 7/2001 | Turner |
| 6,374,629 | B1 | 4/2002 | Oberle et al. |
| 6,426,019 | B1 | 7/2002 | Acharya et al. |
| 6,881,354 | B2 | 4/2005 | Aman et al. |
| 7,238,299 | B2 | 7/2007 | Singh et al. |
| 7,569,170 | B2 | 8/2009 | Minor |
| 7,629,306 | B2 | 12/2009 | Shankland et al. |

(Continued)

FOREIGN PATENT DOCUMENTS

| | | |
|---|---|---|
| CA | 668494 | 8/1963 |
| CN | 1183451 | 10/1995 |

(Continued)

OTHER PUBLICATIONS

Althouse et al.; Modern refrigeration and Air Conditioning, 1968, pp. 999, 1002-1003.

(Continued)

*Primary Examiner* — Douglas J McGinty
(74) *Attorney, Agent, or Firm* — Crowell & Moring LLP

(57) ABSTRACT

A heat transfer composition includes:
(i) trans-1,3,3,3-tetrafluoropropene (R-1234ze(E));
(ii) a second component selected from difluoromethane (R-32), propene (R-1270), propane (R290) and mixtures thereof;
(iii) a third component selected from pentafluoroethane (R-125), 1,1,1,2-tetrafluoroethane (R-34a), and mixtures thereof; and optionally
(iv) a fourth component selected from fluoroethane (R-161), 1,1-difluoroethane (R-152a) and mixtures thereof.

19 Claims, No Drawings

(56) References Cited

U.S. PATENT DOCUMENTS

| | | |
|---|---|---|
| 7,807,074 B2 | 10/2010 | Luly et al. |
| 7,829,748 B1 | 11/2010 | Tung et al. |
| 7,846,355 B2 | 12/2010 | Nappa et al. |
| 7,862,740 B2 | 1/2011 | Minor et al. |
| 7,862,741 B2 | 1/2011 | Minor et al. |
| 7,862,742 B2 | 1/2011 | Minor et al. |
| 7,879,253 B2 | 2/2011 | Minor et al. |
| 7,906,037 B2 | 3/2011 | Minor et al. |
| 7,914,696 B2 | 3/2011 | Low et al. |
| 7,959,825 B2 | 6/2011 | Minor et al. |
| 8,333,901 B2 | 12/2012 | Low |
| 8,512,591 B2 | 8/2013 | Low |
| 8,628,681 B2 | 1/2014 | Low |
| 10,266,736 B2 | 4/2019 | Low |
| 10,844,260 B2 * | 11/2020 | Low ........................ C08J 9/146 |
| 2002/0046568 A1 | 4/2002 | Thomas et al. |
| 2003/0042463 A1 | 3/2003 | Arman et al. |
| 2004/0119047 A1 | 6/2004 | Singh et al. |
| 2004/0127383 A1 | 7/2004 | Pham et al. |
| 2004/0256594 A1 | 12/2004 | Singh et al. |
| 2005/0233923 A1 | 10/2005 | Singh et al. |
| 2005/0233932 A1 | 10/2005 | Singh et al. |
| 2005/0245421 A1 | 11/2005 | Singh et al. |
| 2005/0247905 A1 | 11/2005 | Singh et al. |
| 2006/0043331 A1 | 3/2006 | Shankland et al. |
| 2006/0243944 A1 | 11/2006 | Minor et al. |
| 2006/0243945 A1 | 11/2006 | Minor et al. |
| 2007/0007488 A1 | 1/2007 | Singh et al. |
| 2007/0010592 A1 | 1/2007 | Bowman et al. |
| 2007/0069175 A1 | 3/2007 | Thomas et al. |
| 2007/0108403 A1 | 5/2007 | Sievert et al. |
| 2007/0210275 A1 | 9/2007 | Luly et al. |
| 2007/0210276 A1 | 9/2007 | Luly et al. |
| 2008/0069177 A1 | 3/2008 | Minor et al. |
| 2008/0099190 A1 | 5/2008 | Singh et al. |
| 2008/0121837 A1 | 5/2008 | Singh et al. |
| 2008/0171652 A1 | 7/2008 | Singh et al. |
| 2008/0230738 A1 | 9/2008 | Minor et al. |
| 2008/0308763 A1 | 12/2008 | Singh et al. |
| 2008/0314073 A1 | 12/2008 | Minor |
| 2009/0120619 A1 | 5/2009 | Sievert et al. |
| 2009/0249809 A1 | 10/2009 | Minor et al. |
| 2009/0250650 A1 | 10/2009 | Minor et al. |
| 2009/0253820 A1 | 10/2009 | Bowman et al. |
| 2009/0255285 A1 | 10/2009 | Minor et al. |
| 2009/0272931 A1 | 11/2009 | Minor et al. |
| 2009/0277194 A1 | 11/2009 | Minor et al. |
| 2009/0278072 A1 | 11/2009 | Minor et al. |
| 2009/0278076 A1 | 11/2009 | Singh et al. |
| 2009/0285764 A1 | 11/2009 | Singh et al. |
| 2009/0302285 A1 | 12/2009 | Singh et al. |
| 2010/0025619 A1 | 2/2010 | Riva et al. |
| 2010/0044619 A1 | 2/2010 | Hulse et al. |
| 2010/0075046 A1 | 3/2010 | Hakamada et al. |
| 2010/0122545 A1 | 5/2010 | Minor et al. |
| 2010/0127209 A1 | 5/2010 | Singh et al. |
| 2010/0200798 A1 | 8/2010 | Rao et al. |
| 2011/0162410 A1 | 7/2011 | Low |
| 2011/0173997 A1 | 7/2011 | Low et al. |
| 2011/0258146 A1 | 10/2011 | Low |
| 2011/0260095 A1 | 10/2011 | Low |
| 2012/0096877 A1 | 4/2012 | Yana Motta et al. |
| 2012/0101177 A1 | 4/2012 | Van Horn et al. |
| 2012/0126187 A1 | 5/2012 | Low |
| 2012/0168663 A1 | 7/2012 | Singh et al. |
| 2012/0255316 A1 * | 10/2012 | Andre .................... C09K 5/044 62/271 |
| 2013/0096218 A1 | 4/2013 | Rached et al. |

FOREIGN PATENT DOCUMENTS

| | | |
|---|---|---|
| CN | 101864276 | 10/2010 |
| DE | 4116274 | 11/1992 |
| DE | 202007008291 | 11/2007 |
| EP | 0398147 | 11/1990 |
| EP | 0582451 | 2/1994 |
| EP | 0772659 | 9/2001 |
| EP | 1167894 | 1/2002 |
| EP | 1832639 | 9/2007 |
| EP | 1832640 | 9/2007 |
| EP | 1985680 | 10/2008 |
| EP | 2036943 | 3/2009 |
| EP | 2085422 | 8/2009 |
| EP | 1716216 | 11/2009 |
| EP | 2149592 | 2/2010 |
| EP | 2246649 | 11/2010 |
| EP | 2249104 | 11/2010 |
| EP | 2308941 | 4/2011 |
| GB | 950876 | 2/1964 |
| GB | 2435747 | 9/2007 |
| GB | 2440258 | 1/2008 |
| GB | 2481443 A * | 12/2011 ......... B01D 11/0288 |
| JP | H 04110388 | 4/1992 |
| JP | 2003/076747 | 3/2003 |
| RU | 2073058 | 2/1997 |
| WO | WO 1996/03473 | 2/1996 |
| WO | WO 1998/050331 | 11/1998 |
| WO | WO 2004/037752 | 5/2004 |
| WO | WO 2004/037913 | 5/2004 |
| WO | WO 2005/042663 | 5/2005 |
| WO | WO 2005/103190 | 11/2005 |
| WO | WO 2005/103191 | 11/2005 |
| WO | WO 2005/103192 | 11/2005 |
| WO | WO 2005/105947 | 11/2005 |
| WO | WO 2005/108522 | 11/2005 |
| WO | WO 2005/108523 | 11/2005 |
| WO | WO 2006/094303 | 9/2006 |
| WO | WO 2007/002625 | 1/2007 |
| WO | WO 2007/035697 | 3/2007 |
| WO | WO 2007/053697 | 5/2007 |
| WO | WO 2007/109748 | 9/2007 |
| WO | WO 2008/009928 | 1/2008 |
| WO | WO 2008/027555 | 3/2008 |
| WO | WO 2008/065011 | 6/2008 |
| WO | WO 2008/065331 | 6/2008 |
| WO | WO 2008/076272 | 6/2008 |
| WO | WO 2008/105366 | 9/2008 |
| WO | WO 2008/121776 | 10/2008 |
| WO | WO 2008/121783 | 10/2008 |
| WO | WO 2008/121785 | 10/2008 |
| WO | WO 2008/140809 | 11/2008 |
| WO | WO 2009/047535 | 4/2009 |
| WO | WO 2009/047542 | 4/2009 |
| WO | WO 2009/134957 | 11/2009 |
| WO | WO 2009/151669 | 12/2009 |
| WO | WO 2010/000993 | 1/2010 |
| WO | WO 2010/000994 | 1/2010 |
| WO | WO 2010/000995 | 1/2010 |
| WO | WO 2010/002013 | 1/2010 |
| WO | WO 2010/002020 | 1/2010 |
| WO | WO 2010/002023 | 1/2010 |
| WO | WO 2010/056695 | 5/2010 |
| WO | WO 2010/059677 | 5/2010 |
| WO | WO 2010/064005 A1 | 6/2010 |
| WO | WO 2010/075046 | 7/2010 |
| WO | WO 2010/088320 | 8/2010 |
| WO | WO 2010/119265 | 10/2010 |
| WO | WO 2010/129461 | 11/2010 |
| WO | WO 2010/129920 | 11/2010 |
| WO | WO 2011/073934 | 6/2011 |
| WO | WO 2011/161419 | 12/2011 |
| WO | WO 2011/163117 | 12/2011 |

OTHER PUBLICATIONS

ASHRAE Handbook (2001 Fundamentals Volume), Section 2 (Jacobi, A.M.) pp. 2.1-2.14.
ASHRAE Standard 34—Appendices, 2004.
ASHRAE Standard 34, 1997, p. 12.
ASHRAE Standard 34, 2004.
ASHRAE Standard 34-2007 Designation and Safety Classification of Refrigerants.

(56) References Cited

OTHER PUBLICATIONS

ASTM Standard E-681, May 14, 2012.
Barrault et al., Analysis of the economic and environmental consequences of a phase out of considerable reduction leakage . . . , EU Commission Final Report, Feb. 2003.
Beyerleim et al., "Properties of novel fluorinated compounds . . . ", Fluid Phase Equilibria, 1998, 150-151, 287-296.
Brown, HFOs New, Low Globabl Warming potential Refrigerants, ASHRAE Journal, Aug. 2009.
Chen et al., "Gaseous PVT properties of ethyl fluoride", Fluid Phase Equilibria, 2005, 237, 111-116.
Downing, Fluorocarbon Refrigerants Handbook, 1988, Prentice-Hall, pp. 21-22 and pp. 371-372.
Han et al., "Isothermal vapour-liquid equilibrium . . . ", J.Chem. Eng.Data, 2006, 51, 1232-1235.
Ho et al., Measurement of Vapor-Liquid Equilibria for the Binary Mixture Difluoromethane (HFC-32) + Propylene (R-1270), J. Chem. Eng. Data 2005, 50, 419-424.
http://en.wikipedia.org/wiki/Total_Equivalent warming impact, Nov. 29, 2011.
Kleiber, Vapor-liquid equilibria of binary refrigerant mixtures containing propylene or R134a, Fluid Phase Equilib., 1994 pp. 149-194.
Kondo et al. "Flammability limits of multi-fluorinated compounds", Fire Safety Journal, 2006, 41, 46-56.
Kondo et al., "Flammability limits of olefinic and saturated fluoricompounds", Journal of Hazardous Materials, 2009, 171, 613-618.
Kutz, Mechanical Engineers' Handbook, 1998, 2nd Edition, p. 1887.
Langley, Refrigeration and Air Conditioning, 1986 3rd Edition, pp. 525-526.
Lee et al., J.Chem.Eng.Data, 1999, 44, 190-192.
Montzka et al., The Scientific Assessment of Ozone Depletion 2002. Controlled Substances and Other Source Gases Chapter 1.
Nagel et al., Vapour-liquid equilibrium of ternary mixtures of the refrigerants R32, R125 and R134a, Int J. Refrig. vol. 18, No. 8, pp. 534-543, 1995.
NASA Contract NAS-7-918, Technical Support Package on Nearly Azeotropic Mixtures to Replace Refrigerant 12, Aug. 1992.
Nist Refprop 8.0, Apr. 2007.
Orkin et al., Photochemistry of Bromine-Containing Fluorinated Alkenes: Reactivity toward OH and UV Spectra, J. Phys. Chem. A 2002, 106, 10195-10199.
Papasaava and Hill, SAE, 8th Refrigerant Symposium, Jul. 17, 2007.
Poling et al., "The Properties of Gases and Liquids", Chapters 2-4 and 6-8, 5th ed., 2000, McGraw Hill.
Puhl, Presentation at VDA Winter Meeting at Saalfelden, Feb. 11-12, 2009.
Regulation of the European Parliament and of Council on certain Fluorinated Greenhouse Gases, Brussels 2003.
Rivollet et al., Vapor-liquid equilibrium data for carbon dioxide (CO2) + difluoromethane (R32) system at temperatures . . . , Fluid Phase Equilibria 218 (2004) 95-101, 2004.
Table 2.14 Lifetimes, radiative efficiencies and direct, IPCC/TEAP data, 2005.
Takizawa et al., Reaction stoichiometry for combustion of fluoroethane blends, ASHRAE Trans., Jul. 1, 2006, pp. 459-468.
Van Ness et al., Vapor-Liquid Equilibrium, AlChE Journal, 1978, pp. 1055-1063.

\* cited by examiner

HEAT TRANSFER COMPOSITIONS

CROSS-REFERENCE TO RELATED APPLICATIONS

This application is a continuation of U.S. application Ser. No. 16/391,554, filed Apr. 23, 2019, which is a continuation of U.S. application Ser. No. 14/851,030, filed Sep. 11, 2015, now U.S. Pat. No. 10,266,736, issued Apr. 23, 2019, which is a continuation of U.S. application Ser. No. 13/701,328, filed Apr. 15, 2013, now abandoned, which is the U.S. National Stage application of PCT application no. PCT/GB2011/000952, filed on Jun. 24, 2011, titled HEAT TRANSFER COMPOSITIONS, designating the United States the content of which is incorporated herein by reference in its entirety, and claims the benefit of Great Britain Patent Application No. 1010712.6, filed Jun. 25, 2010.

BACKGROUND OF THE INVENTION

The invention relates to neat transfer compositions, and in particular to heat transfer compositions which may be suitable as replacements for existing refrigerants such as R-134a, R152a, R-1234yf, R-22, R-410A, R-407A, R-407B, R-407C, R507 and R-404a.

The listing or discussion of a prior-published document or any background in the specification should not necessarily be taken as an acknowledgement that a document or background is part of the state of the art or is common general knowledge. Mechanical refrigeration systems and related heat transfer devices such as heat pumps and air-conditioning systems are well known. In such systems, a refrigerant liquid evaporates at low pressure taking heat from the surrounding zone. The resulting vapour is then compressed and passed to a condenser where it condenses and gives off heat to a second zone, the condensate being returned through an expansion valve to the evaporator, so completing the cycle. Mechanical energy required for compressing the vapour and pumping the liquid is provided by, for example, an electric motor or an internal combustion engine.

In addition to having a suitable boiling point and a high latent heat of vaporisation, the properties preferred in a refrigerant include low toxicity, non-flammability, non-corrosivity, high stability and freedom from objectionable odour. Other desirable properties are ready compressibility at pressures below 25 bars, low discharge temperature on compression, high refrigeration capacity, high efficiency (high coefficient of performance) and an evaporator pressure in excess of 1 bar at the desired evaporation temperature.

Dichlorodifluoromethane (refrigerant R-12) possesses a suitable combination of properties and was for many years the most widely used refrigerant. Due to international concern that fully and partially halogenated chlorofluorocarbons were damaging the earth's protective ozone layer, there was general agreement that their manufacture and use should be severely restricted and eventually phased out completely. The use of dichlorodifluoromethane was phased out in the 1990's.

Chlorodifluoromethane (R-22) was introduced as a replacement for R-12 because of its lower ozone depletion potential. Following concerns that R-22 is a potent greenhouse gas, its use is also being phased out.

Whilst heat transfer devices of the type to which the present invention relates are essentially closed systems, loss of refrigerant to the atmosphere can occur due to leakage during operation of the equipment or during maintenance procedures. It is important, therefore, to replace fully and partially halogenated chlorofluorocarbon refrigerants by materials having zero ozone depletion potentials.

In addition to the possibility of ozone depletion, it has been suggested that significant concentrations of halocarbon refrigerants in the atmosphere might contribute to global warming (the so-called greenhouse effect). It is desirable, therefore, to use refrigerants which have relatively short atmospheric lifetimes as a result of their ability to react with other atmospheric constituents such as hydroxyl radicals or as a result of ready degradation through photolytic processes.

R-410A and R-407 refrigerants (including R-407A, R-407B and R-407C) have been introduced as a replacement refrigerant for R-22. However, R-22, R-410A and the R-407 refrigerants all have a high global warming potential (GWP, also known as greenhouse warming potential).

1,1,1,2-tetrafluoroethane (refrigerant R-134a) was introduced as a replacement refrigerant for R-12. However, despite having no significant ozone depletion potential, R-134a has a GWP of 1300. It would be desirable to find replacements for R-134a that have a lower GWP.

R-152a (1,1-difluoroethane) has been identified as an alternative to R-134a. It is somewhat more efficient than R-134a and has a greenhouse warming potential of 120. Flow ever the flammability of R-152a is judged too high, for example to permit its safe use in mobile air conditioning systems. In particular it is believed that its lower flammable limit in air is too low, its flame speeds are too high, and its ignition energy is too low.

Thus there is a need to provide alternative refrigerants having improved properties such as low flammability. Fluorocarbon combustion chemistry is complex and unpredictable. It is not always the case that mixing a non-flammable fluorocarbon with a flammable fluorocarbon reduces the flammability of the fluid or reduces the range of flammable compositions in air. For example, the inventors have found that if non-flammable R-134a is mixed with flammable R-152a, the lower flammable limit of the mixture alters in a manner which is not predictable. The situation is rendered even more complex and less predictable if ternary or quaternary compositions are considered.

There is also a need to provide alternative refrigerants that may be used in existing devices such as refrigeration devices with little or no modification.

R-1234yf (2,3,3,3-tetrafluoropropene) has been identified as a candidate alternative refrigerant to replace R-134a in certain applications, notably the mobile air conditioning or heart pumping applications. Its GWP is about 4. R-1234yf is flammable but its flammability characteristics are generally regarded as acceptable for some applications including mobile air conditioning or heart pumping. In particular, when compared with R-152a, its lower flammable limit is higher, its minimum ignition energy is higher and the flame speed in air is significantly lower than that of R-152a.

The environmental impact of operating an air conditioning or refrigeration system, in terms of the emissions of greenhouse gases, should be considered with reference not only to the so-called "direct" GWP of the refrigerant, but also with reference to the so-called "indirect" emissions, meaning those emissions of carbon dioxide resulting from consumption of electricity or fuel to operate the system. Several metrics of this total GWP impact have been developed, including those known as Total Equivalent Warming Impact (TEWI) analysis, or Life-Cycle Carbon Production (LCCP) analysis. Both of these measures include estimation of the effect of refrigerant GWP and energy efficiency on overall warming impact.

The energy efficiency and refrigeration capacity of R-1234yf have been found to be significantly lower than those of R-134a and in addition the fluid, has been found to exhibit increased pressure drop in system pipework and heat exchangers. A consequence of this is that to use R-1234yf and achieve energy efficiency and cooling performance equivalent to R-134a, increased complexity of equipment and increased size of pipework is required, leading to an increase in indirect emissions associated with equipment. Furthermore, the production of R-1234yf is thought to be more complex and less efficient in its use of raw materials (fluorinated and chlorinated) than R-134a. So the adoption of R-1234yf to replace R-134a will consume more raw materials and result in more indirect emissions of greenhouse gases than does R-134a.

Some existing technologies designed for R-134a may not be able to accept even the reduced flammability of some heat transfer compositions (any composition having a GWP of less than 150 is believed to be flammable to some extent).

A principal object of the present invention is therefore to provide a heat transfer composition which is usable in its own right or suitable as a replacement for existing refrigeration usages which should have a reduced GWP, yet have a capacity and energy efficiency (which may be conveniently expressed as the "Coefficient of Performance") ideally within 10% of the values, for example of those attained using existing refrigerants (e.g. R-134a, R-152a, R-1234yf, R-22, R-410A, R-407A, R-407B, R-407C, R507 and R-404a), and preferably within less than 10% (e.g. about 5%) of these values. It is known in the art that differences of this order between fluids are usually resolvable by redesign of equipment and system operational features. The composition should also ideally have reduced toxicity and acceptable flammability.

SUMMARY OF THE INVENTION

The subject invention addresses the above deficiencies by the provision of a heat transfer composition comprising:

(i) trans-1,3,3,3-tetrafluoropropene (R-1234ze(E));

(ii) a second component selected from difluoromethane (R-32), propene (R-1270), propane (R290) and mixtures thereof;

(iii) a third component selected from pentafluoroethane (R-125), 1,1,1,2-tetrafluoroethane (R-134a), and mixtures thereof; and optionally (iv) a fourth component selected from fluoroethane (R-161), 1,1-difluoroethane (R-152a) and mixtures thereof These will be referred to hereinafter as the compositions of the invention, unless otherwise stated.

All of the chemicals herein described sire commercially available. For example, the fluorochemicals may be obtained from Apollo Scientific (UK).

Typically, the compositions of the invention comprise up to about 60 or 70% by weight R-1234ze(E), such as from about 5 to about 50%, for example from about 10 to about 40%.

Conveniently, the compositions of the invention comprise up to about 50% by weight of the second component, such as from about 10 to about 40%, for example from about 15 to about 35%.

Typically, the compositions of the invention contain from about 10 to about 80% by weight of the third component, preferably from about 15 to about 70%, such as from about 20 to about 60%.

Conveniently, the compositions of the invention comprise from about 0 to about 15% (e.g. about 5 to about 15%) by weight of the fourth component.

DESCRIPTION OF THE PREFERRED EMBODIMENT

In one embodiment, the compositions of the invention comprise from about 5 to about 60% by weight of the fourth component.

As used herein, all % amounts mentioned in compositions herein, including in the claims, are by weight based on the total weight of the compositions, unless otherwise stated.

The components and the amounts of the components of the compositions of the invention typically are chosen such that the flammability of both liquid and vapour phases is reduced relative to the pure flammable component, or rendered completely non-flammable.

In an embodiment, the second component is R-32.

In one aspect, the third component comprises a mixture of R-125 and R-134a.

In a preferred embodiment, the compositions of the invention comprise R-1234ze(E), R-32, R-125 and R-134a.

An advantageous composition of the invention comprises from about 5 to about 40% by weight of R-1234ze(E), from about 20 to about 35% by weight R-32, from about 15 to about 30% by weight R-125, and from about 12 to about 50% by weight R-134a.

In one embodiment, the compositions of the invention contain from about 10 to about 50% by weight R-1234ze (E), from about 22 to about 40% by weight R-32, from about 10 to about 30% by weight R-125, and from about 15 to about 30% by weight R-134a.

A preferred group of compositions of the invention contain from about 17 to about 46% by weight R-1234ze (E), from about 26 to about 40% by weight R-32, from about 10 to about 18% by weight R-125, and from about 15 to about 30% by weight R-134a.

Further advantageous compositions of the invention contain from about 14 to about 40% by weight R-1234ze(E), from about 22 to about 38% by weight R-32, from about 18 to about 28% by weight R-125, and from about 15 to about 30% by weight R-134a.

A preferred composition of the invention consists essentially of about 20% by weight R-1234ze(E), about 30% by weight R-32, about 25% by weight R-125, and about 25% by weight R-134a.

In one embodiment, the invention excludes compositions that comprise or consist of approximately 1 to 16% by weight (e.g. approximately 3 to 8%) R-1234ze, approximately 8 to 20% by weight R-32 (e.g. approximately 12 to 18%), approximately 8 to 20% by weight R-125 (e.g. approximately 8 to 12%) and approximately 60 to 72% by weight R-134a (e.g. about 70 to 75%). In a further embodiment, the invention excludes compositions that comprise or consist of approximately 6% by weight R-1234ze, approximately 14% by weight R-32, approximately 14% by weight R-125 and approximately 66% by weight R-134a.

In one embodiment, the compositions of the invention contain R-161 as a fourth component. Typically, the R-161 is present in such compositions in an amount of from about 10 to about 60% by weight. In a preferred aspect, the R-161 is present in an amount of from 10 to about 30% by weight, for example from about 10 to about 20% by weight.

A preferred composition of the invention comprises R-1234ze(E), R-32, R-161 and R-134a.

An advantageous composition of the invention comprises from about 5 to about 60% by weight R-1234ze(E), from about 20 to about 50% by weight R-32, from about 10 to about 60% by weight R-161, and from about 10 to about 40% by weight R-134a.

A preferred composition of the invention of comprises from about 10 to about 60% by weight R-1234ze(E), from about 20 to about 50% by weight R-32, from about 10 to about 40% by weight R-161, and from about 10 to about 30% by weight R-134a.

A further preferred composition of the invention comprises from about 30 to about 60% by weight R-1234ze(E), from about 20 to about 50% by weight R-32, from about 10 to about 30% by weight R-161, and from about 10 to about 25% by weight R-134a.

Another advantageous composition of the invention comprises from about 40 to about 60% by weight R-1234ze(E), from about 20 to about 50% by weight R-32, from about 10 to about 20% by weight R-161, and from about 10 to about 25% by weight R-134a.

A preferred composition of the invention comprises R-1234ze(E), R-32, R-161 and R-125.

An advantageous composition of the invention comprises from about 5 to about 70% by weight R-1234ze(E), from about 15 to about 50% by weight R-32, from about 10 to about 40% by weight R-161, and from about 10 to about 40% by weight R-125.

A preferred composition of the invention of comprises from about 10 to about 65% by weight R-1234ze(E), from about 16 to about 40% by weight R-32, from about 10 to about 30% by weight R-161, and from about 10 to about 25% by weight R-125.

A further preferred composition of the invention comprises from about 25 to about 60% by weight R-1234ze(E), from about 20 to about 40% by weight R-32, from about 10 to about 20% by weight R-161, and from about 10 to about 25% by weight R-125.

Another preferred composition of the invention comprises from about 20 to about 55% by weight R-1234ze(E), from about 16 to about 35% by weight R-32, from about 20 to about 30% by weight R-161, and from about 10 to about 25% by weight R-125.

In one aspect, the compositions of the invention consist essentially of any of the stated components, in any of the stated amounts.

By the term "consist essentially of", we mean that the compositions of the invention contain substantially no other components, particularly no further (hydro)(fluoro) compounds (e.g. (hydro)(fluoro)alkanes or (hydro)(fluoro)alkenes) known to be used in heat transfer compositions. We include the term "consist of" within the meaning of "consist essentially of".

For the avoidance of doubt, any of the compositions of the invention described herein, including those with specifically defined amounts of components, may consist essentially of (or consist of) the components defined in those compositions.

Compositions according to the invention conveniently comprise substantially no R-1225 (pentafluoropropene), conveniently substantially no R-1225ye (1,2,3,3,3-pentafluoropropene) or R-1225zc (1,1,3,3,3-pentafluoropropene), which compounds may have associated toxicity issues.

By "substantially no", we include the meaning that the compositions of the invention contain 0.5% by weight or less of the stated component, preferably 0.1% or less, based on the total weight of the composition.

The compositions of the invention may contain substantially no:
(i) 2,3,3,3-tetrafluoropropene (R-1234yf),
(ii) cis-1,3,3,3-tetrafluoropropene (R-1234ze(Z)), and/or
(iii) 3,3,3-tetrafluoropropene (R-1243zf).

The compositions of the invention have zero ozone depletion potential.

Surprisingly, it has been found that the compositions of the invention deliver acceptable properties for use in air conditioning, heat pump and low and medium temperature refrigeration systems as alternatives to existing refrigerants such as R-22, R-410A, R-407A, R-407B, R-407C, R507 and R-404a, while reducing GWP and without resulting in high flammability/hazard.

Unless otherwise stated, as used herein "low temperature refrigeration" means refrigeration having an evaporation temperature of from about −50 to about −20° C. "Medium temperature refrigeration" means refrigeration having an evaporation temperature of from about −20 to about 0° C.

Unless otherwise stated, IPCC (Intergovernmental Panel on Climate Change) TAR (Third Assessment Report) values of GWP have been used herein. The GWP of selected existing refrigerant mixtures on this basis is as follows:

| | |
|---|---|
| R-407A | 1990 |
| R-407B | 2695 |
| R-407C | 1653 |
| R-404A | 3784 |
| R507 | 3850 |

In an embodiment, the compositions of the invention have a GWP less than R-22, R-410A, R-407A, R-407B, R-407C, R507 or R-404a. Conveniently, the GWP of the compositions of the invention is less than about 2800 For instance, the GWP may be less than 2800, 2500, 2300, 2100, 2000, 1900, 1800, 1700, 1500 or 1400.

Preferably, the compositions of the invention have a GWP that is less than 1500, preferably less than 1400, more preferably less than 1300, 1000, 900 or 700 or 500.

Advantageously, the compositions are of reduced flammability hazard when compared to the individual flammable components of the compositions, e.g. R-32, propene or propane.

In one aspect, the compositions have one or more of (a) a higher lower flammable limit; (b) a higher ignition energy; or (c) a lower flame velocity compared to R-32, propene, propane or R-1234yf. In a preferred embodiment, the compositions of the invention are non-flammable (or inflammable).

Flammability may be determined in accordance with ASHRAE Standard 34 incorporating the ASTM Standard E-681 with test methodology as per Addendum 34p dated 2004, the entire content of which is incorporated herein by reference.

In some applications it may not be necessary for the formulation to be classed as non-flammable by the ASHRAE 34 methodology; it is possible to develop fluids whose flammability limits will be sufficiently reduced in air to render them safe for use in the application, for example if it is physically not possible to make a flammable mixture by leaking the refrigeration equipment charge into the surrounds. We have found that the effect of adding R-1234ze and R-134a/R-125 to flammable refrigerants R-32, propene and/or propane is to modify the flammability in mixtures with air in this manner.

Temperature glide, which can be thought of as the difference between bubble point and dew point temperatures of a zeotropic (non-azeotropic) mixture at constant pressure, is a characteristic of a refrigerant; if it is desired to replace a fluid with a mixture then it is often preferable to have similar or reduced glide in the alternative fluid. In an embodiment, the compositions of the invention are zeotropic.

Conveniently, the temperature glide (in the evaporator) of the compositions of the invention is less than about 10K, preferably less than about 5K.

Advantageously, the volumetric refrigeration capacity of the compositions of the invention is at resist 85% of the existing refrigerant fluid it is replacing, preferably at least 90% or even at least 95%.

The compositions of the invention typically have a volumetric refrigeration capacity that is at least 90% of that of R-407C in medium temperature and/or low temperature application Preferably, the compositions of the invention have a volumetric refrigeration capacity that is at least 95% of that of R-407C, for example from about 95% to about 120% of that of R-1234yf.

In one embodiment, the cycle efficiency (Coefficient of Performance, COP) of the compositions of the invention is within about 5% or even better than the existing refrigerant fluid it is replacing.

Conveniently, the compressor discharge temperature of the compositions of the invention is within about 15K of the existing refrigerant fluid it is replacing, preferably about 10K or even about 5K.

The compositions of the invention preferably have energy efficiency at least 95% (preferably at least 98%) of R-407C, R-407A or R-404A under equivalent conditions, while having reduced or equivalent pressure drop characteristic and cooling capacity at 95% or higher of R-407C, R-407A or R-404A values. Advantageously the compositions have higher energy efficiency and lower pressure drop characteristics than R-407C, R-407A or R-404A under equivalent conditions. The compositions also advantageously have better energy efficiency and pressure drop characteristics than R-407C, R-407A or R-404A alone.

The heat transfer compositions of the invention are suitable for use in existing designs of equipment, and are compatible with all classes of lubricant currently used with established HFC refrigerants. They may be optionally stabilized or compatibilized with mineral oils by the use of appropriate additives.

Preferably, when used in heat transfer equipment, the composition of the invention is combined with a lubricant.

Conveniently, the lubricant is selected from the group consisting of mineral oil, silicone oil, polyalkyl benzenes (PABs), polyol esters (POEs), polyalkylene glycols (PAGs) polyalkylene glycol esters (PAG esters), polyvinyl ethers (PVEs), poly (alpha-olefins) and combinations thereof.

Advantageously, the lubricant further comprises a stabiliser.

Preferably, the stabiliser is selected from the group consisting of diene-based compounds, phosphates, phenol compounds and epoxides, and mixtures thereof.

Conveniently, the composition of the invention may be combined with a flame retardant.

Advantageously, the additional flame retardant is selected from the group consisting of tri-(2-chloroethyl)-phosphate, (chloropropyl) phosphate, tri-(2,3-dibromopropyl)-phosphate, tri-(1,3-dichloropropyl)-phosphate, diammonium phosphate, various halogenated aromatic compounds, antimony oxide, aluminium trihydrate, polyvinyl chloride, a fluorinated iodocarbon, a fluorinated bromocarbon, trifluoro iodomethane, perfluoroalkyl amines, bromo-fluoroalkyl amines and mixtures thereof.

Preferably, the heat transfer composition is a refrigerant composition.

In one embodiment, the invention provides a heat transfer device comprising a composition of the invention.

Preferably, the heat transfer device is a refrigeration device.

Conveniently, the heat transfer device is selected from group consisting of automotive air conditioning systems, residential air conditioning systems, commercial air conditioning systems, residential refrigerator systems, residential freezer systems, commercial refrigerator systems, commercial freezer systems, chiller air conditioning systems, chiller refrigeration systems, and commercial or residential heat pump systems. Preferably, the heat transfer device is a refrigeration device or an air-conditioning system.

Advantageously, the heat transfer device contains a centrifugal-type compressor.

The invention also provides the use of a composition of the invention in a heat transfer device as herein described.

According to a further aspect of the invention, there is provided a blowing agent comprising a composition of the invention.

According to another aspect of the invention, there is provided a foamable composition comprising one or more components capable of forming foam and a composition of the invention.

Preferably, the one or more components capable of forming foam are selected from polyurethanes, thermoplastic polymers and resins, such as polystyrene, and epoxy resins.

According to a further aspect of the invention, there is provided a foam obtainable from the foamable composition of the invention.

Preferably the foam comprises a composition of the invention.

According to another aspect of the invention, there is provided a sprayable composition comprising a material to be sprayed and a propellant comprising a composition of the invention.

According to a further aspect of the invention, there is provided a method for cooling an article which comprises condensing a composition of the invention and thereafter evaporating said composition in the vicinity of the article to be cooled.

According to another aspect of the invention, there is provided a method for heating an article which comprises condensing a composition of the invention in the vicinity of the article to be heated and thereafter evaporating said composition.

According to a further aspect of the invention, there is provided a method for extracting a substance from biomass comprising contacting the biomass with a solvent comprising a composition of the invention, and separating the substance from the solvent.

According to another aspect of the invention, there is provided a method of cleaning an article comprising contacting the article with a solvent comprising a composition of the invention.

According to a further aspect of the invention, there is provided a method for extracting a material from an aqueous solution comprising contacting the aqueous solution with a solvent comprising a composition of the invention, and separating the material from the solvent.

According to another aspect of the invention, there is provided a method for extracting a material from a particulate solid matrix comprising contacting the particulate solid matrix with a solvent comprising a composition of the invention, and separating the material from the solvent.

According to a further aspect of the invention, there is provided a mechanical power generation device containing a composition of the invention.

Preferably, the mechanical power generation device is adapted to use a Rankine Cycle or modification thereof to generate work from heat.

According to another aspect of the invention, there is provided a method of retrofitting a heat transfer device comprising the step of removing an existing heat transfer fluid, and introducing a composition of the invention. Preferably, the heat transfer device is a refrigeration device or (a static) air conditioning system. Advantageously, the method further comprises the step of obtaining an allocation of greenhouse gas (e.g. carbon dioxide) emission credit.

In accordance with the retrofitting method described above, an existing heat transfer fluid can be fully removed from the heat transfer device before introducing a composition of the invention. An existing heat transfer fluid can also be partially removed from a heat transfer device, followed by introducing a composition of the invention.

In another embodiment wherein the existing heat transfer fluid is R-134a, and the composition of the invention contains R134a, R-1234ze(E), the second component, optionally R-125, and optionally the fourth component (and optional components such as a lubricant, a stabiliser or an additional flame retardant), R-1234ze(E), the second component, any R-125 and/or the fourth component can be added to the R-134a in the neat transfer device, thereby forming the compositions of the invention, and the heat transfer device of the invention, in situ. Some of the existing R-134a may be removed from the neat transfer device prior to adding the R-1234ze(E), the second component, etc, to facilitate providing the components of the compositions of the invention in the desired proportions.

Thus, the invention provides a method for preparing a composition and/or heat transfer device of the invention comprising introducing R-1234ze(E), a second component selected from R-32, propene and propane, optionally R-125, and optionally a fourth component selected from R-161, R-152a and mixtures thereof, and optional components such as a lubricant, a stabiliser or am additional flame retardant, into a heat transfer device containing an existing heart transfer fluid which is R-134a. Optionally, at least some of the R-134a is removed from the heat transfer device before introducing the R-1234ze(E), the second component, etc.

Of course, the compositions of the invention may also be prepared simply by mixing the R-1234ze(E), the second and third components, and optionally the fourth component (and optional components such as a lubricant, a stabiliser or an additional flame retardant) in the desired proportions. The compositions can then be added to a heat transfer device (or used in any other way as defined herein) that does not contain R-134a or any other existing heat transfer fluid, such as a device from which R-134a or any other existing heat transfer fluid have been removed.

In a further aspect of the invention, there is provided a method for reducing the environmental impact arising from operation of a product comprising an existing compound or composition, the method comprising replacing at least partially the existing compound or composition with a composition of the invention. Preferably, this method comprises the step of obtaining an allocation of greenhouse gas emission credit.

By environmental impact we include the generation and emission of greenhouse warming gases through operation of the product.

As mentioned above, this environmental impact can be considered as including not only those emissions of compounds or compositions having a significant environmental impact from leakage or other losses, but also including the emission of carbon dioxide arising from the energy consumed by the device over its working life. Such environmental impact may be quantified by the measure known as Total Equivalent Warming Impact (TEWI). This measure has been used in quantification of the environmental impact of certain stationary refrigeration and air conditioning equipment, including for example supermarket refrigeration systems (see, for example, http://en.wikipedia.org/wiki/Total_equivalent_warming_impact).

The environmental impact may further be considered as including the emissions of greenhouse gases arising from the synthesis and manufacture of the compounds or compositions. In this case the manufacturing emissions are added to the energy consumption and direct loss effects to yield the measure known as Life-Cycle Carbon Production (LCCP, see for example http://www.sae.org/events/aars/presentations/2007papasavva.pdf). The use of LCCP is common in assessing environmental impact of automotive air conditioning systems.

Emission credit(s) are awarded for reducing pollutant emissions that contribute to global warming and may, for example, be banked, traded or sold. They are conventionally expressed in the equivalent amount of carbon dioxide. Thus if the emission of 1 kg of R-134a is avoided then an emission credit of $1 \times 1300 = 1300$ kg CO2 equivalent may be awarded.

In another embodiment of the invention, there is provided a method for generating greenhouse gas emission credit(s) comprising (i) replacing an existing compound or composition with a composition of the invention, wherein the composition of the invention has a lower GWP than the existing compound or composition; and (ii) obtaining greenhouse gas emission credit for said replacing step.

In a preferred embodiment, the use of the composition of the invention results in the equipment having a lower Total Equivalent Warming Impact, and/or a lower Life-Cycle Carbon Production than that which would be attained by use of the existing compound or composition.

These methods may be carried out on any suitable product, for example in the fields of air-conditioning, refrigeration (e.g. low and medium temperature refrigeration), heat transfer, blowing agents, aerosols or sprayable propellants, gaseous dielectrics, cryosurgery, veterinary procedures, dental procedures, fire extinguishing, flame suppression, solvents (e.g. carriers for flavorings and fragrances), cleaners, air horns, pellet guns, topical anesthetics, and expansion applications. Preferably, the field is air-conditioning or refrigeration.

Examples of suitable products include a heat transfer devices, blowing agents, foamable compositions, sprayable compositions, solvents and mechanical power generation devices. In a preferred embodiment, the product is a heat transfer device, such as a refrigeration device or an air-conditioning unit.

The existing compound or composition has an environmental impact as measured by GWP and/or TEWI and/or LCCP that is higher than the composition of the invention which replaces it. The existing compound or composition may comprise a fluorocarbon compound, such as a perfluoro-, hydrofluoro-, chlorofluoro- or hydrochlorofluorocarbon compound or it may comprise a fluorinated olefin Preferably, the existing compound, or composition is a heat transfer compound or composition such as a refrigerant. Examples of refrigerants that may be replaced include R-134a, R-152a, R-1234yf, R-410A, R-407A, R-407B, R-407C, R-407D, R-407F, R507, R-22 and R-404A. The compositions of the invention are particularly suited as replacements for R-22, R-404A, R-407A, R-407B, R-407C or R-410A.

Any amount of the existing compound or composition may be replaced so as to reduce the environmental impact. This may depend on the environmental impact of the existing compound or composition being replaced and the environmental impact of the replacement composition of the invention. Preferably, the existing compound or composition in the product is fully replaced by the composition of the invention.

The invention is illustrated by the following non-limiting examples.

EXAMPLES

Example 1

The performance of a composition comprising R-32 30%, R-125 25%, R-134a 25% and R-1234ze(E) 20% (weight basis) was modelled for medium temperature and low temperature refrigeration applications ("Blend A"). The cycle conditions chosen were:
(a) Medium Temperature Application
Mean condensing temperature 40° C.
Mean evaporating temperature −10° C.
Suction line return temperature 15° C.
Subcooling 5K
Evaporator superheat 5K
Compressor (isentropic) efficiency 65%
Cooling duty 10 kW
Suction line pipe diameter 22.7 mm
(b) Low Temperature Application
Mean condensing temperature 40° C.
Mean evaporating temperature −35° C.
Suction line return temperature −10° C.
Subcooling 5K
Evaporator superheat 5K
Compressor (isentropic) efficiency 65%
Cooling duty 10 kW
Suction line pipe diameter 22.7 mm
Temperature for initiation of liquid injection to control compressor temperature: 130° C.

These conditions were chosen as representative of those found in a supermarket refrigeration system with air cooled condenser in European summer conditions. The performance of Blend A is shown in Tables 1 and 2 with the estimated performance of the commercially available and commonly used refrigerants R-407C, R-407A and R-404A indicated for comparison. The capacity, energy efficiency (as Coefficient of Performance) and suction line pressure drop are compared to a baseline of R-407C, as this refrigerant has the highest theoretical COP and lowest direct GWP of the established refrigerants.

It can be seen that this composition has comparable energy efficiency than R-407C, better cooling capacity than R-407C, lower pressure drop and essentially comparable discharge temperature. Furthermore the capacity and energy efficiency of the composition is superior to R-404A. The composition has lower GWP than R-407C and so the total environmental warming impact (TEWI) of a system using this fluid will be lower than that achievable using R-407C or R-404A.

The fluid further exhibits close match of performance parameters to R-407A, which is today finding increasing utility as a refrigerant to replace R-404A. The operating pressures are very similar to those found with R-407A, so replacement of R-407A with this composition would require little or no change to a refrigeration system control scheme.

Furthermore the composition is believed to be essentially non-flammable.

TABLE 1

| Results - Medium temperature | | R407C | R407A | R404A | Blend A |
|---|---|---|---|---|---|
| GWP | | 1774 | 2107 | 3922 | 1436 |
| Fluorine ratio for blend | | | | | 0.64 |
| Fluorine ratio for vapour | | | | | 0.62 |
| COP | | 2.46 | 2.42 | 2.25 | 2.46 |
| | | 100.0% | 98.2% | 91.3% | 99.8% |
| Volumetric capacity | kJ/m3 | 2003 | 2083 | 2044 | 2143 |
| | | 100.0% | 104.0% | 102.0% | 107.0% |
| Refrigeration effect | kJ/kg | 161.9 | 148.7 | 113.9 | 166.2 |
| Pressure ratio | | 4.71 | 4.63 | 4.20 | 4.65 |
| Evaporator mass flow | kg/hr | 222.4 | 242.2 | 316.0 | 216.6 |
| Liquid injection mass flow | kg/hr | 0.0 | 0.0 | 0.0 | 0.0 |
| Compressor discharge temperature | ° C. | 101.0 | 97.5 | 83.9 | 102.6 |
| Evaporator inlet pressure | bar | 3.49 | 3.76 | 4.34 | 3.76 |
| Condenser inlet pressure | bar | 16.4 | 17.4 | 18.2 | 17.5 |
| Evaporator mean temperature | ° C. | −10.0 | −10.0 | −10.0 | −10.0 |
| Evaporator glide (out-in) | K | 4.6 | 4.2 | 0.4 | 5.4 |
| Compressor suction pressure | bar | 3.49 | 3.76 | 4.34 | 3.76 |
| Compressor discharge pressure | bar | 16.4 | 17.4 | 18.2 | 17.5 |
| Suction line pressure drop | Pa/m | 520 | 536 | 665 | 477 |
| Pressure drop relative to reference | | | | | 91.8% |
| Condenser mean temperature | ° C. | 40.0 | 40.0 | 40.0 | 40.0 |
| Condenser glide (in-out) | K | 5.0 | 4.4 | 0.3 | 5.6 |

TABLE 2

| Results-Low temperature application | | R407C | R407A | R404A | Blend A |
|---|---|---|---|---|---|
| GWP | | | | | 1436 |
| Fluorine ratio for blend | | | | | 0.64 |
| Fluorine ratio for vapour | | | | | 0.62 |
| COP | | 1.32 | 1.29 | 1.17 | 1.32 |
| | | 100.0% | 97.7% | 88.6% | 100.0% |
| Volumetric capacity | kJ/m3 | 556 | 583 | 610 | 610 |
| | | 100.0% | 104.9% | 109.7% | 109.7% |
| Refrigeration effect | kJ/kg | 147.6 | 134.6 | 99.3 | 152.0 |
| Pressure ratio | | 13.58 | 13.15 | 11.02 | 13.20 |
| Evaporator mass flow | kg/hr | 243.9 | 267.5 | 362.7 | 236.8 |
| Liquid injection mass flow | kg/hr | 0.0 | 0.0 | 0.0 | 2.0 |
| Compressor discharge temperature | ° C. | 129.5 | 123.4 | 99.7 | 130.0 |
| Evaporator inlet pressure | bar | 1.21 | 1.32 | 1.65 | 1.32 |
| Condenser inlet pressure | bar | 16.4 | 17.4 | 18.2 | 17.5 |
| Evaporator mean temperature | ° C. | −35.0 | −35.0 | −35.0 | −35.0 |
| Evaporator glide (out-in) | K | 4.2 | 3.9 | 0.5 | 5.0 |
| Compressor suction pressure | bar | 1.21 | 1.32 | 1.65 | 1.32 |
| Compressor discharge pressure | bar | 16.4 | 17.4 | 18.2 | 17.5 |
| Suction line pressure drop | Pa/m | 1630 | 1674 | 2085 | 1469 |
| Pressure drop relative to reference | | 100.0% | 102.7% | 127.9% | 90.2% |
| Condenser mean temperature | ° C. | 40.0 | 40.0 | 40.0 | 40.0 |
| Condenser glide (in-out) | K | 5.0 | 4.4 | 0.3 | 5.6 |

Example 2

The performance was modelled for further compositions of the invention comprising: R-32 in range 20-35% w/w; R-125 in range 15-30% w/w; R-134a in range 15-50% w/w and R-1234ze being the balance, using the same conditions as in Table 1 and with R-407C as the reference fluid for comparison of capacity, energy efficiency and suction line pressure drop. The compositions of the invention give acceptable or improved performance with lower GWP and lower overall TEWI than R-407A, R-407C or R-404A.

Example 3

The performance was modelled for further compositions of the invention as explained in more detail below. The derivation of the model used is as follows.

The physical properties of R-1234ze(E) required to model refrigeration cycle performance, namely critical point, vapour pressure, liquid and vapour enthalpy, liquid and vapour density and heat capacities of vapour and liquid were accurately determined by experimental methods over the pressure range 0-200 bar and temperature range −40 to 200° C., and the resulting data used to generate Helmholtz free energy equation of state models of the Span-Wagner type for the fluid in the NIST REFPROP Version 8.0 software, which is more fully described in the user guide www.nist.gov/srd/PDFfiles/REFPROP8.PDF, and is incorporated herein by reference. The variation of ideal gas enthalpy of both fluids with temperature was estimated using molecular modelling software Hyperchem v7.5 (which is incorporated herein by reference) and the resulting ideal gas enthalpy function was used in the regression of the equation of state for these fluids. The predictions of this model R1234ze(E) were compared to the predictions yielded by use of the standard files for R1234ze(E) included in REFPROP Version 9.0. It was found that close agreement was obtained for each fluid's properties.

The vapour liquid equilibrium behaviour of R-1234ze(E) was studied in a series of binary pairs with carbon dioxide, R-32, R-125, R-134a, R-152a, R-161, propane and propylene over the temperature range −40 to +60° C., which encompasses the practical operating range of most refrigeration and air conditioning systems. The composition was varied over the full compositional space for each binary in the experimental programme, mixture parameters for each binary pair were regressed to the experimentally obtained data and the parameters were also incorporated into the REFPROP software model. The academic literature was next searched for data on the vapour liquid equilibrium behaviour of carbon dioxide with the hydrofluorocarbons R-32, R-125, R-152a, R-161 and R-152a. The VLE data obtained from sources (referenced in the article Applications of the simple multi-fluid model to correlations of the vapour-liquid equilibrium of refrigerant mixtures containing carbon dioxide, by R. Akasaka, Journal of Thermal Science and Technology, 159-168, 4, 1, 2009) were then used to generate mixing parameters for the relevant binary mixtures and these were then also incorporated into the REFPROP model. The standard REFPROP mixing parameters for carbon dioxide with propane and propylene were also incorporated to this model.

The resulting software model was used to compare the performance of selected fluids of the invention with R-407A in a low temperature supermarket refrigeration cycle simulation. The use of liquid injection to control compressor discharge temperature was included as a feature of this cycle. Liquid injection is recommended by compressor manufacturers and refrigerant suppliers if R-407A or R-22 is to be used in such applications.

The quantity of liquid required to maintain the compressor discharge gas at or below the desired maximum temperature was estimated by assuming that the liquid to be injected to the compressor was at the same thermodynamic state as the liquid leaving the condenser and by then performing a heat balance on the machine. The total compression work required was then derived from knowledge of the total mass flow through the compressor and the specified outlet and inlet refrigerant states.

The comparison of fluids was carried out assuming equivalent mean evaporating and condensing temperatures for the refrigerants, and fixed degrees of subcooling and evaporator superheat. Fixed pressure drops were assumed for R-407A in the evaporator, condenser and compressor suction gas line. The pressure drops for the fluids of the invention were then estimated for the same cycle by estimating the achieved compressor throughput with the fluid, deriving the mass flowrate of the refrigerant in the line and then calculating the pressure drop by comparison with the assumed pressure drop for the reference refrigerant.

To calculate the achieved compressor throughput for R-407A and the fluids of the invention, the compressor was assumed to be a piston type machine running at fixed speed and known piston displacement with an effective clearance volume ratio of 3% and an average adiabatic (isentropic) efficiency of 65%, operating at a constant compressor suction gas temperature of 20° C. The volumetric efficiency of the compressor was then estimated for each refrigerant from the pressure ratio developed over the compressor and the thermodynamic properties of the gas using the standard relationship for estimation of volumetric efficiency in such a machine.

The cycle conditions used were:

| | | |
|---|---|---|
| Mean condenser temperature | ° C. | 40 |
| Mean evaporator temperature | ° C. | −30 |
| Condenser subcooling | K | 5 |
| Evaporator superheat | K | 5 |
| Evaporator pressure drop | bar | 0.10 |
| Suction line pressure drop | bar | 0.20 |
| Condenser pressure drop | bar | 0.10 |
| Compressor displacement | m3/hr | 18 |
| Liquid injection temperature | ° C. | 130 |
| Compressor suction temperature | ° C. | 20 |
| Compressor clearance volume ratio | | 3% |
| Compressor isentropic efficiency | | 65% |

R-32/R-125/R-134a/R-1234ze(E) Blends

Using the model set out above, the performance of selected compositions of the invention containing 16 to 40% by weight R-32, 10 to 24% by weight R-125, 16 to 28% by weight R-134a and 8 to 56% by weight R-1234ze(E) is shown in Tables 3 to 34 below.

Modelled performance of R-404A, R-407C, R-407D and R-407F is shown in Comparative Table X immediately below.

R1234ze(E) is unsuitable in its own right for this application given its (relatively) high boiling point, of −19° C. Surprisingly, therefore, it has proved possible to use significant quantities of R-1234ze(E) in the compositions of the invention without detrimental effect on the operating pressures of the fluids.

Therefore, the fluids of the invention offer highly unexpected significant improved environmental performance when compared to comparable known RFC refrigerants (e.g. R-407A, R407F and R-404a) on the grounds of:
  Improved energy efficiency at comparable capacity
  Improved volumetric efficiency and reduced pressure ratio
  Reduced potential for leakage of refrigerant from the high pressure lines of the system
  Reduced direct GWP of the refrigerant The currently most preferred fluids of the invention are those whose cooling capacity matches that of R-404A, whose condensing pressure is lower than that of R-404A and whose energy efficiency is higher than that of R-407A or R-407F when compared in this manner.

It should be noted that at evaporation temperatures typical of medium/high supermarket temperature refrigeration systems the above-stated performance gains are all maintained and thus the fluids are of applicability in all commercial refrigeration applications. In fact the performance of the fluids of the invention compared to R-404A is further improved at higher evaporation temperatures. In particular the COP of the fluids of the invention is found to be similar or better even than that of R-407C. The fluids of the invention can thus find application not only for low stage refrigeration but also for medium high stage refrigeration and air conditioning applications.

It has also been found possible with the compositions of the invention to exceed the performance of R-407D, a fluid which is used for certain refrigerated transport applications as an alternative to the CFC refrigerant R-500, for example if R-32 content in the range 16-20% is used. It is evident from the performance comparison that the capacity and COP

TABLE X

Comparative Performance Data for R-407 Series

| | | R407A | R404A | R407C | R407D | R407F |
|---|---|---|---|---|---|---|
| COP | | 1.20 | 1.05 | 1.24 | 1.25 | 1.23 |
| COP relative to Reference | | 100.0% | 87.5% | 103.1% | 104.4% | 102.3% |
| Achieved cooling capacity | kW | 2.49 | 2.60 | 2.38 | 1.96 | 2.70 |
| Capacity relative to reference | | 100.0% | 104.6% | 95.6% | 79.1% | 108.8% |
| Suction pressure drop relative to reference | | 100.0% | 155.7% | 85.8% | 71.9% | 95.5% |
| Pressure ratio | | 12.34 | 11.07 | 12.55 | 13.30 | 11.99 |
| Mass flow through evaporator | kg/hr | 65.2 | 91.8 | 56.9 | 48.0 | 63.1 |
| Liquid injection mass flow | kg/hr | 6.7 | 1.5 | 6.9 | 4.8 | 8.8 |
| Compressor discharge temperature | ° C. | 130.0 | 130.0 | 130.0 | 130.0 | 130.0 |
| Evaporator glide (out-in) | K. | 2.7 | −1.4 | 3.0 | 2.2 | 3.0 |
| Compressor suction pressure | bar | 1.42 | 1.65 | 1.31 | 1.06 | 1.52 |
| Compressor discharge pressure | bar | 17.5 | 18.3 | 16.5 | 14.1 | 18.3 |
| Condenser glide (in-out) | K | 4.6 | 0.7 | 5.2 | 5.0 | 4.6 |

It has been found unexpectedly that it is possible to achieve capacities comparable to those of R-404A or R-407F whilst operating at lower condensing pressures than either R-404A or R-407F and at comparable or lower pressure ratios than those achieved with R-407A and R-407F. In fact some compositions of the invention offer-pressure ratios comparable to R-404A.

The incorporation of R-1234ze(E) to the fluid further allows a reduction of GWF of the mixture compared to the GWF of any of the R-407 fluids and compared to R-404A.

of R-407D can be matched or bettered whilst maintaining compressor discharge pressure at or below that of R-407D. Thus the previously claimed benefits of the fluids are also achieved for this application.

R-32/R-161/R-134a/R-1234ze(E) Blends

Analysis of selected compositions of the invention containing 20 to 46% by weight R-32, 10 to 60% by weight R-161, 10 to 22% by weight R-134a and 8 to 60% by weight R-1234ze(E) was carried out using the same refrigeration cycle conditions as detailed above under Example 3. The results are shown in Tables 35 to 105 below (see Table X above for reference).

It is found unexpectedly that the Coefficient of Performance (COP) of the fluids is not only higher than that of R-407A in the equivalent cycle conditions but is higher than that achievable with the R32/R125/R134a/R1234ze(E) fluids of the invention. The use of minor quantities of R-161 in place of R-125 allows further improvement of the energy efficiency (COP), further reduction of the GWP of the refrigerant, reduction in condenser operating pressure and reduction of R-32 required to give comparable cooling capacity. The fluids therefore offer similar performance benefits as already stated. These fluids are especially attractive in applications and equipment where mild flammability of the refrigerant can be accepted.

R-32/R-161/R-125/R-1234ze (E) Blends

Analysis of selected compositions of the invention containing 16 to 40% by weight R-32, 10 to 30% by weight R-161, 10 to 25% by weight R-125 and 10 to 64% by weight R-1234ze(E) was carried out using the same refrigeration cycle conditions as detailed above under Example 3. The results are shown in Tables 106 to 124 below (see Table X above for reference).

Surprisingly, the Coefficient of Performance (COP) of the fluids is higher than that of R-407A in the equivalent cycle conditions. The use of minor quantities of R-161 allows improvement of the energy efficiency (COP) and reduction of the GWP of the refrigerant. A reduction in condenser operating pressure and pressure ratio is also observed, alongside a reduction in the amount of R-32 required to give comparable cooling capacity. The fluids therefore offer similar performance benefits as previously stated. These fluids are especially attractive in applications and equipment where mild flammability of the refrigerant can be accepted.

The invention is defined by the claims.

TABLE 3

Theoretical Performance Data of Selected R-32/R-125/R-134a/R-1234ze(E) blends containing 16-28% R-32, 10% R-125 and 16% R-134a

| | | Composition R-32/R-125/R-134a/R-1234ze(E) % by weight | | | | | | |
|---|---|---|---|---|---|---|---|---|
| | | 16/10/16/58 | 18/10/16/56 | 20/10/16/54 | 22/10/16/52 | 24/10/16/50 | 26/10/16/48 | 28/10/16/46 |
| COP | | 1.26 | 1.27 | 1.27 | 1.27 | 1.27 | 1.27 | 1.27 |
| COP relative to Reference | | 105.4% | 105.6% | 105.7% | 105.9% | 105.9% | 106.0% | 106.0% |
| Achieved cooling capacity | kW | 1.76 | 1.84 | 1.92 | 1.99 | 2.07 | 2.15 | 2.23 |
| Capacity relative to reference | | 70.7% | 73.9% | 77.1% | 80.3% | 83.4% | 86.5% | 89.6% |
| Suction pressure drop relative to reference | | 65.9% | 67.6% | 69.4% | 71.0% | 72.6% | 74.1% | 75.6% |
| Pressure ratio | | 13.80 | 13.63 | 13.46 | 13.29 | 13.14 | 12.98 | 12.83 |
| Mass flow through evaporator | kg/hr | 43.9 | 45.1 | 46.2 | 47.3 | 48.4 | 49.4 | 50.4 |
| Liquid injection mass flow | kg/hr | 3.2 | 3.6 | 4.1 | 4.5 | 5.0 | 5.4 | 5.9 |
| Compressor discharge temperature | ° C. | 130.0 | 130.0 | 130.0 | 130.0 | 130.0 | 130.0 | 130.0 |
| Evaporator glide (out-in) | K | 4.2 | 4.5 | 4.8 | 5.0 | 5.2 | 5.3 | 5.3 |
| Compressor suction pressure | bar | 0.93 | 0.98 | 1.02 | 1.06 | 1.11 | 1.15 | 1.19 |
| Compressor discharge pressure | bar | 12.9 | 13.3 | 13.7 | 14.1 | 14.5 | 14.9 | 15.3 |
| Condenser glide (in-out) | K | 8.7 | 8.7 | 8.7 | 8.7 | 8.6 | 8.4 | 8.3 |

TABLE 4

Theoretical Performance Data of Selected R-32/R-125/R-134a/R-1234ze(E) blends containing 30-40% R-32, 10% R-125 and 16% R-134a

| | | Composition R-32/R-125/R-134a/R-1234ze(E) % by weight | | | | | |
|---|---|---|---|---|---|---|---|
| | | 30/10/16/44 | 32/10/16/42 | 34/10/16/40 | 36/10/16/38 | 38/10/16/36 | 40/10/16/34 |
| COP | | 1.27 | 1.27 | 1.27 | 1.27 | 1.27 | 1.27 |
| COP relative to Reference | | 106.0% | 106.0% | 106.0% | 106.0% | 105.9% | 105.8% |
| Achieved cooling capacity | kW | 2.30 | 2.38 | 2.45 | 2.53 | 2.60 | 2.67 |
| Capacity relative to reference | | 92.7% | 95.7% | 98.7% | 101.6% | 104.6% | 107.5% |
| Suction pressure drop relative to reference | | 77.0% | 78.3% | 79.6% | 80.8% | 81.9% | 83.0% |
| Pressure ratio | | 12.69 | 12.55 | 12.42 | 12.29 | 12.17 | 12.05 |
| Mass flow through evaporator | kg/hr | 51.3 | 52.2 | 53.1 | 53.9 | 54.7 | 55.5 |
| Liquid injection mass flow | kg/hr | 6.4 | 6.9 | 7.3 | 7.8 | 8.3 | 8.8 |
| Compressor discharge temperature | ° C. | 130.0 | 130.0 | 130.0 | 130.0 | 130.0 | 130.0 |
| Evaporator glide (out-in) | K | 5.3 | 5.3 | 5.3 | 5.2 | 5.1 | 5.0 |
| Compressor suction pressure | bar | 1.24 | 1.28 | 1.32 | 1.37 | 1.41 | 1.46 |
| Compressor discharge pressure | bar | 15.7 | 16.1 | 16.5 | 16.8 | 17.2 | 17.5 |
| Condenser glide (in-out) | K | 8.1 | 7.8 | 7.6 | 7.3 | 7.0 | 6.7 |

TABLE 5

Theoretical Performance Data of Selected R-32/R-125/R-134a/R-1234ze(E) blends containing 16-28% R-32, 10% R-125 and 20% R-134a

| | | Composition R-32/R-125/R-134a/R-1234ze(E) % by weight | | | | | | |
|---|---|---|---|---|---|---|---|---|
| | | 16/10/20/54 | 18/10/20/52 | 20/10/20/50 | 22/10/20/48 | 24/10/20/46 | 26/10/20/44 | 28/10/20/42 |
| COP | | 1.26 | 1.27 | 1.27 | 1.27 | 1.27 | 1.27 | 1.27 |
| COP relative to Reference | | 105.3% | 105.5% | 105.6% | 105.8% | 105.8% | 105.9% | 105.9% |
| Achieved cooling capacity | kW | 1.77 | 1.85 | 1.93 | 2.01 | 2.09 | 2.17 | 2.24 |
| Capacity relative to reference | | 71.4% | 74.6% | 77.8% | 80.9% | 84.0% | 87.1% | 90.2% |
| Suction pressure drop relative to reference | | 66.4% | 68.2% | 69.8% | 71.4% | 73.0% | 74.5% | 75.9% |
| Pressure ratio | | 13.75 | 13.58 | 13.41 | 13.25 | 13.10 | 12.94 | 12.80 |
| Mass flow through evaporator | kg/hr | 44.3 | 45.4 | 46.5 | 47.6 | 48.6 | 49.6 | 50.6 |
| Liquid injection mass flow | kg/hr | 3.3 | 3.7 | 4.2 | 4.6 | 5.1 | 5.6 | 6.0 |
| Compressor discharge temperature | °C. | 130.0 | 130.0 | 130.0 | 130.0 | 130.0 | 130.0 | 130.0 |
| Evaporator glide (out-in) | K | 4.0 | 4.3 | 4.5 | 4.7 | 4.9 | 5.0 | 5.0 |
| Compressor suction pressure | bar | 0.95 | 0.99 | 1.03 | 1.07 | 1.12 | 1.16 | 1.20 |
| Compressor discharge pressure | bar | 13.0 | 13.4 | 13.8 | 14.2 | 14.6 | 15.0 | 15.4 |
| Condenser glide (in-out) | K | 8.3 | 8.4 | 8.4 | 8.3 | 8.2 | 8.1 | 7.9 |

TABLE 6

Theoretical Performance Data of Selected R-32/R-125/R-134a/R-1234ze(E) blends containing 30-40% R-32, 10% R-125 and 20% R-134a

| | | Composition R-32/R-125/R-134a/R-1234ze(E) % by weigh | | | | | |
|---|---|---|---|---|---|---|---|
| | | 30/10/20/40 | 32/10/20/38 | 34/10/20/36 | 36/10/20/34 | 38/10/20/32 | 40/10/20/30 |
| COP | | 1.27 | 1.27 | 1.27 | 1.27 | 1.27 | 1.27 |
| COP relative to Reference | | 105.9% | 105.9% | 105.9% | 105.9% | 105.8% | 105.8% |
| Achieved cooling capacity | kW | 2.32 | 2.39 | 2.47 | 2.54 | 2.61 | 2.68 |
| Capacity relative to reference | | 93.2% | 96.2% | 99.2% | 102.2% | 105.1% | 107.9% |
| Suction pressure drop relative to reference | | 77.3% | 78.6% | 79.8% | 81.0% | 82.1% | 83.1% |
| Pressure ratio | | 12.66 | 12.52 | 12.39 | 12.26 | 12.14 | 12.02 |
| Mass flow through evaporator | kg/hr | 51.5 | 52.4 | 53.2 | 54.1 | 54.8 | 55.6 |
| Liquid injection mass flow | kg/hr | 6.5 | 7.0 | 7.5 | 8.0 | 8.4 | 8.9 |
| Compressor discharge temperature | °C. | 130.0 | 130.0 | 130.0 | 130.0 | 130.0 | 130.0 |
| Evaporator glide (out-in) | K | 5.1 | 5.0 | 5.0 | 4.9 | 4.8 | 4.7 |
| Compressor suction pressure | bar | 1.25 | 1.29 | 1.33 | 1.38 | 1.42 | 1.46 |
| Compressor discharge pressure | bar | 15.8 | 16.2 | 16.5 | 16.9 | 17.2 | 17.6 |
| Condenser glide (in-out) | K | 7.7 | 7.5 | 7.2 | 7.0 | 6.7 | 6.4 |

TABLE 7

Theoretical Performance Data of Selected R-32/R-125/R-134a/R-1234ze(E) blends containing 16-28% R-32, 10% R-125 and 24% R-134a

| | | Composition R-32/R-125/R-134a/R-1234ze(E) % by weight | | | | | | |
|---|---|---|---|---|---|---|---|---|
| | | 16/10/24/50 | 18/10/24/48 | 20/10/24/46 | 22/10/24/44 | 24/10/24/42 | 26/10/24/40 | 28/10/24/38 |
| COP | | 1.26 | 1.26 | 1.27 | 1.27 | 1.27 | 1.27 | 1.27 |
| COP relative to Reference | | 105.2% | 105.4% | 105.5% | 105.7% | 105.7% | 105.8% | 105.8% |
| Achieved cooling capacity | kW | 1.79 | 1.87 | 1.95 | 2.03 | 2.10 | 2.18 | 2.26 |
| Capacity relative to reference | | 72.1% | 75.3% | 78.4% | 81.5% | 84.6% | 87.7% | 90.8% |
| Suction pressure drop relative to reference | | 67.0% | 68.6% | 70.3% | 71.8% | 73.4% | 74.8% | 76.2% |
| Pressure ratio | | 13.70 | 13.53 | 13.37 | 13.21 | 13.06 | 12.91 | 12.77 |
| Mass flow through evaporator | kg/hr | 44.6 | 45.7 | 46.8 | 47.9 | 48.9 | 49.9 | 50.8 |
| Liquid injection mass flow | kg/hr | 3.4 | 3.9 | 4.3 | 4.8 | 5.2 | 5.7 | 6.2 |
| Compressor discharge temperature | °C. | 130.0 | 130.0 | 130.0 | 130.0 | 130.0 | 130.0 | 130.0 |
| Evaporator glide (out-in) | K | 3.8 | 4.1 | 4.3 | 4.5 | 4.6 | 4.7 | 4.8 |
| Compressor suction pressure | bar | 0.96 | 1.00 | 1.04 | 1.08 | 1.13 | 1.17 | 1.21 |
| Compressor discharge pressure | bar | 13.1 | 13.5 | 13.9 | 14.3 | 14.7 | 15.1 | 15.5 |
| Condenser glide (in-out) | K | 7.9 | 8.0 | 8.0 | 7.9 | 7.8 | 7.7 | 7.5 |

TABLE 8

Theoretical Performance Data of Selected R-32/R-125/R-134a/R-1234ze(E) blends containing 30-40% R-32, 10% R-125 and 24% R-134a

| | | Composition R-32/R-125/R-134a/R-1234ze(E) % by weight | | | | | |
|---|---|---|---|---|---|---|---|
| | | 30/10/24/36 | 32/10/24/34 | 34/10/24/32 | 36/10/24/30 | 38/10/24/28 | 40/10/24/26 |
| COP | | 1.27 | 1.27 | 1.27 | 1.27 | 1.27 | 1.27 |
| COP relative to Reference | | 105.9% | 105.9% | 105.8% | 105.8% | 105.8% | 105.7% |
| Achieved cooling capacity | kW | 2.33 | 2.40 | 2.48 | 2.55 | 2.62 | 2.69 |
| Capacity relative to reference | | 93.8% | 96.7% | 99.7% | 102.6% | 105.5% | 108.4% |
| Suction pressure drop relative to reference | | 77.5% | 78.8% | 80.0% | 81.1% | 82.2% | 83.2% |
| Pressure ratio | | 12.63 | 12.49 | 12.36 | 12.24 | 12.12 | 12.00 |
| Mass flow through evaporator | kg/hr | 51.7 | 52.6 | 53.4 | 54.2 | 54.9 | 55.6 |
| Liquid injection mass flow | kg/hr | 6.6 | 7.1 | 7.6 | 8.1 | 8.6 | 9.0 |
| Compressor discharge temperature | °C. | 130.0 | 130.0 | 130.0 | 130.0 | 130.0 | 130.0 |
| Evaporator glide (out-in) | K | 4.8 | 4.8 | 4.7 | 4.7 | 4.6 | 4.4 |
| Compressor suction pressure | bar | 1.26 | 1.30 | 1.34 | 1.38 | 1.43 | 1.47 |
| Compressor discharge pressure | bar | 15.9 | 16.2 | 16.6 | 16.9 | 17.3 | 17.6 |
| Condenser glide (in-out) | K | 7.3 | 7.1 | 6.9 | 6.7 | 6.4 | 6.2 |

TABLE 9

Theoretical Performance Data of Selected R-32/R-125/R-134a/R-1234ze(E) blends containing 16-28% R-32, 10% R-125 and 28% R-134a

| | | Composition R-32/R-125/R-134a/R-1234ze(E) % by weight | | | | | | |
|---|---|---|---|---|---|---|---|---|
| | | 16/10/28/46 | 18/10/28/44 | 20/10/28/42 | 22/10/28/40 | 24/10/28/38 | 26/10/28/36 | 28/10/28/34 |
| COP | | 1.26 | 1.26 | 1.27 | 1.27 | 1.27 | 1.27 | 1.27 |
| COP relative to Reference | | 105.1% | 105.3% | 105.5% | 105.6% | 105.7% | 105.7% | 105.8% |
| Achieved cooling capacity | kW | 1.81 | 1.89 | 1.96 | 2.04 | 2.12 | 2.19 | 2.27 |
| Capacity relative to reference | | 72.8% | 75.9% | 79.0% | 82.1% | 85.2% | 88.3% | 91.3% |
| Suction pressure drop relative to reference | | 67.4% | 69.1% | 70.6% | 72.2% | 73.6% | 75.1% | 76.4% |
| Mass flow through evaporator | kg/hr | 44.9 | 46.0 | 47.1 | 48.1 | 49.1 | 50.0 | 51.0 |
| Liquid injection mass flow | kg/hr | 3.5 | 4.0 | 4.4 | 4.9 | 5.4 | 5.8 | 6.3 |
| Compressor discharge temperature | °C. | 130.0 | 130.0 | 130.0 | 130.0 | 130.0 | 130.0 | 130.0 |
| Evaporator glide (out-in) | K | 3.6 | 3.9 | 4.1 | 4.2 | 4.4 | 4.5 | 4.5 |
| Compressor suction pressure | bar | 0.97 | 1.01 | 1.05 | 1.09 | 1.14 | 1.18 | 1.22 |
| Compressor discharge pressure | bar | 13.2 | 13.6 | 14.0 | 14.4 | 14.8 | 15.2 | 15.6 |
| Condenser glide (in-out) | K | 7.6 | 7.6 | 7.6 | 7.6 | 7.5 | 7.4 | 7.2 |

TABLE 10

Theoretical Performance Data of Selected R-32/R-125/R-134a/R-1234ze(E) blends containing 16-28% R-32, 10% R-125 and 28% R-134a

| | | Composition R-32/R-125/R-134a/R-1234ze(E) % by weight | | | | | |
|---|---|---|---|---|---|---|---|
| | | 30/10/28/32 | 32/10/28/30 | 34/10/28/28 | 36/10/28/26 | 38/10/28/24 | 40/10/28/22 |
| COP | | 1.27 | 1.27 | 1.27 | 1.27 | 1.27 | 1.27 |
| COP relative to Reference | | 105.8% | 105.8% | 105.8% | 105.8% | 105.7% | 105.7% |
| Achieved cooling capacity | kW | 2.34 | 2.42 | 2.49 | 2.56 | 2.63 | 2.70 |
| Capacity relative to reference | | 94.3% | 97.2% | 100.2% | 103.0% | 105.9% | 108.7% |
| Suction pressure drop relative to reference | | 77.7% | 78.9% | 80.1% | 81.1% | 82.2% | 83.1% |
| Pressure ratio | | 12.60 | 12.47 | 12.34 | 12.22 | 12.10 | 11.98 |
| Mass flow through evaporator | kg/hr | 51.8 | 52.7 | 53.5 | 54.2 | 55.0 | 55.7 |
| Liquid injection mass flow | kg/hr | 6.8 | 7.2 | 7.7 | 8.2 | 8.7 | 9.2 |
| Compressor discharge temperature | °C. | 130.0 | 130.0 | 130.0 | 130.0 | 130.0 | 130.0 |
| Evaporator glide (out-in) | K | 4.5 | 4.5 | 4.5 | 4.4 | 4.3 | 4.2 |
| Compressor suction pressure | bar | 1.26 | 1.31 | 1.35 | 1.39 | 1.43 | 1.48 |
| Compressor discharge pressure | bar | 15.9 | 16.3 | 16.6 | 17.0 | 17.3 | 17.7 |
| Condenser glide (in-out) | K | 7.0 | 6.8 | 6.6 | 6.4 | 6.2 | 5.9 |

TABLE 11

Theoretical Performance Data of Selected R-32/R-125/R-134a/R-1234ze(E) blends containing 16-28% R-32, 15% R-125 and 16% R-134a

| | | Composition R-32/R-125/R-134a/R-1234ze(E) % by weight | | | | | | |
|---|---|---|---|---|---|---|---|---|
| | | 16/15/16/53 | 18/15/16/51 | 20/15/16/49 | 22/15/16/47 | 24/15/16/45 | 26/15/16/43 | 28/15/16/41 |
| COP | | 1.26 | 1.26 | 1.26 | 1.26 | 1.26 | 1.26 | 1.26 |
| COP relative to Reference | | 104.6% | 104.8% | 104.9% | 105.0% | 105.1% | 105.2% | 105.2% |
| Achieved cooling capacity | kW | 1.83 | 1.91 | 1.99 | 2.07 | 2.15 | 2.23 | 2.31 |
| Capacity relative to reference | | 73.6% | 76.9% | 80.2% | 83.4% | 86.6% | 89.7% | 92.9% |
| Suction pressure drop relative to reference | | 70.0% | 71.8% | 73.5% | 75.2% | 76.8% | 78.4% | 79.9% |
| Pressure ratio | | 13.65 | 13.47 | 13.31 | 13.14 | 12.99 | 12.84 | 12.69 |
| Mass flow through evaporator | kg/hr | 46.5 | 47.7 | 48.8 | 49.9 | 51.0 | 52.0 | 53.0 |
| Liquid injection mass flow | kg/hr | 3.4 | 3.8 | 4.3 | 4.8 | 5.3 | 5.8 | 6.2 |
| Compressor discharge temperature | °C. | 130.0 | 130.0 | 130.0 | 130.0 | 130.0 | 130.0 | 130.0 |
| Evaporator glide (out-in) | K | 4.4 | 4.6 | 4.8 | 5.0 | 5.1 | 5.1 | 5.1 |
| Compressor suction pressure | bar | 0.98 | 1.03 | 1.07 | 1.11 | 1.16 | 1.20 | 1.25 |
| Compressor discharge pressure | bar | 13.4 | 13.8 | 14.2 | 14.7 | 15.1 | 15.5 | 15.9 |
| Condenser glide (in-out) | K | 8.5 | 8.5 | 8.5 | 8.4 | 8.2 | 8.0 | 7.8 |

TABLE 12

Theoretical Performance Data of Selected R-32/R-125/R-134a/R-1234ze(E) blends containing 30-40% R-32, 15% R-125 and 16% R-134a

| | | Composition R-32/R-125/R-134a/R-1234ze(E) % by weight | | | | | |
|---|---|---|---|---|---|---|---|
| | | 30/15/16/39 | 32/15/16/37 | 34/15/16/35 | 36/15/16/33 | 38/15/16/31 | 40/15/16/29 |
| COP | | 1.26 | 1.26 | 1.26 | 1.26 | 1.26 | 1.26 |
| COP relative to Reference | | 105.2% | 105.2% | 105.1% | 105.1% | 105.0% | 105.0% |
| Achieved cooling capacity | kW | 2.39 | 2.46 | 2.54 | 2.61 | 2.69 | 2.76 |
| Capacity relative to reference | | 96.0% | 99.1% | 102.1% | 105.1% | 108.1% | 111.0% |
| Suction pressure drop relative to reference | | 81.3% | 82.6% | 83.9% | 85.1% | 86.3% | 87.4% |
| Pressure ratio | | 12.55 | 12.41 | 12.28 | 12.15 | 12.03 | 11.91 |
| Mass flow through evaporator | kg/hr | 54.0 | 54.9 | 55.8 | 56.6 | 57.4 | 58.2 |
| Liquid injection mass flow | kg/hr | 6.7 | 7.2 | 7.7 | 8.3 | 8.8 | 9.3 |
| Compressor discharge temperature | °C. | 130.0 | 130.0 | 130.0 | 130.0 | 130.0 | 130.0 |
| Evaporator glide (out-in) | K | 5.1 | 5.1 | 5.0 | 4.9 | 4.7 | 4.6 |
| Compressor suction pressure | bar | 1.29 | 1.34 | 1.38 | 1.43 | 1.47 | 1.52 |
| Compressor discharge pressure | bar | 16.2 | 16.6 | 17.0 | 17.4 | 17.7 | 18.1 |
| Condenser glide (in-out) | K | 7.6 | 7.3 | 7.1 | 6.8 | 6.5 | 6.2 |

TABLE 13

Theoretical Performance Data of Selected R-32/R-125/R-134a/R-1234ze(E) blends containing 16-28% R-32, 15% R-125 and 20% R-134a

| | | Composition R-32/R-125/R-134a/R-1234ze(E) % by weight | | | | | | |
|---|---|---|---|---|---|---|---|---|
| | | 16/15/20/49 | 18/15/20/47 | 20/15/20/45 | 22/15/20/43 | 24/15/20/41 | 26/15/20/39 | 28/15/20/37 |
| COP | | 1.25 | 1.26 | 1.26 | 1.26 | 1.26 | 1.26 | 1.26 |
| COP relative to Reference | | 104.5% | 104.7% | 104.8% | 104.9% | 105.0% | 105.1% | 105.1% |
| Achieved cooling capacity | kW | 1.85 | 1.93 | 2.01 | 2.09 | 2.17 | 2.25 | 2.32 |
| Capacity relative to reference | | 74.4% | 77.6% | 80.8% | 84.0% | 87.2% | 90.3% | 93.5% |
| Suction pressure drop relative to reference | | 70.5% | 72.3% | 74.0% | 75.6% | 77.2% | 78.7% | 80.2% |
| Pressure ratio | | 13.60 | 13.43 | 13.26 | 13.10 | 12.95 | 12.80 | 12.65 |
| Mass flow through evaporator | kg/hr | 46.8 | 48.0 | 49.1 | 50.2 | 51.3 | 52.3 | 53.2 |
| Liquid injection mass flow | kg/hr | 3.5 | 4.0 | 4.4 | 4.9 | 5.4 | 5.9 | 6.4 |
| Compressor discharge temperature | °C. | 130.0 | 130.0 | 130.0 | 130.0 | 130.0 | 130.0 | 130.0 |
| Evaporator glide (out-in) | K | 4.1 | 4.4 | 4.6 | 4.7 | 4.8 | 4.8 | 4.9 |
| Compressor suction pressure | bar | 0.99 | 1.04 | 1.08 | 1.13 | 1.17 | 1.21 | 1.26 |
| Compressor discharge pressure | bar | 13.5 | 13.9 | 14.3 | 14.7 | 15.1 | 15.5 | 15.9 |
| Condenser glide (in-out) | K | 8.1 | 8.1 | 8.1 | 8.0 | 7.8 | 7.7 | 7.5 |

TABLE 14

Theoretical Performance Data of Selected R-32/R-125/R-134a/R-1234ze(E) blends containing 30-40% R-32, 15% R-125 and 20% R-134a

| | | Composition R-32/R-125/R-134a/R-1234ze(E) % by weight | | | | | |
|---|---|---|---|---|---|---|---|
| | | 30/15/20/35 | 32/15/20/33 | 34/15/20/31 | 36/15/20/29 | 38/15/20/27 | 40/15/20/25 |
| COP | | 1.26 | 1.26 | 1.26 | 1.26 | 1.26 | 1.26 |
| COP relative to Reference | | 105.1% | 105.1% | 105.0% | 105.0% | 105.0% | 104.9% |
| Achieved cooling capacity | kW | 2.40 | 2.48 | 2.55 | 2.62 | 2.70 | 2.77 |
| Capacity relative to reference | | 96.5% | 99.6% | 102.6% | 105.6% | 108.5% | 111.5% |
| Suction pressure drop relative to reference | | 81.5% | 82.9% | 84.1% | 85.3% | 86.4% | 87.4% |
| Pressure ratio | | 12.52 | 12.38 | 12.25 | 12.13 | 12.01 | 11.89 |
| Mass flow through evaporator | kg/hr | 54.2 | 55.1 | 55.9 | 56.8 | 57.5 | 58.3 |
| Liquid injection mass flow | kg/hr | 6.9 | 7.4 | 7.9 | 8.4 | 8.9 | 9.4 |
| Compressor discharge temperature | °C. | 130.0 | 130.0 | 130.0 | 130.0 | 130.0 | 130.0 |
| Evaporator glide (out-in) | K | 4.8 | 4.8 | 4.7 | 4.6 | 4.5 | 4.3 |
| Compressor suction pressure | bar | 1.30 | 1.35 | 1.39 | 1.44 | 1.48 | 1.53 |
| Compressor discharge pressure | bar | 16.3 | 16.7 | 17.1 | 17.4 | 17.8 | 18.1 |
| Condenser glide (in-out) | K | 7.2 | 7.0 | 6.7 | 6.5 | 6.2 | 5.9 |

TABLE 15

Theoretical Performance Data of Selected R-32/R-125/R-134a/R-1234ze(E) blends containing 16-28% R-32, 15% R-125 and 24% R-134a

| | | Composition R-32/R-125/R-134a/R-1234ze(E) % by weight | | | | | | |
|---|---|---|---|---|---|---|---|---|
| | | 16/15/24/45 | 18/15/24/43 | 20/15/24/41 | 22/15/24/39 | 24/15/24/37 | 26/15/24/35 | 28/15/24/33 |
| COP | | 1.25 | 1.26 | 1.26 | 1.26 | 1.26 | 1.26 | 1.26 |
| COP relative to Reference | | 104.4% | 104.6% | 104.7% | 104.8% | 104.9% | 105.0% | 105.0% |
| Achieved cooling capacity | kW | 1.87 | 1.95 | 2.02 | 2.10 | 2.18 | 2.26 | 2.34 |
| Capacity relative to reference | | 75.0% | 78.3% | 81.5% | 84.6% | 87.8% | 90.9% | 94.0% |
| Suction pressure drop relative to reference | | 71.0% | 72.8% | 74.4% | 76.0% | 77.6% | 79.0% | 80.4% |
| Pressure ratio | | 13.55 | 13.38 | 13.22 | 13.06 | 12.91 | 12.77 | 12.62 |
| Mass flow through evaporator | kg/hr | 47.2 | 48.3 | 49.4 | 50.5 | 51.5 | 52.5 | 53.4 |
| Liquid injection mass flow | kg/hr | 3.6 | 4.1 | 4.6 | 5.0 | 5.5 | 6.0 | 6.5 |
| Compressor discharge temperature | °C. | 130.0 | 130.0 | 130.0 | 130.0 | 130.0 | 130.0 | 130.0 |
| Evaporator glide (out-in) | K | 3.9 | 4.1 | 4.3 | 1.1 | 4.5 | 4.6 | 4.6 |
| Compressor suction pressure | bar | 1.00 | 1.05 | 1.09 | 1.14 | 1.18 | 1.22 | 1.27 |
| Compressor discharge pressure | bar | 13.6 | 14.0 | 14.4 | 14.8 | 15.2 | 15.6 | 16.0 |
| Condenser glide (in-out) | K | 7.7 | 7.8 | 7.7 | 7.6 | 7.5 | 7.3 | 7.1 |

TABLE 16

Theoretical Performance Data of Selected R-32/R-125/R-134a/R-1234ze(E) blends containing 30-40% R-32, 15% R-125 and 24% R-134a

| | | Composition R-32/R-125/R-134a/R-1234ze(E) % by weight | | | | | |
|---|---|---|---|---|---|---|---|
| | | 30/15/24/31 | 32/15/24/29 | 34/15/24/27 | 36/15/24/25 | 38/15/24/23 | 40/15/24/21 |
| COP | | 1.26 | 1.26 | 1.26 | 1.26 | 1.26 | 1.26 |
| COP relative to Reference | | 105.0% | 105.0% | 105.0% | 105.0% | 104.9% | 104.9% |
| Achieved cooling capacity | kW | 2.41 | 2.49 | 2.56 | 2.64 | 2.71 | 2.78 |
| Capacity relative to reference | | 97.1% | 100.1% | 103.1% | 106.0% | 109.0% | 111.9% |
| Suction pressure drop relative to reference | | 81.8% | 83.0% | 84.2% | 85.3% | 86.4% | 87.4% |
| Pressure ratio | | 12.49 | 12.35 | 12.23 | 12.10 | 11.98 | 11.87 |
| Mass flow through evaporator | kg/hr | 54.3 | 55.2 | 56.0 | 56.8 | 57.6 | 58.3 |
| Liquid injection mass flow | kg/hr | 7.0 | 7.5 | 8.0 | 8.5 | 9.0 | 9.5 |
| Compressor discharge temperature | °C. | 130.0 | 130.0 | 130.0 | 130.0 | 130.0 | 130.0 |
| Evaporator glide (out-in) | K | 4.6 | 4.5 | 4.4 | 4.3 | 4.2 | 4.1 |
| Compressor suction pressure | bar | 1.31 | 1.36 | 1.40 | 1.45 | 1.49 | 1.53 |
| Compressor discharge pressure | bar | 16.4 | 16.8 | 17.1 | 17.5 | 17.8 | 18.2 |
| Condenser glide (in-out) | K | 6.9 | 6.7 | 6.4 | 6.2 | 5.9 | 5.6 |

TABLE 17

Theoretical Performance Data of Selected R-32/R-125/R-134a/R-1234ze(E) blends containing 16-28% R-32, 15% R-125 and 28% R-134a

| | | Composition R-32/R-125/R-134a/R-1234ze(E) % by weight | | | | | | |
|---|---|---|---|---|---|---|---|---|
| | | 16/15/28/41 | 18/15/28/39 | 20/15/28/37 | 22/15/28/35 | 24/15/28/33 | 26/15/28/31 | 28/15/28/29 |
| COP | | 1.25 | 1.25 | 1.26 | 1.26 | 1.26 | 1.26 | 1.26 |
| COP relative to Reference | | 104.4% | 104.5% | 104.7% | 104.8% | 104.9% | 104.9% | 104.9% |
| Achieved cooling capacity | kW | 1.88 | 1.96 | 2.04 | 2.12 | 2.20 | 2.27 | 2.35 |
| Capacity relative to reference | | 75.7% | 78.9% | 82.1% | 85.2% | 88.4% | 91.5% | 94.5% |
| Suction pressure drop relative to reference | | 71.5% | 73.2% | 74.8% | 76.3% | 77.8% | 79.2% | 80.6% |
| Pressure ratio | | 13.50 | 13.34 | 13.18 | 13.03 | 12.88 | 12.73 | 12.59 |
| Mass flow through evaporator | kg/hr | 47.5 | 48.6 | 49.6 | 50.7 | 51.7 | 52.7 | 53.6 |
| Liquid injection mass flow | kg/hr | 3.8 | 4.2 | 4.7 | 5.2 | 5.7 | 6.2 | 6.6 |
| Compressor discharge temperature | °C. | 130.0 | 130.0 | 130.0 | 130.0 | 130.0 | 130.0 | 130.0 |
| Evaporator glide (out-in) | K | 3.7 | 3.9 | 4.1 | 4.2 | 4.3 | 4.3 | 4.3 |
| Compressor suction pressure | bar | 1.01 | 1.06 | 1.10 | 1.14 | 1.19 | 1.23 | 1.28 |
| Compressor discharge pressure | bar | 13.7 | 14.1 | 14.5 | 14.9 | 15.3 | 15.7 | 16.1 |
| Condenser glide (in-out) | K | 7.4 | 7.4 | 7.4 | 7.3 | 7.2 | 7.0 | 6.8 |

TABLE 18

Theoretical Performance Data of Selected R-32/R-125/R-134a/R-1234ze(E) blends containing 30-40% R-32, 15% R-125 and 28% R-134a

| | | Composition R-32/R-125/R-134a/R-1234ze(E) % by weight | | | | | |
|---|---|---|---|---|---|---|---|
| | | 30/15/28/27 | 32/15/28/25 | 34/15/28/23 | 36/15/28/21 | 38/15/28/19 | 40/15/28/17 |
| COP | | 1.26 | 1.26 | 1.26 | 1.26 | 1.26 | 1.26 |
| COP relative to Reference | | 105.0% | 105.0% | 105.0% | 104.9% | 104.9% | 104.9% |
| Achieved cooling capacity | kW | 2.42 | 2.50 | 2.57 | 2.65 | 2.72 | 2.79 |
| Capacity relative to reference | | 97.5% | 100.5% | 103.5% | 106.4% | 109.3% | 112.2% |
| Suction pressure drop relative to reference | | 81.9% | 83.1% | 84.3% | 85.4% | 86.4% | 87.3% |
| Pressure ratio | | 12.46 | 12.33 | 12.20 | 12.08 | 11.97 | 11.85 |
| Mass flow through evaporator | kg/hr | 54.5 | 55.3 | 56.1 | 56.9 | 57.6 | 58.3 |
| Liquid injection mass flow | kg/hr | 7.1 | 7.6 | 8.1 | 8.6 | 9.2 | 9.7 |
| Compressor discharge temperature | °C. | 130.0 | 130.0 | 130.0 | 130.0 | 130.0 | 130.0 |
| Evaporator glide (out-in) | K | 4.3 | 4.3 | 4.2 | 4.1 | 4.0 | 3.9 |
| Compressor suction pressure | bar | 1.32 | 1.36 | 1.41 | 1.45 | 1.50 | 1.54 |
| Compressor discharge pressure | bar | 16.5 | 16.8 | 17.2 | 17.5 | 17.9 | 18.2 |
| Condenser glide (in-out) | K | 6.6 | 6.4 | 6.2 | 5.9 | 5.7 | 5.4 |

TABLE 19

Theoretical Performance Data of Selected R-32/R-125/R-134a/R-1234ze(E) blends containing 16-28% R-32, 20% R-125 and 16% R-134a

| | | Composition R-32/R-125/R-134a/R-1234ze(E) % by weight | | | | | | |
|---|---|---|---|---|---|---|---|---|
| | | 16/20/16/48 | 18/20/16/46 | 20/20/16/44 | 22/20/16/42 | 24/20/16/40 | 26/20/16/38 | 28/20/16/36 |
| COP | | 1.25 | 1.25 | 1.25 | 1.25 | 1.25 | 1.25 | 1.25 |
| COP relative to Reference | | 103.8% | 104.0% | 104.1% | 104.2% | 104.2% | 104.2% | 104.3% |
| Achieved cooling capacity | kW | 1.91 | 1.99 | 2.07 | 2.15 | 2.23 | 2.31 | 2.39 |
| Capacity relative to reference | | 76.7% | 80.0% | 83.3% | 86.6% | 89.9% | 93.1% | 96.3% |
| Suction pressure drop relative to reference | | 74.4% | 76.2% | 78.0% | 79.7% | 81.4% | 83.0% | 84.5% |
| Pressure ratio | | 13.49 | 13.32 | 13.15 | 12.99 | 12.83 | 12.69 | 12.54 |
| Mass flow through evaporator | kg/hr | 49.2 | 50.4 | 51.6 | 52.7 | 53.8 | 54.9 | 55.9 |
| Liquid injection mass flow | kg/hr | 3.6 | 4.1 | 4.6 | 5.1 | 5.6 | 6.1 | 6.6 |
| Compressor discharge temperature | °C. | 130.0 | 130.0 | 130.0 | 130.0 | 130.0 | 130.0 | 130.0 |
| Evaporator glide (out-in) | K | 4.4 | 4.6 | 4.8 | 4.9 | 4.9 | 4.9 | 4.9 |
| Compressor suction pressure | bar | 1.03 | 1.08 | 1.12 | 1.17 | 1.22 | 1.26 | 1.31 |
| Compressor discharge pressure | bar | 13.9 | 14.3 | 14.8 | 15.2 | 15.6 | 16.0 | 16.4 |
| Condenser glide (in-out) | K | 8.3 | 8.2 | 8.1 | 8.0 | 7.8 | 7.6 | 7.3 |

TABLE 20

Theoretical Performance Data of Selected R-32/R-125/R-134a/R-1234ze(E) blends containing 30-40% R-32, 20% R-125 and 16% R-134a

| | | Composition R-32/R-125/R-134a/R-1234ze(E) % by weight | | | | | |
|---|---|---|---|---|---|---|---|
| | | 30/20/16/34 | 32/20/16/32 | 34/20/16/30 | 36/20/16/28 | 38/20/16/26 | 40/20/16/24 |
| COP | | 1.25 | 1.25 | 1.25 | 1.25 | 1.25 | 1.25 |
| COP relative to Reference | | 104.3% | 104.2% | 104.2% | 104.2% | 104.1% | 104.1% |
| Achieved cooling capacity | kW | 2.47 | 2.55 | 2.62 | 2.70 | 2.78 | 2.85 |
| Capacity relative to reference | | 99.4% | 102.5% | 105.6% | 108.7% | 111.7% | 114.7% |
| Suction pressure drop relative to reference | | 85.9% | 87.3% | 88.5% | 89.8% | 90.9% | 92.0% |
| Pressure ratio | | 12.40 | 12.27 | 12.14 | 12.01 | 11.89 | 11.77 |
| Mass flow through evaporator | kg/hr | 56.8 | 57.8 | 58.7 | 59.5 | 60.4 | 61.1 |
| Liquid injection mass flow | kg/hr | 7.1 | 7.7 | 8.2 | 8.7 | 9.2 | 9.8 |
| Compressor discharge temperature | °C. | 130.0 | 130.0 | 130.0 | 130.0 | 130.0 | 130.0 |
| Evaporator glide (out-in) | K | 4.8 | 4.7 | 4.6 | 4.5 | 4.3 | 4.1 |
| Compressor suction pressure | bar | 1.35 | 1.40 | 1.45 | 1.49 | 1.54 | 1.59 |
| Compressor discharge pressure | bar | 16.8 | 17.2 | 17.6 | 17.9 | 18.3 | 18.7 |
| Condenser glide (in-out) | K | 7.1 | 6.8 | 6.5 | 6.2 | 5.9 | 5.6 |

20

TABLE 21

Theoretical Performance Data of Selected R-32/R-125/R-134a/R-1234ze(E) blends containing 16-28% R-32, 20% R-125 and 20% R-134a

| | | Composition R-32/R-125/R-134a/R-1234ze(E) % by weight | | | | | | |
|---|---|---|---|---|---|---|---|---|
| | | 16/20/20/44 | 18/20/20/42 | 20/20/20/40 | 22/20/20/38 | 24/20/20/36 | 26/20/20/34 | 28/20/20/32 |
| COP | | 1.24 | 1.25 | 1.25 | 1.25 | 1.25 | 1.25 | 1.25 |
| COP relative to Reference | | 103.7% | 103.9% | 104.0% | 104.1% | 104.1% | 104.2% | 104.2% |
| Achieved cooling capacity | kW | 1.92 | 2.01 | 2.09 | 2.17 | 2.25 | 2.33 | 2.41 |
| Capacity relative to reference | | 77.4% | 80.7% | 84.0% | 87.3% | 90.5% | 93.7% | 96.8% |
| Suction pressure drop relative to reference | | 74.9% | 76.7% | 78.5% | 80.2% | 81.8% | 83.3% | 84.7% |
| Pressure ratio | | 13.44 | 13.27 | 13.11 | 12.95 | 12.80 | 12.65 | 12.51 |
| Mass flow through evaporator | kg/hr | 49.5 | 50.7 | 51.9 | 53.0 | 54.1 | 55.1 | 56.1 |
| Liquid injection mass flow | kg/hr | 3.7 | 4.2 | 4.7 | 5.2 | 5.7 | 6.2 | 6.7 |
| Compressor discharge temperature | °C. | 130.0 | 130.0 | 130.0 | 130.0 | 130.0 | 130.0 | 130.0 |
| Evaporator glide (out-in) | K | 4.2 | 4.3 | 4.5 | 4.6 | 4.6 | 4.6 | 4.6 |
| Compressor suction pressure | bar | 1.04 | 1.09 | 1.13 | 1.18 | 1.23 | 1.27 | 1.32 |
| Compressor discharge pressure | bar | 14.0 | 14.4 | 14.9 | 15.3 | 15.7 | 16.1 | 16.5 |
| Condenser glide (in-out) | K | 7.9 | 7.8 | 7.7 | 7.6 | 7.4 | 7.2 | 7.0 |

TABLE 22

Theoretical Performance Data of Selected R-32/R-125/R-134a/R-1234ze(E) blends containing 30-40% R-32, 20% R-125 and 20% R-134a

| | | Composition R-32/R-125/R-134a/R-1234ze(E) % by weight | | | | | |
|---|---|---|---|---|---|---|---|
| | | 30/20/20/30 | 32/20/20/28 | 34/20/20/26 | 36/20/20/24 | 38/20/20/22 | 40/20/20/20 |
| COP | | 1.25 | 1.25 | 1.25 | 1.25 | 1.25 | 1.25 |
| COP relative to Reference | | 104.2% | 104.2% | 104.1% | 104.1% | 104.1% | 104.0% |
| Achieved cooling capacity | kW | 2.48 | 2.56 | 2.64 | 2.71 | 2.79 | 2.86 |
| Capacity relative to reference | | 100.0% | 103.1% | 106.1% | 109.2% | 112.1% | 115.1% |
| Suction pressure drop relative to reference | | 86.1% | 87.4% | 88.7% | 89.9% | 91.0% | 92.1% |
| Pressure ratio | | 12.37 | 12.24 | 12.11 | 11.98 | 11.87 | 11.75 |
| Mass flow through evaporator | kg/hr | 57.0 | 57.9 | 58.8 | 59.6 | 60.4 | 61.2 |
| Liquid injection mass flow | kg/hr | 7.3 | 7.8 | 8.3 | 8.9 | 9.4 | 9.9 |
| Compressor discharge temperature | °C. | 130.0 | 130.0 | 130.0 | 130.0 | 130.0 | 130.0 |
| Evaporator glide (out-in) | K | 4.6 | 4.5 | 4.3 | 4.2 | 4.1 | 3.9 |
| Compressor suction pressure | bar | 1.36 | 1.41 | 1.46 | 1.50 | 1.55 | 1.59 |
| Compressor discharge pressure | bar | 16.9 | 17.3 | 17.6 | 18.0 | 18.4 | 18.7 |
| Condenser glide (in-out) | K | 6.7 | 6.5 | 6.2 | 5.9 | 5.6 | 5.3 |

TABLE 23

Theoretical Performance Data of Selected R-32/R-125/R-134a/R-1234ze(E) blends containing 16-28% R-32, 20% R-125 and 24% R-134a

| | | Composition R-32/R-125/R-134a/R-1234ze(E) % by weight | | | | | | |
|---|---|---|---|---|---|---|---|---|
| | | 16/20/24/40 | 18/20/24/38 | 20/20/24/36 | 22/20/24/34 | 24/20/24/32 | 26/20/24/30 | 28/20/24/28 |
| COP | | 1.24 | 1.24 | 1.25 | 1.25 | 1.25 | 1.25 | 1.25 |
| COP relative to Reference | | 103.6% | 103.8% | 103.9% | 104.0% | 104.0% | 104.1% | 104.1% |
| Achieved cooling capacity | kW | 1.94 | 2.02 | 2.10 | 2.18 | 2.26 | 2.34 | 2.42 |
| Capacity relative to reference | | 78.1% | 81.4% | 84.6% | 87.9% | 91.1% | 94.2% | 97.4% |
| Suction pressure drop relative to reference | | 75.4% | 77.2% | 78.9% | 80.5% | 82.1% | 83.5% | 85.0% |
| Pressure ratio | | 13.39 | 13.23 | 13.07 | 12.91 | 12.76 | 12.62 | 12.48 |
| Mass flow through evaporator | kg/hr | 49.8 | 51.0 | 52.1 | 53.2 | 54.3 | 55.3 | 56.2 |
| Liquid injection mass flow | kg/hr | 3.8 | 4.3 | 4.8 | 5.3 | 5.9 | 6.4 | 6.9 |
| Compressor discharge temperature | ° C. | 130.0 | 130.0 | 130.0 | 130.0 | 130.0 | 130.0 | 130.0 |
| Evaporator glide (out-in) | K | 3.9 | 4.1 | 4.2 | 4.3 | 4.4 | 4.4 | 4.3 |
| Compressor suction pressure | bar | 1.05 | 1.10 | 1.14 | 1.19 | 1.24 | 1.28 | 1.33 |
| Compressor discharge pressure | bar | 14.1 | 14.5 | 14.9 | 15.4 | 15.8 | 16.2 | 16.6 |
| Condenser glide (in-out) | K | 7.5 | 7.5 | 7.4 | 7.2 | 7.1 | 6.9 | 6.7 |

TABLE 24

Theoretical Performance Data of Selected R-32/R-125/R-134a/R-1234ze(E) blends containing 30-40% R-32, 20% R-125 and 24% R-134a

| | | Composition R-32/R-125/R-134a/R-1234ze(E) % by weight | | | | | |
|---|---|---|---|---|---|---|---|
| | | 30/20/24/26 | 32/20/24/24 | 34/20/24/22 | 36/20/24/20 | 38/20/24/18 | 40/20/24/16 |
| COP | | 1.25 | 1.25 | 1.25 | 1.25 | 1.25 | 1.25 |
| COP relative to Reference | | 104.1% | 104.1% | 104.1% | 104.1% | 104.1% | 104.0% |
| Achieved cooling capacity | kW | 2.50 | 2.57 | 2.65 | 2.72 | 2.80 | 2.87 |
| Capacity relative to reference | | 100.5% | 103.5% | 106.6% | 109.6% | 112.5% | 115.5% |
| Suction pressure drop relative to reference | | 86.3% | 87.6% | 88.8% | 89.9% | 91.0% | 92.0% |
| Pressure ratio | | 12.34 | 12.21 | 12.08 | 11.96 | 11.85 | 11.73 |
| Mass flow through evaporator | kg/hr | 57.2 | 58.0 | 58.9 | 59.7 | 60.5 | 61.2 |
| Liquid injection mass flow | kg/hr | 7.4 | 7.9 | 8.5 | 9.0 | 9.5 | 10.0 |
| Compressor discharge temperature | ° C. | 130.0 | 130.0 | 130.0 | 130.0 | 130.0 | 130.0 |
| Evaporator glide (out-in) | K | 4.3 | 4.2 | 4.1 | 4.0 | 3.8 | 3.7 |
| Compressor suction pressure | bar | 1.37 | 1.42 | 1.46 | 1.51 | 1.55 | 1.60 |
| Compressor discharge pressure | bar | 16.9 | 17.3 | 17.7 | 18.0 | 18.4 | 18.8 |
| Condenser glide (in-out) | K | 6.4 | 6.2 | 5.9 | 5.7 | 5.4 | 5.1 |

TABLE 25

Theoretical Performance Data of Selected R-32/R-125/R-134a/R-1234ze(E) blends containing 16-28% R-32, 20% R-125 and 28% R-134a

| | | Composition R-32/R-125/R-134a/R-1234ze(E) % by weight | | | | | | |
|---|---|---|---|---|---|---|---|---|
| | | 16/20/28/36 | 18/20/28/34 | 20/20/28/32 | 22/20/28/30 | 24/20/28/28 | 26/20/28/26 | 28/20/28/24 |
| COP | | 1.24 | 1.24 | 1.25 | 1.25 | 1.25 | 1.25 | 1.25 |
| COP relative to Reference | | 103.5% | 103.7% | 103.8% | 103.9% | 104.0% | 104.0% | 104.1% |
| Achieved cooling capacity | kW | 1.96 | 2.04 | 2.12 | 2.20 | 2.28 | 2.35 | 2.43 |
| Capacity relative to reference | | 78.7% | 82.0% | 85.2% | 88.4% | 91.6% | 94.7% | 97.9% |
| Suction pressure drop relative to reference | | 75.9% | 77.6% | 79.2% | 80.8% | 82.3% | 83.7% | 85.1% |
| Pressure ratio | | 13.35 | 13.19 | 13.03 | 12.88 | 12.73 | 12.59 | 12.45 |
| Mass flow through evaporator | kg/hr | 50.1 | 51.3 | 52.4 | 53.4 | 54.4 | 55.4 | 56.4 |
| Liquid injection mass flow | kg/hr | 4.0 | 4.5 | 5.0 | 5.5 | 6.0 | 6.5 | 7.0 |
| Compressor discharge temperature | ° C. | 130.0 | 130.0 | 130.0 | 130.0 | 130.0 | 130.0 | 130.0 |
| Evaporator glide (out-in) | K | 3.7 | 3.9 | 4.0 | 4.1 | 4.1 | 4.1 | 4.1 |
| Compressor suction pressure | bar | 1.06 | 1.11 | 1.15 | 1.20 | 1.24 | 1.29 | 1.33 |

TABLE 25-continued

Theoretical Performance Data of Selected R-32/R-125/R-134a/R-1234ze(E) blends containing 16-28% R-32, 20% R-125 and 28% R-134a Composition R-32/R-125/R-134a/R-1234ze(E) % by weight

| | | 16/20/28/36 | 18/20/28/34 | 20/20/28/32 | 22/20/28/30 | 24/20/28/28 | 26/20/28/26 | 28/20/28/24 |
|---|---|---|---|---|---|---|---|---|
| Compressor discharge pressure | bar | 14.2 | 14.6 | 15.0 | 15.4 | 15.8 | 16.2 | 16.6 |
| Condenser glide (in-out) | K | 7.2 | 7.1 | 7.0 | 6.9 | 6.8 | 6.6 | 6.4 |

TABLE 26

Theoretical Performance Data of Selected R-32/R-125/R-134a/R-1234ze(E) blends containing 30-40% R-32, 20% R-125 and 28% R-134a Composition R-32/R-125/R-134a/R-1234ze(E) % by weight

| | | 30/20/28/22 | 32/20/28/20 | 34/20/28/18 | 36/20/28/16 | 38/20/28/14 | 40/20/28/12 |
|---|---|---|---|---|---|---|---|
| COP | | 1.25 | 1.25 | 1.25 | 1.25 | 1.25 | 1.25 |
| COP relative to Reference | | 104.1% | 104.1% | 104.1% | 104.1% | 104.1% | 104.0% |
| Achieved cooling capacity | kW | 2.51 | 2.58 | 2.66 | 2.73 | 2.81 | 2.88 |
| Capacity relative to reference | | 100.9% | 104.0% | 107.0% | 109.9% | 112.9% | 115.8% |
| Suction pressure drop relative to reference | | 86.4% | 87.6% | 88.8% | 89.8% | 90.8% | 91.8% |
| Pressure ratio | | 12.32 | 12.19 | 12.07 | 11.95 | 11.83 | 11.72 |
| Mass flow through evaporator | kg/hr | 57.2 | 58.1 | 58.9 | 59.7 | 60.4 | 61.1 |
| Liquid injection mass flow | kg/hr | 7.5 | 8.1 | 8.6 | 9.1 | 9.6 | 10.2 |
| Compressor discharge temperature | °C. | 130.0 | 130.0 | 130.0 | 130.0 | 130.0 | 130.0 |
| Evaporator glide (out-in) | K | 4.1 | 4.0 | 3.9 | 3.8 | 3.6 | 3.5 |
| Compressor suction pressure | bar | 1.38 | 1.43 | 1.47 | 1.51 | 1.56 | 1.60 |
| Compressor discharge pressure | bar | 17.0 | 17.4 | 17.7 | 18.1 | 18.5 | 18.8 |
| Condenser glide (in-out) | K | 6.2 | 5.9 | 5.7 | 5.4 | 5.2 | 4.9 |

TABLE 27

Theoretical Performance Data of Selected R-32/R-125/R-134a/R-1234ze(E) blends containing 16-28% R-32, 24% R-125 and 16% R-134a Composition R-32/R-125/R-134a/R-1234ze(E) % by weight

| | | 16/24/16/44 | 18/24/16/42 | 20/24/16/40 | 22/24/16/38 | 24/24/16/36 | 26/24/16/34 | 28/24/16/32 |
|---|---|---|---|---|---|---|---|---|
| COP | | 1.24 | 1.24 | 1.24 | 1.24 | 1.24 | 1.24 | 1.24 |
| COP relative to Reference | | 103.1% | 103.2% | 103.3% | 103.4% | 103.5% | 103.5% | 103.5% |
| Achieved cooling capacity | kW | 1.97 | 2.05 | 2.14 | 2.22 | 2.30 | 2.38 | 2.46 |
| Capacity relative to reference | | 79.2% | 82.6% | 85.9% | 89.3% | 92.6% | 95.8% | 99.0% |
| Suction pressure drop relative to reference | | 78.2% | 80.1% | 81.9% | 83.6% | 85.3% | 86.9% | 88.4% |
| Pressure ratio | | 13.36 | 13.19 | 13.02 | 12.86 | 12.71 | 12.56 | 12.42 |
| Mass flow through evaporator | kg/hr | 51.5 | 52.7 | 53.9 | 55.1 | 56.2 | 57.2 | 58.3 |
| Liquid injection mass flow | kg/hr | 3.8 | 4.3 | 4.8 | 5.3 | 5.8 | 6.4 | 6.9 |
| Compressor discharge temperature | °C. | 130.0 | 130.0 | 130.0 | 130.0 | 130.0 | 130.0 | 130.0 |
| Evaporator glide (out-in) | K | 4.4 | 4.6 | 4.7 | 4.7 | 4.7 | 4.7 | 4.7 |
| Compressor suction pressure | bar | 1.07 | 1.12 | 1.17 | 1.21 | 1.26 | 1.31 | 1.36 |
| Compressor discharge pressure | bar | 14.3 | 14.8 | 15.2 | 15.6 | 16.0 | 16.5 | 16.9 |
| Condenser glide (in-out) | K | 8.0 | 7.9 | 7.8 | 7.6 | 7.4 | 7.2 | 6.9 |

TABLE 28

Theoretical Performance Data of Selected R-32/R-125/R-134a/R-1234ze(E) blends containing 30-40% R-32, 24% R-125 and 16% R-134a

| | | Composition R-32/R-125/R-134a/R-1234ze(E) % by weight | | | | | |
|---|---|---|---|---|---|---|---|
| | | 30/24/16/30 | 32/24/16/28 | 34/24/16/26 | 36/24/16/24 | 38/24/16/22 | 40/24/16/20 |
| COP | | 1.24 | 1.24 | 1.24 | 1.24 | 1.24 | 1.24 |
| COP relative to Reference | | 103.5% | 103.5% | 103.4% | 103.4% | 103.4% | 103.3% |
| Achieved cooling capacity | kW | 2.54 | 2.62 | 2.70 | 2.77 | 2.85 | 2.93 |
| Capacity relative to reference | | 102.2% | 105.4% | 108.5% | 111.6% | 114.7% | 117.7% |
| Suction pressure drop relative to reference | | 89.8% | 91.2% | 92.5% | 93.8% | 94.9% | 96.0% |
| Pressure ratio | | 12.28 | 12.15 | 12.02 | 11.89 | 11.77 | 11.65 |
| Mass flow through evaporator | kg/hr | 59.3 | 60.2 | 61.1 | 62.0 | 62.8 | 63.6 |
| Liquid injection mass flow | kg/hr | 7.5 | 8.0 | 8.6 | 9.1 | 9.7 | 10.2 |
| Compressor discharge temperature | °C. | 130.0 | 130.0 | 130.0 | 130.0 | 130.0 | 130.0 |
| Evaporator glide (out-in) | K | 4.6 | 4.4 | 4.3 | 4.1 | 3.9 | 3.7 |
| Compressor suction pressure | bar | 1.40 | 1.45 | 1.50 | 1.55 | 1.60 | 1.64 |
| Compressor discharge pressure | bar | 17.3 | 17.6 | 18.0 | 18.4 | 18.8 | 19.1 |
| Condenser glide (in-out) | K | 6.6 | 6.3 | 6.0 | 5.7 | 5.4 | 5.1 |

TABLE 29

Theoretical Performance Data of Selected R-32/R-125/R-134a/R-1234ze(E) blends containing 16-28% R-32, 24% R-125 and 20% R-134a

| | | Composition R-32/R-125/R-134a/R-1234ze(E) % by weight | | | | | | |
|---|---|---|---|---|---|---|---|---|
| | | 16/24/20/40 | 18/24/20/38 | 20/24/20/26 | 22/24/20/34 | 24/24/20/32 | 26/24/20/30 | 28/24/20/28 |
| COP | | 1.24 | 1.24 | 1.24 | 1.24 | 1.24 | 1.24 | 1.24 |
| COP relative to Reference | | 103.0% | 103.1% | 103.2% | 103.3% | 103.4% | 103.4% | 103.4% |
| Achieved cooling capacity | kW | 1.99 | 2.07 | 2.15 | 2.23 | 2.32 | 2.40 | 2.48 |
| Capacity relative to reference | | 79.9% | 83.3% | 86.6% | 89.9% | 93.2% | 96.4% | 99.6% |
| Suction pressure drop relative to reference | | 78.7% | 80.5% | 82.3% | 84.0% | 85.6% | 87.2% | 88.6% |
| Pressure ratio | | 13.31 | 13.14 | 12.98 | 12.82 | 12.67 | 12.53 | 12.39 |
| Mass flow through evaporator | kg/hr | 51.8 | 53.0 | 54.2 | 55.3 | 56.4 | 57.5 | 58.5 |
| Liquid injection mass flow | kg/hr | 3.9 | 4.4 | 4.9 | 5.4 | 6.0 | 6.5 | 7.1 |
| Compressor discharge temperature | °C. | 130.0 | 130.0 | 130.0 | 130.0 | 130.0 | 130.0 | 130.0 |
| Evaporator glide (out-in) | K | 4.1 | 4.3 | 4.4 | 4.4 | 1.1 | 4.4 | 4.4 |
| Compressor suction pressure | bar | 1.08 | 1.13 | 1.18 | 1.23 | 1.27 | 1.32 | 1.37 |
| Compressor discharge pressure | bar | 14.4 | 14.9 | 15.3 | 15.7 | 16.1 | 16.5 | 16.9 |
| Condenser glide (in-out) | K | 7.6 | 7.5 | 7.4 | 7.2 | 7.0 | 6.8 | 6.6 |

TABLE 30

Theoretical Performance Data of Selected R-32/R-125/R-134a/R-1234ze(E) blends containing 30-40% R-32, 24% R-125 and 20% R-134a

| | | Composition R-32/R-125/R-134a/R-1234ze(E) % by weight | | | | | |
|---|---|---|---|---|---|---|---|
| | | 30/24/20/26 | 32/24/20/24 | 34/24/20/22 | 36/24/20/20 | 38/24/20/18 | 40/24/20/16 |
| COP | | 1.24 | 1.24 | 1.24 | 1.24 | 1.24 | 1.24 |
| COP relative to Reference | | 103.4% | 103.4% | 103.4% | 103.4% | 103.3% | 103.3% |
| Achieved cooling capacity | kW | 2.55 | 2.63 | 2.71 | 2.79 | 2.86 | 2.94 |
| Capacity relative to reference | | 102.8% | 105.9% | 109.0% | 112.1% | 115.1% | 118.1% |
| Suction pressure drop relative to reference | | 90.0% | 91.4% | 92.6% | 93.8% | 94.9% | 96.0% |
| Pressure ratio | | 12.25 | 12.12 | 11.99 | 11.87 | 11.75 | 11.63 |
| Mass flow through evaporator | kg/hr | 59.4 | 60.3 | 61.2 | 62.1 | 62.9 | 63.6 |
| Liquid injection mass flow | kg/hr | 7.6 | 8.2 | 8.7 | 9.2 | 9.8 | 10.3 |
| Compressor discharge temperature | °C. | 130.0 | 130.0 | 130.0 | 130.0 | 130.0 | 130.0 |
| Evaporator glide (out-in) | K | 4.3 | 4.2 | 4.0 | 3.9 | 3.7 | 3.5 |
| Compressor suction pressure | bar | 1.41 | 1.46 | 1.51 | 1.56 | 1.60 | 1.65 |
| Compressor discharge pressure | bar | 17.3 | 17.7 | 18.1 | 18.5 | 18.8 | 19.2 |
| Condenser glide (in-out) | K | 6.3 | 6.0 | 5.7 | 5.5 | 5.2 | 4.9 |

TABLE 31

Theoretical Performance Data of Selected R-32/R-125/R-134a/R-1234ze(E) blends containing 16-28% R-32, 24% R-125 and 24% R-134a

| | | Composition R-32/R-125/R-134a/R-1234ze(E) % by weight | | | | | | |
|---|---|---|---|---|---|---|---|---|
| | | 16/24/24/36 | 18/24/24/34 | 20/24/24/32 | 22/24/24/30 | 24/24/24/28 | 26/24/24/26 | 28/24/24/24 |
| COP | | 1.23 | 1.24 | 1.24 | 1.24 | 1.24 | 1.24 | 1.24 |
| COP relative to Reference | | 102.9% | 103.0% | 103.2% | 103.2% | 103.3% | 103.3% | 103.4% |
| Achieved cooling capacity | kW | 2.00 | 2.09 | 2.17 | 2.25 | 2.33 | 2.41 | 2.49 |
| Capacity relative to reference | | 80.6% | 83.9% | 87.2% | 90.5% | 93.7% | 96.9% | 100.1% |
| Suction pressure drop relative to reference | | 79.2% | 81.0% | 82.7% | 84.3% | 85.9% | 87.4% | 88.8% |
| Pressure ratio | | 13.26 | 13.10 | 12.94 | 12.79 | 12.64 | 12.50 | 12.36 |
| Mass flow through evaporator | kg/hr | 52.1 | 53.3 | 54.5 | 55.6 | 56.6 | 57.6 | 58.6 |
| Liquid injection mass flow | kg/hr | 4.0 | 4.5 | 5.1 | 5.6 | 6.1 | 6.7 | 7.2 |
| Compressor discharge temperature | °C. | 130.0 | 130.0 | 130.0 | 130.0 | 130.0 | 130.0 | 130.0 |
| Evaporator glide (out-in) | K | 3.9 | 4.0 | 4.1 | 4.2 | 4.2 | 4.2 | 4.1 |
| Compressor suction pressure | bar | 1.09 | 1.14 | 1.19 | 1.23 | 1.28 | 1.33 | 1.38 |
| Compressor discharge pressure | bar | 14.5 | 15.0 | 15.4 | 15.8 | 16.2 | 16.6 | 17.0 |
| Condenser glide (in-out) | K | 7.3 | 7.2 | 7.1 | 6.9 | 6.7 | 6.5 | 6.3 |

TABLE 32

Theoretical Performance Data of Selected R-32/R-125/R-134a/R-1234ze(E) blends containing 30-40% R-32, 24% R-125 and 24% R-134a

| | | Composition R-32/R-125/R-134a/R-1234ze(E) % by weight | | | | | |
|---|---|---|---|---|---|---|---|
| | | 30/24/24/22 | 32/24/24/20 | 34/24/24/18 | 36/24/24/16 | 38/24/24/14 | 40/24/24/12 |
| COP | | 1.24 | 1.24 | 1.24 | 1.24 | 1.24 | 1.24 |
| COP relative to Reference | | 103.4% | 103.4% | 103.4% | 103.4% | 103.3% | 103.3% |
| Achieved cooling capacity | kW | 2.57 | 2.64 | 2.72 | 2.80 | 2.87 | 2.94 |
| Capacity relative to reference | | 103.3% | 106.4% | 109.4% | 112.5% | 115.5% | 118.4% |
| Suction pressure drop relative to reference | | 90.2% | 91.4% | 92.6% | 93.8% | 94.8% | 95.8% |
| Pressure ratio | | 12.22 | 12.09 | 11.97 | 11.85 | 11.73 | 11.62 |
| Mass flow through evaporator | kg/hr | 59.5 | 60.4 | 61.3 | 62.1 | 62.9 | 63.6 |
| Liquid injection mass flow | kg/hr | 7.7 | 8.3 | 8.8 | 9.4 | 9.9 | 10.5 |
| Compressor discharge temperature | °C. | 130.0 | 130.0 | 130.0 | 130.0 | 130.0 | 130.0 |
| Evaporator glide (out-in) | K | 4.0 | 3.9 | 3.8 | 3.7 | 3.5 | 3.3 |
| Compressor suction pressure | bar | 1.42 | 1.47 | 1.52 | 1.56 | 1.61 | 1.65 |
| Compressor discharge pressure | bar | 17.4 | 17.8 | 18.1 | 18.5 | 18.9 | 19.2 |
| Condenser glide (in-out) | K | 6.0 | 5.8 | 5.5 | 5.2 | 4.9 | 4.7 |

TABLE 33

Theoretical Performance Data of Selected R-32/R-125/R-134a/R-1234ze(E) blends containing 16-28% R-32, 24% R-125 and 28% R-134a

| | | Composition R-32/R-125/R-134a/R-1234ze(E) % by weight | | | | | | |
|---|---|---|---|---|---|---|---|---|
| | | 16/24/28/32 | 18/24/28/30 | 20/24/28/28 | 22/24/28/26 | 24/24/28/24 | 26/24/28/22 | 28/24/28/20 |
| COP | | 1.23 | 1.24 | 1.24 | 1.24 | 1.24 | 1.24 | 1.24 |
| COP relative to Reference | | 102.8% | 103.0% | 103.1% | 103.2% | 103.3% | 103.3% | 103.3% |
| Achieved cooling capacity | kW | 2.02 | 2.10 | 2.18 | 2.26 | 2.34 | 2.42 | 2.50 |
| Capacity relative to reference | | 81.2% | 84.5% | 87.8% | 91.1% | 94.3% | 97.4% | 100.6% |
| Suction pressure drop relative to reference | | 79.6% | 81.3% | 83.0% | 84.6% | 86.1% | 87.5% | 88.9% |
| Pressure ratio | | 13.22 | 13.06 | 12.91 | 12.76 | 12.61 | 12.47 | 12.33 |
| Mass flow through evaporator | kg/hr | 52.4 | 53.6 | 54.7 | 55.7 | 56.8 | 57.8 | 58.7 |
| Liquid injection mass flow | kg/hr | 4.2 | 4.7 | 5.2 | 5.7 | 6.3 | 6.8 | 7.3 |
| Compressor discharge temperature | °C. | 130.0 | 130.0 | 130.0 | 130.0 | 130.0 | 130.0 | 130.0 |
| Evaporator glide (out-in) | K | 3.7 | 3.8 | 3.9 | 3.9 | 3.9 | 3.9 | 3.9 |
| Compressor suction pressure | bar | 1.10 | 1.15 | 1.20 | 1.24 | 1.29 | 1.34 | 1.38 |
| Compressor discharge pressure | bar | 14.6 | 15.0 | 15.5 | 15.9 | 16.3 | 16.7 | 17.1 |
| Condenser glide (in-out) | K | 6.9 | 6.8 | 6.7 | 6.6 | 6.4 | 6.2 | 6.0 |

TABLE 34

Theoretical Performance Data of Selected R-32/R-125/R-134a/R-1234ze(E) blends containing 30-40% R-32, 24% R-125 and 28% R-134a

| | | Composition R-32/R-125/R-134a/R-1234ze(E) % by weight | | | | | |
|---|---|---|---|---|---|---|---|
| | | 30/24/28/18 | 32/24/28/16 | 34/24/28/14 | 36/24/28/12 | 38/24/28/10 | 40/24/28/8 |
| COP | | 1.24 | 1.24 | 1.24 | 1.24 | 1.24 | 1.24 |
| COP relative to Reference | | 103.4% | 103.4% | 103.4% | 103.4% | 103.3% | 103.3% |
| Achieved cooling capacity | kW | 2.58 | 2.65 | 2.73 | 2.80 | 2.88 | 2.95 |
| Capacity relative to reference | | 103.7% | 106.8% | 109.8% | 112.8% | 115.8% | 118.7% |
| Suction pressure drop relative to reference | | 90.2% | 91.4% | 92.5% | 93.6% | 94.6% | 95.6% |
| Pressure ratio | | 12.20 | 12.07 | 11.95 | 11.83 | 11.72 | 11.61 |
| Mass flow through evaporator | kg/hr | 59.6 | 60.5 | 61.3 | 62.1 | 62.8 | 63.5 |
| Liquid injection mass flow | kg/hr | 7.9 | 8.4 | 9.0 | 9.5 | 10.1 | 10.6 |
| Compressor discharge temperature | ° C. | 130.0 | 130.0 | 130.0 | 130.0 | 130.0 | 130.0 |
| Evaporator glide (out-in) | K | 3.8 | 3.7 | 3.6 | 3.5 | 3.3 | 3.2 |
| Compressor suction pressure | bar | 1.43 | 1.48 | 1.52 | 1.57 | 1.61 | 1.66 |
| Compressor discharge pressure | bar | 17.4 | 17.8 | 18.2 | 18.6 | 18.9 | 19.3 |
| Condenser glide (in-out) | K | 5.8 | 5.5 | 5.3 | 5.0 | 4.8 | 4.5 |

TABLE 35

Theoretical Performance Data of Selected R-32/R-161/R-134a/R-1234ze(E) blends containing 20% R-32, 10-20% R-161 and 10% R-134a

| | | Composition R-32/R-161/R-134a/R-1234ze(E) % by weight | | | | | |
|---|---|---|---|---|---|---|---|
| | | 20/10/10/60 | 20/12/10/58 | 20/14/10/56 | 20/16/10/54 | 20/18/10/52 | 20/20/10/50 |
| COP | | 1.30 | 1.31 | 1.31 | 1.31 | 1.31 | 1.31 |
| COP relative to Reference | | 108.7% | 108.9% | 109.1% | 109.2% | 109.4% | 109.5% |
| Achieved cooling capacity | kW | 1.98 | 2.02 | 2.07 | 2.11 | 2.15 | 2.19 |
| Capacity relative to reference | | 79.5% | 81.3% | 83.1% | 84.8% | 86.5% | 88.1% |
| Suction pressure drop relative to reference | | 63.0% | 63.3% | 63.7% | 63.9% | 64.2% | 64.4% |
| Pressure ratio | | 13.17 | 13.04 | 12.92 | 12.81 | 12.69 | 12.58 |
| Mass flow through evaporator | kg/hr | 41.95 | 42.10 | 42.23 | 42.34 | 42.45 | 42.54 |
| Liquid injection mass flow | kg/hr | 4.32 | 4.47 | 4.62 | 4.76 | 4.90 | 5.03 |
| Compressor discharge temperature | ° C. | 130.0 | 130.0 | 130.0 | 130.0 | 130.0 | 130.0 |
| Evaporator glide (out-in) | K | 5.5 | 5.5 | 5.6 | 5.6 | 5.6 | 5.6 |
| Compressor suction pressure | bar | 1.03 | 1.05 | 1.07 | 1.09 | 1.11 | 1.13 |
| Compressor discharge pressure | bar | 13.5 | 13.7 | 13.8 | 14.0 | 14.1 | 14.2 |
| Condenser glide (in-out) | K | 9.5 | 9.4 | 9.2 | 9.1 | 8.9 | 8.8 |

TABLE 36

Theoretical Performance Data of Selected R-32/R-161/R-134a/R-1234ze(E) blends containing 20% R-32, 22-32% R-161 and 10% R-134a

| | | Composition R-32/R-161/R-134a/R-1234ze(E) % by weight | | | | | |
|---|---|---|---|---|---|---|---|
| | | 20/22/10/48 | 20/24/10/46 | 20/26/10/44 | 20/28/10/42 | 20/30/10/40 | 20/32/10/38 |
| COP | | 1.32 | 1.32 | 1.32 | 1.32 | 1.32 | 1.32 |
| COP relative to Reference | | 109.6% | 109.7% | 109.8% | 109.9% | 110.0% | 110.1% |
| Achieved cooling capacity | kW | 2.23 | 2.27 | 2.31 | 2.35 | 2.38 | 2.42 |
| Capacity relative to reference | | 89.8% | 91.3% | 92.9% | 94.4% | 95.9% | 97.4% |
| Suction pressure drop relative to reference | | 64.7% | 64.9% | 65.1% | 65.2% | 65.4% | 65.5% |
| Pressure ratio | | 12.47 | 12.37 | 12.26 | 12.16 | 12.06 | 11.97 |
| Mass flow through evaporator | kg/hr | 42.62 | 42.69 | 42.74 | 42.79 | 42.82 | 42.85 |
| Liquid injection mass flow | kg/hr | 5.16 | 5.28 | 5.40 | 5.51 | 5.62 | 5.73 |
| Compressor discharge temperature | ° C. | 130.0 | 130.0 | 130.0 | 130.0 | 130.0 | 130.0 |
| Evaporator glide (out-in) | K | 5.5 | 5.5 | 5.4 | 5.3 | 5.2 | 5.1 |
| Compressor suction pressure | bar | 1.15 | 1.17 | 1.19 | 1.21 | 1.23 | 1.25 |
| Compressor discharge pressure | bar | 14.4 | 14.5 | 14.6 | 14.7 | 14.9 | 15.0 |
| Condenser glide (in-out) | K | 8.6 | 8.4 | 8.2 | 8.0 | 7.8 | 7.6 |

TABLE 37

Theoretical Performance Data of Selected R-32/R-161/R-134a/R-1234ze(E) blends containing 20% R-32, 34-46% R-161 and 10% R-134a

| | | Composition R-32/R-161/R-134a/R-1234ze(E) % by weight | | | | | | |
|---|---|---|---|---|---|---|---|---|
| | | 20/34/10/36 | 20/36/10/34 | 20/38/10/32 | 20/40/10/30 | 20/42/10/28 | 20/44/10/26 | 20/46/10/24 |
| COP | | 1.32 | 1.32 | 1.32 | 1.32 | 1.32 | 1.33 | 1.33 |
| COP relative to Reference | | 110.2% | 110.2% | 110.3% | 110.3% | 110.4% | 110.5% | 110.5% |
| Achieved cooling capacity | kW | 2.46 | 2.49 | 2.53 | 2.56 | 2.60 | 2.63 | 2.66 |
| Capacity relative to reference | | 98.9% | 100.3% | 101.7% | 103.1% | 104.4% | 105.8% | 107.1% |
| Suction pressure drop relative to reference | | 65.6% | 65.7% | 65.8% | 65.9% | 66.0% | 66.0% | 66.1% |
| Pressure ratio | | 11.88 | 11.78 | 11.70 | 11.61 | 11.52 | 11.44 | 11.36 |
| Mass flow through evaporator | kg/hr | 42.87 | 42.88 | 42.89 | 42.89 | 42.89 | 42.88 | 42.86 |
| Liquid injection mass flow | kg/hr | 5.83 | 5.93 | 6.02 | 6.11 | 6.19 | 6.28 | 6.35 |
| Compressor discharge temperature | °C. | 130.0 | 130.0 | 130.0 | 130.0 | 130.0 | 130.0 | 130.0 |
| Evaporator glide (out-in) | K | 5.0 | 4.9 | 4.7 | 4.6 | 4.4 | 4.2 | 4.1 |
| Compressor suction pressure | bar | 1.27 | 1.29 | 1.31 | 1.32 | 1.34 | 1.36 | 1.38 |
| Compressor discharge pressure | bar | 15.1 | 15.2 | 15.3 | 15.4 | 15.5 | 15.6 | 15.7 |
| Condenser glide (in-out) | K | 7.4 | 7.2 | 7.0 | 6.8 | 6.6 | 6.4 | 6.2 |

TABLE 38

Theoretical Performance Data of Selected R-32/R-161/R-134a/R-1234ze(E) blends containing 20% R-32, 48-60% R-161 and 10% R-134a

| | | Composition R-32/R-161/R-134a/R-1234ze(E) % by weight | | | | | | |
|---|---|---|---|---|---|---|---|---|
| | | 20/48/10/22 | 20/50/10/20 | 20/52/10/18 | 20/54/10/16 | 20/56/10/14 | 20/58/10/12 | 20/60/10/10 |
| COP | | 1.33 | 1.33 | 1.33 | 1.33 | 1.33 | 1.33 | 1.33 |
| COP relative to Reference | | 110.6% | 110.6% | 110.7% | 110.7% | 110.8% | 110.9% | 110.9% |
| Achieved cooling capacity | kW | 2.69 | 2.73 | 2.76 | 2.79 | 2.82 | 2.85 | 2.88 |
| Capacity relative to reference | | 108.4% | 109.7% | 111.0% | 112.3% | 113.5% | 114.8% | 116.0% |
| Suction pressure drop relative to reference | | 66.1% | 66.2% | 66.2% | 66.3% | 66.3% | 66.3% | 66.3% |
| Pressure ratio | | 11.28 | 11.20 | 11.12 | 11.04 | 10.97 | 10.90 | 10.82 |
| Mass flow through evaporator | kg/hr | 42.84 | 42.82 | 42.80 | 42.77 | 42.73 | 42.70 | 42.66 |
| Liquid injection mass flow | kg/hr | 6.43 | 6.50 | 6.57 | 6.64 | 6.70 | 6.76 | 6.82 |
| Compressor discharge temperature | °C. | 130.0 | 130.0 | 130.0 | 130.0 | 130.0 | 130.0 | 130.0 |
| Evaporator glide (out-in) | K | 3.9 | 3.7 | 3.5 | 3.3 | 3.1 | 2.9 | 2.7 |
| Compressor suction pressure | bar | 1.40 | 1.41 | 1.43 | 1.45 | 1.46 | 1.48 | 1.50 |
| Compressor discharge pressure | bar | 15.7 | 15.8 | 15.9 | 16.0 | 16.1 | 16.1 | 16.2 |
| Condenser glide (in-out) | K | 6.0 | 5.8 | 5.6 | 5.4 | 5.2 | 5.0 | 4.9 |

TABLE 39

Theoretical Performance Data of Selected R-32/R-161/R-134a/R-1234ze(E) blends containing 24% R-32, 10-20% R161 and 10% R-134a

| | | Composition R-32/R-161/R-134a/R-1234ze(E) % by weight | | | | | |
|---|---|---|---|---|---|---|---|
| | | 24/10/10/56 | 24/12/10/54 | 24/14/10/52 | 24/16/10/50 | 24/18/10/48 | 24/20/10/46 |
| COP | | 1.30 | 1.31 | 1.31 | 1.31 | 1.31 | 1.31 |
| COP relative to Reference | | 108.8% | 108.9% | 109.1% | 109.2% | 109.3% | 109.4% |
| Achieved cooling capacity | kW | 2.13 | 2.18 | 2.22 | 2.27 | 2.31 | 2.35 |
| Capacity relative to reference | | 85.9% | 87.7% | 89.4% | 91.2% | 92.8% | 94.5% |
| Suction pressure drop relative to reference | | 66.2% | 66.5% | 66.8% | 67.1% | 67.3% | 67.5% |
| Pressure ratio | | 12.86 | 12.74 | 12.63 | 12.52 | 12.41 | 12.30 |
| Mass flow through evaporator | kg/hr | 44.0 | 44.2 | 44.3 | 44.4 | 44.5 | 44.5 |
| Liquid injection mass flow | kg/hr | 5.1 | 5.3 | 5.4 | 5.5 | 5.7 | 5.8 |
| Compressor discharge temperature | °C. | 130.0 | 130.0 | 130.0 | 130.0 | 130.0 | 130.0 |
| Evaporator glide (out-in) | K | 6.0 | 6.0 | 6.0 | 6.0 | 6.0 | 5.9 |
| Compressor suction pressure | bar | 1.11 | 1.13 | 1.16 | 1.18 | 1.20 | 1.22 |
| Compressor discharge pressure | bar | 14.3 | 14.4 | 14.6 | 14.7 | 14.9 | 15.0 |
| Condenser glide (in-out) | K | 9.4 | 9.3 | 9.1 | 9.0 | 8.8 | 8.6 |

TABLE 40

Theoretical Performance Data of Selected R-32/R-161/R-134a/R-1234ze(E) blends containing 24% R-32, 22-32% R-161 and 10% R-134a

| | | Composition R-32/R-161/R-134a/R-1234ze(E) % by weight | | | | | |
|---|---|---|---|---|---|---|---|
| | | 24/22/10/44 | 24/24/10/42 | 24/26/10/40 | 24/28/10/38 | 24/30/10/36 | 24/32/10/34 |
| COP | | 1.31 | 1.31 | 1.32 | 1.32 | 1.32 | 1.32 |
| COP relative to Reference | | 109.5% | 109.6% | 109.7% | 109.7% | 109.8% | 109.9% |
| Achieved cooling capacity | kW | 2.39 | 2.43 | 2.47 | 2.50 | 2.54 | 2.58 |
| Capacity relative to reference | | 96.1% | 97.7% | 99.2% | 100.8% | 102.2% | 103.7% |
| Suction pressure drop relative to reference | | 67.7% | 67.9% | 68.0% | 68.2% | 68.3% | 68.4% |
| Pressure ratio | | 12.20 | 12.10 | 12.00 | 11.91 | 11.82 | 11.72 |
| Mass flow through evaporator | kg/hr | 44.6 | 44.6 | 44.7 | 44.7 | 44.7 | 44.7 |
| Liquid injection mass flow | kg/hr | 5.9 | 6.0 | 6.2 | 6.3 | 6.4 | 6.5 |
| Compressor discharge temperature | ° C. | 130.0 | 130.0 | 130.0 | 130.0 | 130.0 | 130.0 |
| Evaporator glide (out-in) | K | 5.8 | 5.8 | 5.7 | 5.6 | 5.4 | 5.3 |
| Compressor suction pressure | bar | 1.24 | 1.26 | 1.28 | 1.30 | 1.32 | 1.34 |
| Compressor discharge pressure | bar | 15.1 | 15.3 | 15.4 | 15.5 | 15.6 | 15.7 |
| Condenser glide (in-out) | K | 8.4 | 8.2 | 8.0 | 7.8 | 7.6 | 7.4 |

TABLE 41

Theoretical Performance Data of Selected R-32/R-161/R-134a/R-1234ze(E) blends containing 24% R-32, 34-44% R-161 and 10% R-134a

| | | Composition R-32/R-161/R-134a/R-1234ze(E) % by weight | | | | | |
|---|---|---|---|---|---|---|---|
| | | 24/34/10/32 | 24/36/10/30 | 24/38/10/28 | 24/40/10/26 | 24/42/10/24 | 24/44/10/22 |
| COP | | 1.32 | 1.32 | 1.32 | 1.32 | 1.32 | 1.32 |
| COP relative to Reference | | 109.9% | 110.0% | 110.0% | 110.1% | 110.1% | 110.2% |
| Achieved cooling capacity | kW | 2.61 | 2.65 | 2.68 | 2.72 | 2.75 | 2.79 |
| Capacity relative to reference | | 105.2% | 106.6% | 108.0% | 109.4% | 110.7% | 112.1% |
| Suction pressure drop relative to reference | | 68.5% | 68.6% | 68.6% | 68.7% | 68.7% | 68.8% |
| Pressure ratio | | 11.64 | 11.55 | 11.46 | 11.38 | 11.30 | 11.22 |
| Mass flow through evaporator | kg/hr | 44.7 | 44.7 | 44.7 | 44.7 | 44.7 | 44.7 |
| Liquid injection mass flow | kg/hr | 6.6 | 6.7 | 6.7 | 6.8 | 6.9 | 7.0 |
| Compressor discharge temperature | ° C. | 130.0 | 130.0 | 130.0 | 130.0 | 130.0 | 130.0 |
| Evaporator glide (out-in) | K | 5.1 | 5.0 | 4.8 | 4.6 | 4.5 | 4.3 |
| Compressor suction pressure | bar | 1.36 | 1.38 | 1.40 | 1.42 | 1.44 | 1.45 |
| Compressor discharge pressure | bar | 15.8 | 15.9 | 16.0 | 16.1 | 16.2 | 16.3 |
| Condenser glide (in-out) | K | 7.2 | 7.0 | 6.8 | 6.6 | 6.4 | 6.2 |

TABLE 42

Theoretical Performance Data of Selected R-32/R-161/R-134a/R-1234ze(E) blends containing 24% R-32, 46-56% R-161 and 10% R-134a

| | | Composition R-32/R-161/R-134a/R-1234ze(E) % by weight | | | | | |
|---|---|---|---|---|---|---|---|
| | | 24/46/10/20 | 24/48/10/18 | 24/50/10/16 | 24/52/10/14 | 24/54/10/12 | 24/56/10/10 |
| COP | | 1.32 | 1.32 | 1.32 | 1.32 | 1.33 | 1.33 |
| COP relative to Reference | | 110.2% | 110.3% | 110.3% | 110.4% | 110.5% | 110.5% |
| Achieved cooling capacity | kW | 2.82 | 2.85 | 2.88 | 2.92 | 2.95 | 2.98 |
| Capacity relative to reference | | 113.4% | 114.7% | 116.0% | 117.3% | 118.6% | 119.8% |
| Suction pressure drop relative to reference | | 68.8% | 68.9% | 68.9% | 68.9% | 68.9% | 68.9% |
| Pressure ratio | | 11.14 | 11.06 | 10.99 | 10.91 | 10.84 | 10.76 |
| Mass flow through evaporator | kg/hr | 44.6 | 44.6 | 44.6 | 44.5 | 44.5 | 44.5 |
| Liquid injection mass flow | kg/hr | 7.0 | 7.1 | 7.2 | 7.2 | 7.3 | 7.4 |
| Compressor discharge temperature | ° C. | 130.0 | 130.0 | 130.0 | 130.0 | 130.0 | 130.0 |
| Evaporator glide (out-in) | K | 4.1 | 3.9 | 3.7 | 3.5 | 3.3 | 3.0 |
| Compressor suction pressure | bar | 1.47 | 1.49 | 1.51 | 1.52 | 1.54 | 1.56 |
| Compressor discharge pressure | bar | 16.4 | 16.5 | 16.6 | 16.6 | 16.7 | 16.8 |
| Condenser glide (in-out) | K | 6.0 | 5.8 | 5.6 | 5.4 | 5.2 | 5.1 |

TABLE 43

Theoretical Performance Data of Selected R-32/R-161/R-134a/R-1234ze(E) blends containing 28% R-32, 10-22% R-161 and 10% R-134a

| | | Composition R-32/R-161/R-134a/R-1234ze(E) % by weight | | | | | | |
|---|---|---|---|---|---|---|---|---|
| | | 28/10/10/52 | 28/12/10/50 | 28/14/10/48 | 28/16/10/46 | 28/18/10/44 | 28/10/10/42 | 28/22/10/40 |
| COP | | 1.30 | 1.31 | 1.31 | 1.31 | 1.31 | 1.31 | 1.31 |
| COP relative to Reference | | 108.7% | 108.8% | 108.9% | 109.0% | 109.1% | 109.2% | 109.3% |
| Achieved cooling capacity | kW | 2.29 | 2.33 | 2.38 | 2.42 | 2.46 | 2.50 | 2.54 |
| Capacity relative to reference | | 92.1% | 93.9% | 95.6% | 97.4% | 99.0% | 100.7% | 102.3% |
| Suction pressure drop relative to reference | | 69.1% | 69.4% | 69.7% | 69.9% | 70.2% | 70.3% | 70.5% |
| Pressure ratio | | 12.57 | 12.46 | 12.35 | 12.25 | 12.14 | 12.04 | 11.95 |
| Mass flow through evaporator | kg/hr | 46.0 | 46.1 | 46.2 | 46.3 | 46.4 | 46.4 | 46.5 |
| Liquid injection mass flow | kg/hr | 5.9 | 6.1 | 6.2 | 6.3 | 6.5 | 6.6 | 6.7 |
| Compressor discharge temperature | ° C. | 130.0 | 130.0 | 130.0 | 130.0 | 130.0 | 130.0 | 130.0 |
| Evaporator glide (out-in) | K | 63 | 6.3 | 6.2 | 6.2 | 6.1 | 6.0 | 6.0 |
| Compressor suction pressure | bar | 1.20 | 1.22 | 1.24 | 1.27 | 1.29 | 1.31 | 1.33 |
| Compressor discharge pressure | bar | 15.1 | 15.2 | 15.4 | 15.5 | 15.6 | 15.8 | 15.9 |
| Condenser glide (in-out) | K | 9.1 | 9.0 | 8.8 | 8.6 | 8.5 | 8.3 | 8.1 |

TABLE 44

Theoretical Performance Data of Selected R-32/R-161/R-134a/R-1234ze(E) blends containing 28% R-32, 24-36% R-161 and 10% R-134a

| | | Composition R-32/R-161/R-134a/R-1234ze(E) % by weight | | | | | | |
|---|---|---|---|---|---|---|---|---|
| | | 28/24/10/38 | 28/26/10/36 | 28/28/10/34 | 28/30/10/32 | 28/32/10/30 | 28/34/10/28 | 28/36/10/26 |
| COP | | 1.31 | 1.31 | 1.31 | 1.31 | 1.31 | 1.31 | 1.32 |
| COP relative to Reference | | 109.3% | 109.4% | 109.4% | 109.5% | 109.5% | 109.6% | 109.6% |
| Achieved cooling capacity | kW | 2.58 | 2.62 | 2.66 | 2.70 | 2.73 | 2.77 | 2.80 |
| Capacity relative to reference | | 103.9% | 105.4% | 106.9% | 108.4% | 109.9% | 111.4% | 112.8% |
| Suction pressure drop relative to reference | | 70.7% | 70.8% | 70.9% | 71.0% | 71.1% | 71.2% | 71.2% |
| Pressure ratio | | 11.85 | 11.76 | 11.67 | 11.58 | 11.49 | 11.41 | 11.32 |
| Mass flow through evaporator | kg/hr | 46.5 | 46.5 | 46.5 | 46.5 | 46.5 | 46.5 | 46.5 |
| Liquid injection mass flow | kg/hr | 6.8 | 6.9 | 7.0 | 7.1 | 7.2 | 7.3 | 7.4 |
| Compressor discharge temperature | ° C. | 130.0 | 130.0 | 130.0 | 130.0 | 130.0 | 130.0 | 130.0 |
| Evaporator glide (out-in) | K | 5.8 | 5.7 | 5.6 | 5.4 | 5.3 | 5.1 | 4.9 |
| Compressor suction pressure | bar | 1.35 | 1.37 | 1.39 | 1.41 | 1.43 | 1.45 | 1.47 |
| Compressor discharge pressure | bar | 16.0 | 16.1 | 16.2 | 16.4 | 16.5 | 16.6 | 16.7 |
| Condenser glide (in-out) | K | 7.9 | 7.7 | 7.5 | 7.3 | 7.0 | 6.8 | 6.6 |

TABLE 45

Theoretical Performance Data of Selected R-32/R-161/R-134a/R-1234ze(E) blends containing 28% R-32, 38-52% R-161 and 10% R-134a

| | | Composition R-32/R-161/R-134a/R-1234ze(E) % by weight | | | | | | | |
|---|---|---|---|---|---|---|---|---|---|
| | | 28/ 38/10/24 | 28/ 40/10/22 | 28/ 42/10/20 | 28/ 44/10/18 | 28/ 46/10/16 | 28/ 48/10/14 | 28/ 50/10/12 | 28/ 52/10/10 |
| COP | | 1.32 | 1.32 | 1.32 | 1.32 | 1.32 | 1.32 | 1.32 | 1.32 |
| COP relative to Reference | | 109.7% | 109.7% | 109.8% | 109.8% | 109.9% | 110.0% | 110.0% | 110.1% |
| Achieved cooling capacity | kW | 2.84 | 2.87 | 2.91 | 2.94 | 2.97 | 3.01 | 3.04 | 3.07 |
| Capacity relative to reference | | 114.2% | 115.6% | 117.0% | 118.3% | 119.6% | 121.0% | 122.3% | 123.6% |
| Suction pressure drop relative to reference | | 71.3% | 71.3% | 71.4% | 71.4% | 71.5% | 71.5% | 71.5% | 71.5% |
| Pressure ratio | | 11.24 | 11.16 | 11.08 | 11.00 | 10.93 | 10.85 | 10.78 | 10.71 |
| Mass flow through evaporator | kg/hr | 46.5 | 46.5 | 46.4 | 46.4 | 46.4 | 46.3 | 46.3 | 46.2 |
| Liquid injection mass flow | kg/hr | 7.5 | 7.5 | 7.6 | 7.7 | 7.8 | 7.8 | 7.9 | 7.9 |
| Compressor discharge temperature | ° C. | 130.0 | 130.0 | 130.0 | 130.0 | 130.0 | 130.0 | 130.0 | 130.0 |
| Evaporator glide (out-in) | K | 4.7 | 4.5 | 4.3 | 4.1 | 3.9 | 3.7 | 3.5 | 3.3 |
| Compressor suction pressure | bar | 1.49 | 1.51 | 1.53 | 1.55 | 1.56 | 1.58 | 1.60 | 1.62 |
| Compressor discharge pressure | bar | 16.8 | 16.8 | 16.9 | 17.0 | 17.1 | 17.2 | 17.3 | 17.3 |
| Condenser glide (in-out) | K | 6.4 | 6.2 | 6.0 | 5.8 | 5.7 | 5.5 | 5.3 | 5.1 |

TABLE 46

Theoretical Performance Data of Selected R-32/R-161/R-134a/R-1234ze(E) blends containing 30% R-32, 10-22% R-161 and 10% R-134a

| | | Composition R-32/R-161/R-134a/R-1234ze(E) % by weight | | | | | | |
|---|---|---|---|---|---|---|---|---|
| | | 30/10/10/50 | 30/12/10/48 | 30/14/10/46 | 30/16/10/44 | 30/18/10/42 | 30/20/10/40 | 30/22/10/38 |
| COP | | 1.30 | 1.30 | 1.31 | 1.31 | 1.31 | 1.31 | 1.31 |
| COP relative to Reference | | 108.6% | 108.7% | 108.8% | 108.9% | 109.0% | 109.1% | 109.1% |
| Achieved cooling capacity | kW | 2.36 | 2.41 | 2.45 | 2.50 | 2.54 | 2.58 | 2.62 |
| Capacity relative to reference | | 95.1% | 96.9% | 98.7% | 100.4% | 102.1% | 103.7% | 105.3% |
| Suction pressure drop relative to reference | | 70.5% | 70.8% | 71.1% | 71.3% | 71.5% | 71.7% | 71.8% |
| Pressure ratio | | 12.44 | 12.33 | 12.22 | 12.12 | 12.02 | 11.92 | 11.83 |
| Mass flow through evaporator | kg/hr | 46.9 | 47.0 | 47.1 | 47.2 | 47.3 | 47.3 | 47.3 |
| Liquid injection mass flow | kg/hr | 6.3 | 6.5 | 6.6 | 6.7 | 6.9 | 7.0 | 7.1 |
| Compressor discharge temperature | °C. | 130.0 | 130.0 | 130.0 | 130.0 | 130.0 | 130.0 | 130.0 |
| Evaporator glide (out-in) | K | 6.3 | 6.3 | 6.3 | 6.2 | 6.1 | 6.0 | 5.9 |
| Compressor suction pressure | bar | 1.24 | 1.26 | 1.29 | 1.31 | 1.33 | 1.35 | 1.37 |
| Compressor discharge pressure | bar | 15.4 | 15.6 | 15.7 | 15.9 | 16.0 | 16.1 | 16.3 |
| Condenser glide (in-out) | K | 8.9 | 8.8 | 8.6 | 8.4 | 8.2 | 8.0 | 7.8 |

TABLE 47

Theoretical Performance Data of Selected R-32/R-161/R-134a/R-1234ze(E) blends containing 30% R-32, 24-36% R-161 and 10% R-134a

| | | Composition R-32/R-161/R-134a/R-1234ze(E) % by weight | | | | | | |
|---|---|---|---|---|---|---|---|---|
| | | 30/24/10/36 | 30/26/10/34 | 30/28/10/32 | 30/30/10/30 | 30/32/10/28 | 30/34/10/26 | 30/36/10/24 |
| COP | | 1.31 | 1.31 | 1.31 | 1.31 | 1.31 | 1.31 | 1.31 |
| COP relative to Reference | | 109.2% | 109.2% | 109.3% | 109.3% | 109.4% | 109.4% | 109.5% |
| Achieved cooling capacity | kW | 2.66 | 2.70 | 2.73 | 2.77 | 2.81 | 2.84 | 2.88 |
| Capacity relative to reference | | 106.9% | 108.5% | 110.0% | 111.5% | 113.0% | 114.4% | 115.8% |
| Suction pressure drop relative to reference | | 72.0% | 72.1% | 72.2% | 72.3% | 72.4% | 72.5% | 72.5% |
| Pressure ratio | | 11.73 | 11.64 | 11.55 | 11.47 | 11.38 | 11.30 | 11.22 |
| Mass flow through evaporator | kg/hr | 47.4 | 47.4 | 47.4 | 47.4 | 47.4 | 47.4 | 47.4 |
| Liquid injection mass flow | kg/hr | 7.2 | 7.3 | 7.4 | 7.5 | 7.6 | 7.7 | 7.8 |
| Compressor discharge temperature | °C. | 130.0 | 130.0 | 130.0 | 130.0 | 130.0 | 130.0 | 130.0 |
| Evaporator glide (out-in) | K | 5.8 | 5.7 | 5.5 | 5.4 | 5.2 | 5.0 | 4.8 |
| Compressor suction pressure | bar | 1.40 | 1.42 | 1.44 | 1.46 | 1.48 | 1.50 | 1.52 |
| Compressor discharge pressure | bar | 16.4 | 16.5 | 16.6 | 16.7 | 16.8 | 16.9 | 17.0 |
| Condenser glide (in-out) | K | 7.6 | 7.4 | 7.2 | 7.0 | 6.8 | 6.6 | 6.4 |

TABLE 48

Theoretical Performance Data of Selected R-32/R-161/R-134a/R-1234ze(E) blends containing 30% R-32, 38-50% R-161 and 10% R-134a

| | | Composition R-32/R-161/R-134a/R-1234ze(E) % by weight | | | | | | |
|---|---|---|---|---|---|---|---|---|
| | | 30/38/10/22 | 30/40/10/20 | 30/42/10/18 | 30/44/10/16 | 30/46/10/14 | 30/48/10/12 | 30/50/10/10 |
| COP | | 1.31 | 1.31 | 1.32 | 1.32 | 1.32 | 1.32 | 1.32 |
| COP relative to Reference | | 109.5% | 109.6% | 109.6% | 109.7% | 109.7% | 109.8% | 109.9% |
| Achieved cooling capacity | kW | 2.91 | 2.95 | 2.98 | 3.02 | 3.05 | 3.08 | 3.12 |
| Capacity relative to reference | | 117.3% | 118.6% | 120.0% | 121.4% | 122.7% | 124.1% | 125.4% |
| Suction pressure drop relative to reference | | 72.6% | 72.6% | 72.7% | 72.7% | 72.7% | 72.8% | 72.8% |
| Pressure ratio | | 11.13 | 11.06 | 10.98 | 10.90 | 10.83 | 10.75 | 10.68 |
| Mass flow through evaporator | kg/hr | 47.3 | 47.3 | 47.3 | 47.3 | 47.2 | 47.2 | 47.1 |
| Liquid injection mass flow | kg/hr | 7.8 | 7.9 | 8.0 | 8.1 | 8.1 | 8.2 | 8.2 |
| Compressor discharge temperature | °C. | 130.0 | 130.0 | 130.0 | 130.0 | 130.0 | 130.0 | 130.0 |
| Evaporator glide (out-in) | K | 4.6 | 4.4 | 4.2 | 4.0 | 3.8 | 3.6 | 3.3 |
| Compressor suction pressure | bar | 1.54 | 1.56 | 1.57 | 1.59 | 1.61 | 1.63 | 1.65 |
| Compressor discharge pressure | bar | 17.1 | 17.2 | 17.3 | 17.4 | 17.5 | 17.5 | 17.6 |
| Condenser glide (in-out) | K | 6.2 | 6.0 | 5.8 | 5.6 | 5.4 | 5.3 | 5.1 |

TABLE 49

Theoretical Performance Data of Selected R-32/R-161/R-134a/R-1234ze(E) blends containing 34% R-32, 10-22% R-161 and 10% R-134a

| | | Composition R-32/R-161/R-134a/R-1234ze(E) % by weight | | | | | | |
|---|---|---|---|---|---|---|---|---|
| | | 34/10/10/46 | 34/12/10/44 | 34/14/10/42 | 34/16/10/40 | 34/18/10/38 | 34/20/10/36 | 34/22/10/34 |
| COP | | 1.30 | 1.30 | 1.30 | 1.30 | 1.30 | 1.30 | 1.31 |
| COP relative to Reference | | 108.4% | 108.5% | 108.6% | 108.6% | 108.7% | 108.7% | 108.8% |
| Achieved cooling capacity | kW | 2.51 | 2.56 | 2.60 | 2.64 | 2.69 | 2.73 | 2.77 |
| Capacity relative to reference | | 101.1% | 102.9% | 104.6% | 106.3% | 108.0% | 109.7% | 111.3% |
| Suction pressure drop relative to reference | | 73.1% | 73.4% | 73.6% | 73.8% | 74.0% | 74.2% | 74.4% |
| Pressure ratio | | 12.18 | 12.08 | 11.98 | 11.88 | 11.78 | 11.69 | 11.60 |
| Mass flow through evaporator | kg/hr | 48.6 | 48.7 | 48.8 | 48.9 | 49.0 | 49.0 | 49.0 |
| Liquid injection mass flow | kg/hr | 7.2 | 7.3 | 7.4 | 7.6 | 7.7 | 7.8 | 7.9 |
| Compressor discharge temperature | ° C. | 130.0 | 130.0 | 130.0 | 130.0 | 130.0 | 130.0 | 130.0 |
| Evaporator glide (out-in) | K | 6.3 | 6.3 | 6.2 | 6.1 | 6.0 | 5.9 | 5.8 |
| Compressor suction pressure | bar | 1.33 | 1.35 | 1.37 | 1.40 | 1.42 | 1.44 | 1.46 |
| Compressor discharge pressure | bar | 16.2 | 16.3 | 16.5 | 16.6 | 16.7 | 16.9 | 17.0 |
| Condenser glide (in-out) | K | 8.4 | 8.3 | 8.1 | 7.9 | 7.7 | 7.5 | 7.3 |

TABLE 50

Theoretical Performance Data of Selected R-32/R-161/R-134a/R-1234ze(E) blends containing 34% R-32, 24-34% R-161 and 10% R-134a

| | | Composition R-32/R-161/R-134a/R-1234ze(E) % by weight | | | | | |
|---|---|---|---|---|---|---|---|
| | | 34/24/10/32 | 34/26/10/30 | 34/28/10/28 | 34/30/10/26 | 34/32/10/24 | 34/34/10/22 |
| COP | | 1.31 | 1.31 | 1.31 | 1.31 | 1.31 | 1.31 |
| COP relative to Reference | | 108.8% | 108.9% | 108.9% | 109.0% | 109.0% | 109.0% |
| Achieved cooling capacity | kW | 2.81 | 2.84 | 2.88 | 2.92 | 2.96 | 2.99 |
| Capacity relative to reference | | 112.9% | 114.4% | 116.0% | 117.5% | 119.0% | 120.4% |
| Suction pressure drop relative to reference | | 74.5% | 74.6% | 74.7% | 74.8% | 74.9% | 75.0% |
| Pressure ratio | | 11.51 | 11.42 | 11.33 | 11.25 | 11.17 | 11.09 |
| Mass flow through evaporator | kg/hr | 49.1 | 49.1 | 49.1 | 49.1 | 49.1 | 49.1 |
| Liquid injection mass flow | kg/hr | 8.0 | 8.1 | 8.2 | 8.3 | 8.4 | 8.5 |
| Compressor discharge temperature | ° C. | 130.0 | 130.0 | 130.0 | 130.0 | 130.0 | 130.0 |
| Evaporator glide (out-in) | K | 5.6 | 5.5 | 5.3 | 5.1 | 4.9 | 4.7 |
| Compressor suction pressure | bar | 1.49 | 1.51 | 1.53 | 1.55 | 1.57 | 1.59 |
| Compressor discharge pressure | bar | 17.1 | 17.2 | 17.3 | 17.4 | 17.5 | 17.6 |
| Condenser glide (in-out) | K | 7.1 | 6.9 | 6.7 | 6.5 | 6.3 | 6.1 |

TABLE 51

Theoretical Performance Data of Selected R-32/R-161/R-134a/R-1234ze(E) blends containing 34% R-32, 36-46% R-161 and 10% R-134a

| | | Composition R-32/R-161/R-134a/R-1234ze(E) % by weight | | | | | |
|---|---|---|---|---|---|---|---|
| | | 34/36/10/20 | 34/38/10/18 | 34/40/10/16 | 34/42/10/14 | 34/44/10/12 | 34/46/10/10 |
| COP | | 1.31 | 1.31 | 1.31 | 1.31 | 1.31 | 1.31 |
| COP relative to Reference | | 109.1% | 109.1% | 109.2% | 109.3% | 109.3% | 109.4% |
| Achieved cooling capacity | kW | 3.03 | 3.07 | 3.10 | 3.14 | 3.17 | 3.20 |
| Capacity relative to reference | | 121.9% | 123.3% | 124.7% | 126.1% | 127.5% | 128.9% |
| Suction pressure drop relative to reference | | 75.0% | 75.1% | 75.1% | 75.2% | 75.2% | 75.3% |
| Pressure ratio | | 11.01 | 10.93 | 10.85 | 10.77 | 10.70 | 10.62 |
| Mass flow through evaporator | kg/hr | 49.0 | 49.0 | 49.0 | 49.0 | 48.9 | 48.9 |
| Liquid injection mass flow | kg/hr | 8.5 | 8.6 | 8.7 | 8.7 | 8.8 | 8.8 |
| Compressor discharge temperature | ° C. | 130.0 | 130.0 | 130.0 | 130.0 | 130.0 | 130.0 |
| Evaporator glide (out-in) | K | 4.5 | 4.3 | 4.1 | 3.9 | 3.6 | 3.4 |
| Compressor suction pressure | bar | 1.61 | 1.63 | 1.65 | 1.67 | 1.69 | 1.71 |
| Compressor discharge pressure | bar | 17.7 | 17.8 | 17.9 | 18.0 | 18.1 | 18.1 |
| Condenser glide (in-out) | K | 5.9 | 5.7 | 5.5 | 5.3 | 5.1 | 5.0 |

TABLE 52

Theoretical Performance Data of Selected R-32/R-161/R-134a/R-1234ze(E) blends containing 38% R-32, 10-20% R-161 and 10% R-134a

| | | Composition R-32/R-161/R-134a/R-1234ze(E) % by weight | | | | | |
|---|---|---|---|---|---|---|---|
| | | 38/10/10/42 | 38/12/10/40 | 38/14/10/38 | 38/16/10/36 | 38/18/10/34 | 38/20/10/32 |
| COP | | 1.30 | 1.30 | 1.30 | 1.30 | 1.30 | 1.30 |
| COP relative to Reference | | 108.2% | 108.2% | 108.3% | 108.3% | 108.3% | 108.4% |
| Achieved cooling capacity | kW | 2.66 | 2.70 | 2.74 | 2.79 | 2.83 | 2.87 |
| Capacity relative to reference | | 106.9% | 108.7% | 110.4% | 112.2% | 113.9% | 115.5% |
| Suction pressure drop relative to reference | | 75.5% | 75.7% | 76.0% | 76.2% | 76.4% | 76.6% |
| Pressure ratio | | 11.94 | 11.84 | 11.75 | 11.65 | 11.56 | 11.47 |
| Mass flow through evaporator | kg/hr | 50.3 | 50.4 | 50.5 | 50.5 | 50.6 | 50.6 |
| Liquid injection mass flow | kg/hr | 8.0 | 8.2 | 8.3 | 8.4 | 8.5 | 8.6 |
| Compressor discharge temperature | ° C. | 130.0 | 130.0 | 130.0 | 130.0 | 130.0 | 130.0 |
| Evaporator glide (out-in) | K | 6.1 | 6.1 | 6.0 | 5.9 | 5.8 | 5.6 |
| Compressor suction pressure | bar | 1.41 | 1.44 | 1.46 | 1.49 | 1.51 | 1.53 |
| Compressor discharge pressure | bar | 16.9 | 17.0 | 17.2 | 17.3 | 17.4 | 17.6 |
| Condenser glide (in-out) | K | 7.9 | 7.7 | 7.5 | 7.3 | 7.1 | 6.9 |

TABLE 53

Theoretical Performance Data of Selected R-32/R-161/R-134a/R-1234ze(E) blends containing 38% R-32, 22-32% R-161 and 10% R-134a

| | | Composition R-32/R-161/R-134a/R-1234ze(E) % by weight | | | | | |
|---|---|---|---|---|---|---|---|
| | | 38/22/10/30 | 38/24/10/28 | 38/26/10/26 | 38/28/10/24 | 38/30/10/22 | 38/32/10/20 |
| COP | | 1.30 | 1.30 | 1.30 | 1.30 | 1.30 | 1.30 |
| COP relative to Reference | | 108.4% | 108.5% | 108.5% | 108.5% | 108.6% | 108.6% |
| Achieved cooling capacity | kW | 2.91 | 2.95 | 2.99 | 3.03 | 3.07 | 3.10 |
| Capacity relative to reference | | 117.2% | 118.8% | 120.3% | 121.9% | 123.4% | 124.9% |
| Suction pressure drop relative to reference | | 76.7% | 76.9% | 77.0% | 77.1% | 77.2% | 77.3% |
| Pressure ratio | | 11.38 | 11.29 | 11.21 | 11.12 | 11.04 | 10.96 |
| Mass flow through evaporator | kg/hr | 50.6 | 50.7 | 50.7 | 50.7 | 50.7 | 50.7 |
| Liquid injection mass flow | kg/hr | 8.7 | 8.8 | 8.9 | 9.0 | 9.1 | 9.2 |
| Compressor discharge temperature | ° C. | 130.0 | 130.0 | 130.0 | 130.0 | 130.0 | 130.0 |
| Evaporator glide (out-in) | K | 5.5 | 5.3 | 5.1 | 4.9 | 4.7 | 4.5 |
| Compressor suction pressure | bar | 1.55 | 1.58 | 1.60 | 1.62 | 1.64 | 1.66 |
| Compressor discharge pressure | bar | 17.7 | 17.8 | 17.9 | 18.0 | 18.1 | 18.2 |
| Condenser glide (in-out) | K | 6.7 | 6.5 | 6.3 | 6.1 | 5.9 | 5.7 |

TABLE 54

Theoretical Performance Data of Selected R-32/R-161/R-134a/R-1234ze(E) blends containing 38% R-32, 34-42% R-161 and 10% R-134a

| | | Composition R-32/R-161/R-134a/R-1234ze(E) % by weight | | | | | |
|---|---|---|---|---|---|---|---|
| | | 38/34/10/18 | 38/36/10/16 | 38/38/10/14 | 38/40/10/12 | 38/42/10/10 | |
| COP | | 1.30 | 1.30 | 1.30 | 1.31 | 1.31 | |
| COP relative to Reference | | 108.7% | 108.7% | 108.8% | 108.8% | 108.9% | |
| Achieved cooling capacity | kW | 3.14 | 3.18 | 3.21 | 3.25 | 3.29 | |
| Capacity relative to reference | | 126.4% | 127.9% | 129.3% | 130.8% | 132.2% | |
| Suction pressure drop relative to reference | | 77.4% | 77.4% | 77.5% | 77.6% | 77.6% | |
| Pressure ratio | | 10.88 | 10.80 | 10.73 | 10.65 | 10.58 | |
| Mass flow through evaporator | kg/hr | 50.7 | 50.6 | 50.6 | 50.6 | 50.6 | |
| Liquid injection mass flow | kg/hr | 9.2 | 9.3 | 9.4 | 9.4 | 9.5 | |
| Compressor discharge temperature | ° C. | 130.0 | 130.0 | 130.0 | 130.0 | 130.0 | |
| Evaporator glide (out-in) | K | 4.3 | 4.1 | 3.9 | 3.6 | 3.4 | |
| Compressor suction pressure | bar | 1.68 | 1.70 | 1.72 | 1.74 | 1.76 | |
| Compressor discharge pressure | bar | 18.3 | 18.4 | 18.5 | 18.6 | 18.7 | |
| Condenser glide (in-out) | K | 5.5 | 5.3 | 5.1 | 4.9 | 4.8 | |

TABLE 55

Theoretical Performance Data of Selected R-32/R-161/R-134a/R-1234ze(E) blends containing 42% R-32, 10-24% R-161 and 10% R-134a

| | | Composition R-32/R-161/R-134a/R-1234ze(E) % by weight | | | | | | | |
|---|---|---|---|---|---|---|---|---|---|
| | | 42/10/10/38 | 42/12/10/36 | 42/14/10/34 | 42/16/10/32 | 42/18/10/30 | 42/20/10/28 | 42/22/10/26 | 42/24/10/24 |
| COP | | 1.29 | 1.29 | 1.29 | 1.30 | 1.30 | 1.30 | 1.30 | 1.30 |
| COP relative to Reference | | 107.9% | 107.9% | 107.9% | 107.9% | 108.0% | 108.0% | 108.0% | 108.1% |
| Achieved cooling capacity | kW | 2.80 | 2.84 | 2.89 | 2.93 | 2.97 | 3.01 | 3.06 | 3.10 |
| Capacity relative to reference | | 112.6% | 114.4% | 116.1% | 117.9% | 119.6% | 121.3% | 122.9% | 124.6% |
| Suction pressure drop relative to reference | | 77.7% | 77.9% | 78.2% | 78.4% | 78.6% | 78.8% | 78.9% | 79.1% |
| Pressure ratio | | 11.72 | 11.62 | 11.53 | 11.44 | 11.35 | 11.26 | 11.17 | 11.09 |
| Mass flow through evaporator | kg/hr | 51.8 | 51.9 | 52.0 | 52.0 | 52.1 | 52.1 | 52.2 | 52.2 |
| Liquid injection mass flow | kg/hr | 8.9 | 9.0 | 9.1 | 9.3 | 9.4 | 9.5 | 9.6 | 9.6 |
| Compressor discharge temperature | °C. | 130.0 | 130.0 | 130.0 | 130.0 | 130.0 | 130.0 | 130.0 | 130.0 |
| Evaporator glide (out-in) | K | 5.8 | 5.8 | 5.6 | 5.5 | 5.4 | 5.2 | 5.0 | 4.9 |
| Compressor suction pressure | bar | 1.50 | 1.52 | 1.55 | 1.57 | 1.60 | 1.62 | 1.64 | 1.67 |
| Compressor discharge pressure | bar | 17.6 | 17.7 | 17.9 | 18.0 | 18.1 | 18.3 | 18.4 | 18.5 |
| Condenser glide (in-out) | K | 7.2 | 7.0 | 6.8 | 6.6 | 6.4 | 6.2 | 6.0 | 5.8 |

TABLE 56

Theoretical Performance Data of Selected R-32/R-161/R-134a/R-1234ze(E) blends containing 42% R-32, 26-38% R-161 and 10% R-134a

| | | Composition R-32/R-161/R-134a/R-1234ze(E) % by weight | | | | | | |
|---|---|---|---|---|---|---|---|---|
| | | 42/26/10/22 | 42/28/10/20 | 42/30/10/18 | 42/32/10/16 | 42/34/10/14 | 42/36/10/12 | 42/38/10/10 |
| COP | | 1.30 | 1.30 | 1.30 | 1.30 | 1.30 | 1.30 | 1.30 |
| COP relative to Reference | | 108.1% | 108.1% | 108.2% | 108.2% | 108.3% | 108.3% | 108.4% |
| Achieved cooling capacity | kW | 3.14 | 3.17 | 3.21 | 3.25 | 3.29 | 3.33 | 3.36 |
| Capacity relative to reference | | 126.2% | 127.7% | 129.3% | 130.8% | 132.3% | 133.9% | 135.3% |
| Suction pressure drop relative to reference | | 79.2% | 79.4% | 79.5% | 79.6% | 79.7% | 79.8% | 79.9% |
| Pressure ratio | | 11.00 | 10.92 | 10.84 | 10.76 | 10.68 | 10.61 | 10.53 |
| Mass flow through evaporator | kg/hr | 52.2 | 52.2 | 52.2 | 52.2 | 52.2 | 52.2 | 52.2 |
| Liquid injection mass flow | kg/hr | 9.7 | 9.8 | 9.9 | 10.0 | 10.0 | 10.1 | 10.1 |
| Compressor discharge temperature | °C. | 130.0 | 130.0 | 130.0 | 130.0 | 130.0 | 130.0 | 130.0 |
| Evaporator glide (out-in) | K | 4.7 | 4.4 | 4.2 | 4.0 | 3.8 | 3.5 | 3.3 |
| Compressor suction pressure | bar | 1.69 | 1.71 | 1.73 | 1.76 | 1.78 | 1.80 | 1.82 |
| Compressor discharge pressure | bar | 18.6 | 18.7 | 18.8 | 18.9 | 19.0 | 19.1 | 19.2 |
| Condenser glide (in-out) | K | 5.6 | 5.4 | 5.2 | 5.1 | 4.9 | 4.7 | 4.5 |

TABLE 57

Theoretical Performance Data of Selected R-32/R-161/R-134a/R-1234ze(E) blends containing 46% R-32, 10-22% R-161 and 10% R-134a

| | | Composition R-32/R-161/R-134a/R-1234ze(E) % by weight | | | | | | |
|---|---|---|---|---|---|---|---|---|
| | | 46/10/10/34 | 46/12/10/32 | 46/14/10/30 | 46/16/10/28 | 46/18/10/26 | 46/20/10/24 | 46/22/10/22 |
| COP | | 1.29 | 1.29 | 1.29 | 1.29 | 1.29 | 1.29 | 1.29 |
| COP relative to Reference | | 107.5% | 107.6% | 107.6% | 107.6% | 107.6% | 107.6% | 107.7% |
| Achieved cooling capacity | kW | 2.94 | 2.98 | 3.03 | 3.07 | 3.11 | 3.16 | 3.20 |
| Capacity relative to reference | | 118.1% | 120.0% | 121.8% | 123.5% | 125.3% | 127.0% | 128.7% |
| Suction pressure drop relative to reference | | 79.7% | 79.9% | 80.2% | 80.4% | 80.7% | 80.9% | 81.1% |
| Pressure ratio | | 11.51 | 11.42 | 11.32 | 11.23 | 11.15 | 11.06 | 10.97 |
| Mass flow through evaporator | kg/hr | 53.2 | 53.3 | 53.4 | 53.5 | 53.5 | 53.6 | 53.6 |
| Liquid injection mass flow | kg/hr | 9.8 | 9.9 | 10.0 | 10.1 | 10.2 | 10.3 | 10.4 |
| Compressor discharge temperature | °C. | 130.0 | 130.0 | 130.0 | 130.0 | 130.0 | 130.0 | 130.0 |
| Evaporator glide (out-in) | K | 5.4 | 5.3 | 5.2 | 5.0 | 4.9 | 4.7 | 4.5 |
| Compressor suction pressure | bar | 1.59 | 1.61 | 1.64 | 1.66 | 1.69 | 1.71 | 1.74 |
| Compressor discharge pressure | bar | 18.2 | 18.4 | 18.5 | 18.7 | 18.8 | 18.9 | 19.0 |
| Condenser glide (in-out) | K | 6.6 | 6.4 | 6.2 | 6.0 | 5.8 | 5.6 | 5.4 |

TABLE 58

Theoretical Performance Data of Selected R-32/R-161/R-134a/R-1234ze(E) blends containing 46% R-32, 24-34% R-161 and 10% R-134a

| | | Composition R-32/R-161/R-134a/R-1234ze(E) % by weight | | | | | |
|---|---|---|---|---|---|---|---|
| | | 46/24/10/20 | 46/26/10/18 | 46/28/10/16 | 46/30/10/14 | 46/32/10/12 | 46/34/10/10 |
| COP | | 1.29 | 1.29 | 1.29 | 1.29 | 1.29 | 1.29 |
| COP relative to Reference | | 107.7% | 107.7% | 107.8% | 107.8% | 107.9% | 107.9% |
| Achieved cooling capacity | kW | 3.24 | 3.28 | 3.32 | 3.36 | 3.40 | 3.44 |
| Capacity relative to reference | | 130.3% | 131.9% | 133.6% | 135.1% | 136.7% | 138.3% |
| Suction pressure drop relative to reference | | 81.2% | 81.4% | 81.5% | 81.7% | 81.8% | 81.9% |
| Pressure ratio | | 10.89 | 10.81 | 10.73 | 10.65 | 10.57 | 10.49 |
| Mass flow through evaporator | kg/hr | 53.7 | 53.7 | 53.7 | 53.7 | 53.7 | 53.7 |
| Liquid injection mass flow | kg/hr | 10.5 | 10.6 | 10.6 | 10.7 | 10.8 | 10.8 |
| Compressor discharge temperature | ° C. | 130.0 | 130.0 | 130.0 | 130.0 | 130.0 | 130.0 |
| Evaporator glide (out-in) | K | 4.3 | 4.1 | 3.9 | 3.6 | 3.4 | 3.1 |
| Compressor suction pressure | bar | 1.76 | 1.78 | 1.81 | 1.83 | 1.85 | 1.87 |
| Compressor discharge pressure | bar | 19.2 | 19.3 | 19.4 | 19.5 | 19.6 | 19.7 |
| Condenser glide (in-out) | K | 5.2 | 5.0 | 4.8 | 4.6 | 4.4 | 4.2 |

TABLE 59

Theoretical Performance Data of Selected R-32/R-161/R-134a/R-1234ze(E) blends containing 20% R-32, 10-20% R-161 and 14% R-134a

| | | Composition R-32/R-161/R-134a/R-1234ze(E) % by weight | | | | | |
|---|---|---|---|---|---|---|---|
| | | 20/10/14/56 | 20/12/14/54 | 20/14/14/52 | 20/16/14/50 | 20/18/14/48 | 20/20/14/46 |
| COP | | 1.30 | 1.30 | 1.31 | 1.31 | 1.31 | 1.31 |
| COP relative to Reference | | 108.5% | 108.7% | 108.9% | 109.0% | 109.2% | 109.3% |
| Achieved cooling capacity | kW | 2.00 | 2.04 | 2.09 | 2.13 | 2.17 | 2.21 |
| Capacity relative to reference | | 80.4% | 82.2% | 84.0% | 85.7% | 87.4% | 89.1% |
| Suction pressure drop relative to reference | | 63.7% | 64.1% | 64.4% | 64.7% | 65.0% | 65.3% |
| Pressure ratio | | 13.11 | 12.98 | 12.86 | 12.74 | 12.63 | 12.52 |
| Mass flow through evaporator | kg/hr | 42.4 | 42.5 | 42.7 | 42.8 | 42.9 | 43.0 |
| Liquid injection mass flow | kg/hr | 4.4 | 4.6 | 4.7 | 4.9 | 5.0 | 5.2 |
| Compressor discharge temperature | ° C. | 130.0 | 130.0 | 130.0 | 130.0 | 130.0 | 130.0 |
| Evaporator glide (out-in) | K | 5.2 | 5.3 | 5.3 | 5.3 | 5.3 | 5.3 |
| Compressor suction pressure | bar | 1.04 | 1.06 | 1.08 | 1.10 | 1.13 | 1.15 |
| Compressor discharge pressure | bar | 13.6 | 13.8 | 13.9 | 14.1 | 14.2 | 14.4 |
| Condenser glide (in-out) | K | 9.0 | 8.9 | 8.8 | 8.6 | 8.5 | 8.3 |

TABLE 60

Theoretical Performance Data of Selected R-32/R-161/R-134a/R-1234ze(E) blends containing 20% R-32, 22-32% R-161 and 14% R-134a

| | | Composition R-32/R-161/R-134a/R-1234ze(E) % by weight | | | | | |
|---|---|---|---|---|---|---|---|
| | | 20/22/14/44 | 20/24/14/42 | 20/26/14/40 | 20/28/14/38 | 20/30/14/36 | 20/32/14/34 |
| COP | | 1.31 | 1.31 | 1.31 | 1.32 | 1.32 | 1.32 |
| COP relative to Reference | | 109.4% | 109.5% | 109.6% | 109.7% | 109.8% | 109.8% |
| Achieved cooling capacity | kW | 2.25 | 2.29 | 2.33 | 2.37 | 2.41 | 2.45 |
| Capacity relative to reference | | 90.7% | 92.3% | 93.9% | 95.4% | 97.0% | 98.5% |
| Suction pressure drop relative to reference | | 65.5% | 65.7% | 65.9% | 66.1% | 66.2% | 66.4% |
| Pressure ratio | | 12.41 | 12.30 | 12.20 | 12.10 | 12.00 | 11.90 |
| Mass flow through evaporator | kg/hr | 43.1 | 43.2 | 43.3 | 43.3 | 43.4 | 43.4 |
| Liquid injection mass flow | kg/hr | 5.3 | 5.4 | 5.5 | 5.6 | 5.7 | 5.9 |
| Compressor discharge temperature | ° C. | 130.0 | 130.0 | 130.0 | 130.0 | 130.0 | 130.0 |
| Evaporator glide (out-in) | K | 5.2 | 5.2 | 5.1 | 5.0 | 4.9 | 4.8 |
| Compressor suction pressure | bar | 1.17 | 1.19 | 1.21 | 1.23 | 1.25 | 1.27 |
| Compressor discharge pressure | bar | 14.5 | 14.6 | 14.7 | 14.9 | 15.0 | 15.1 |
| Condenser glide (in-out) | K | 8.1 | 7.9 | 7.7 | 7.6 | 7.4 | 7.2 |

TABLE 61

Theoretical Performance Data of Selected R-32/R-161/R-134a/R-1234ze(E) blends containing 20% R-32, 34-44% R-161 and 14% R-134a

| | | Composition R-32/R-161/R-134a/R-1234ze(E) % by weight | | | | | |
|---|---|---|---|---|---|---|---|
| | | 20/34/14/32 | 20/36/14/30 | 20/38/14/28 | 20/40/14/26 | 20/42/14/24 | 20/44/14/22 |
| COP | | 1.32 | 1.32 | 1.32 | 1.32 | 1.32 | 1.32 |
| COP relative to Reference | | 109.9% | 110.0% | 110.0% | 110.1% | 110.2% | 110.2% |
| Achieved cooling capacity | kW | 2.48 | 2.52 | 2.55 | 2.59 | 2.62 | 2.66 |
| Capacity relative to reference | | 99.9% | 101.4% | 102.8% | 104.2% | 105.6% | 106.9% |
| Suction pressure drop relative to reference | | 66.5% | 66.6% | 66.7% | 66.8% | 66.9% | 67.0% |
| Pressure ratio | | 11.81 | 11.72 | 11.63 | 11.54 | 11.45 | 11.37 |
| Mass flow through evaporator | kg/hr | 43.4 | 43.4 | 43.4 | 43.5 | 43.5 | 43.5 |
| Liquid injection mass flow | kg/hr | 6.0 | 6.1 | 6.1 | 6.2 | 6.3 | 6.4 |
| Compressor discharge temperature | °C. | 130.0 | 130.0 | 130.0 | 130.0 | 130.0 | 130.0 |
| Evaporator glide (out-in) | K | 4.7 | 4.5 | 4.4 | 4.2 | 4.0 | 3.9 |
| Compressor suction pressure | bar | 1.29 | 1.31 | 1.33 | 1.34 | 1.36 | 1.38 |
| Compressor discharge pressure | bar | 15.2 | 15.3 | 15.4 | 15.5 | 15.6 | 15.7 |
| Condenser glide (in-out) | K | 6.9 | 6.7 | 6.5 | 6.3 | 6.1 | 5.9 |

TABLE 62

Theoretical Performance Data of Selected R-32/R-161/R-134a/R-1234ze(E) blends containing 20% R-32, 46-56% R-161 and 14% R-134a

| | | Composition R-32/R-161/R-134a/R-1234ze(E) % by weight | | | | | |
|---|---|---|---|---|---|---|---|
| | | 20/46/14/20 | 20/48/14/18 | 20/50/14/16 | 20/52/14/14 | 20/54/14/12 | 20/56/14/10 |
| COP | | 1.32 | 1.32 | 1.32 | 1.33 | 1.33 | 1.33 |
| COP relative to Reference | | 110.3% | 110.3% | 110.4% | 110.5% | 110.5% | 110.6% |
| Achieved cooling capacity | kW | 2.69 | 2.72 | 2.76 | 2.79 | 2.82 | 2.85 |
| Capacity relative to reference | | 108.3% | 109.6% | 110.9% | 112.2% | 113.5% | 114.8% |
| Suction pressure drop relative to reference | | 67.1% | 67.1% | 67.2% | 67.2% | 67.3% | 67.3% |
| Pressure ratio | | 11.29 | 11.20 | 11.13 | 11.05 | 10.97 | 10.89 |
| Mass flow through evaporator | kg/hr | 43.4 | 43.4 | 43.4 | 43.4 | 43.4 | 43.3 |
| Liquid injection mass flow | kg/hr | 6.5 | 6.6 | 6.6 | 6.7 | 6.8 | 6.8 |
| Compressor discharge temperature | °C. | 130.0 | 130.0 | 130.0 | 130.0 | 130.0 | 130.0 |
| Evaporator glide (out-in) | K | 3.7 | 3.5 | 3.3 | 3.1 | 2.9 | 2.7 |
| Compressor suction pressure | bar | 1.40 | 1.42 | 1.43 | 1.45 | 1.47 | 1.49 |
| Compressor discharge pressure | bar | 15.8 | 15.9 | 16.0 | 16.0 | 16.1 | 16.2 |
| Condenser glide (in-out) | K | 5.7 | 5.6 | 5.4 | 5.2 | 5.0 | 4.8 |

TABLE 63

Theoretical Performance Data of Selected R-32/R-161/R-134a/R-1234ze(E) blends containing 24% R-32, 10-24% R-161 and 14% R-134a

| | | Composition R-32/R-161/R-134a/R-1234ze(E) % by weight | | | | | | | |
|---|---|---|---|---|---|---|---|---|---|
| | | 24/10/14/52 | 24/12/14/50 | 24/14/14/48 | 24/16/14/46 | 24/18/14/44 | 24/20/14/42 | 24/22/14/10 | 24/24/14/38 |
| COP | | 1.30 | 1.30 | 1.31 | 1.31 | 1.31 | 1.31 | 1.31 | 1.31 |
| COP relative to Reference | | 108.6% | 108.7% | 108.8% | 109.0% | 109.1% | 109.2% | 109.3% | 109.3% |
| Achieved cooling capacity | kW | 2.15 | 2.20 | 2.24 | 2.29 | 2.33 | 2.37 | 2.41 | 2.45 |
| Capacity relative to reference | | 86.7% | 88.5% | 90.3% | 92.0% | 93.7% | 95.4% | 97.0% | 98.6% |
| Suction pressure drop relative to reference | | 66.8% | 67.2% | 67.5% | 67.8% | 68.0% | 68.3% | 68.5% | 68.7% |
| Pressure ratio | | 12.81 | 12.69 | 12.57 | 12.46 | 12.35 | 12.24 | 12.14 | 12.04 |
| Mass flow through evaporator | kg/hr | 44.4 | 44.6 | 44.7 | 44.8 | 44.9 | 45.0 | 45.1 | 45.1 |
| Liquid injection mass flow | kg/hr | 5.2 | 5.4 | 5.5 | 5.7 | 5.8 | 5.9 | 6.0 | 6.2 |
| Compressor discharge temperature | °C. | 130.0 | 130.0 | 130.0 | 130.0 | 130.0 | 130.0 | 130.0 | 130.0 |
| Evaporator glide (out-in) | K | 5.7 | 5.7 | 5.7 | 5.7 | 5.6 | 5.6 | 5.5 | 5.4 |
| Compressor suction pressure | bar | 1.12 | 1.15 | 1.17 | 1.19 | 1.21 | 1.24 | 1.26 | 1.28 |

TABLE 63-continued

Theoretical Performance Data of Selected R-32/R-161/R-134a/R-1234ze(E) blends containing 24% R-32, 10-24% R-161 and 14% R-134a

| | | Composition R-32/R-161/R-134a/R-1234ze(E) % by weight | | | | | | |
|---|---|---|---|---|---|---|---|---|
| | | 24/10/14/52 | 24/12/14/50 | 24/14/14/48 | 24/16/14/46 | 24/18/14/44 | 24/20/14/42 | 24/22/14/10 | 24/24/14/38 |
| Compressor discharge pressure | bar | 14.4 | 14.6 | 14.7 | 14.8 | 15.0 | 15.1 | 15.3 | 15.4 |
| Condenser glide (in-out) | K | 9.0 | 8.8 | 8.7 | 8.5 | 8.3 | 8.1 | 8.0 | 7.8 |

TABLE 64

Theoretical Performance Data of Selected R-32/R-161/R-134a/R-1234ze(E) blends containing 24% R-32, 26-38% R-161 and 14% R-134a

| | | Composition R-32/R-161/R-134a/R-1234ze(E) % by weight | | | | | | |
|---|---|---|---|---|---|---|---|---|
| | | 24/26/14/36 | 24/28/14/34 | 24/30/14/32 | 24/32/14/30 | 24/34/14/28 | 24/36/14/26 | 24/38/14/24 |
| COP | | 1.31 | 1.31 | 1.31 | 1.31 | 1.32 | 1.32 | 1.32 |
| COP relative to Reference | | 109.4% | 109.5% | 109.5% | 109.6% | 109.7% | 109.7% | 109.8% |
| Achieved cooling capacity | kW | 2.49 | 2.53 | 2.57 | 2.60 | 2.64 | 2.68 | 2.71 |
| Capacity relative to reference | | 100.2% | 101.7% | 103.3% | 104.7% | 106.2% | 107.7% | 109.1% |
| Suction pressure drop relative to reference | | 68.8% | 69.0% | 69.1% | 69.2% | 69.3% | 69.4% | 69.5% |
| Pressure ratio | | 11.94 | 11.85 | 11.75 | 11.66 | 11.57 | 11.48 | 11.40 |
| Mass flow through evaporator | kg/hr | 45.2 | 45.2 | 45.2 | 45.3 | 45.3 | 45.3 | 45.3 |
| Liquid injection mass flow | kg/hr | 6.3 | 6.4 | 6.5 | 6.6 | 6.7 | 6.8 | 6.9 |
| Compressor discharge temperature | °C. | 130.0 | 130.0 | 130.0 | 130.0 | 130.0 | 130.0 | 130.0 |
| Evaporator glide (out-in) | K | 5.3 | 5.2 | 5.1 | 4.9 | 4.8 | 4.6 | 4.4 |
| Compressor suction pressure | bar | 1.30 | 1.32 | 1.34 | 1.36 | 1.38 | 1.40 | 1.42 |
| Compressor discharge pressure | bar | 15.5 | 15.6 | 15.7 | 15.8 | 15.9 | 16.1 | 16.2 |
| Condenser glide (in-out) | K | 7.6 | 7.4 | 7.2 | 7.0 | 6.7 | 6.5 | 6.3 |

TABLE 65

Theoretical Performance Data of Selected R-32/R-161/R-134a/R-1234ze(E) blends containing 24% R-32, 26-38% R-161 and 14% R-134a

| | | Composition R-32/R-161/R-134a/R-1234ze(E) % by weight | | | | | | |
|---|---|---|---|---|---|---|---|---|
| | | 24/40/14/22 | 24/42/14/20 | 24/44/14/18 | 24/46/14/16 | 24/48/14/14 | 24/50/14/12 | 24/52/14/10 |
| COP | | 1.32 | 1.32 | 1.32 | 1.32 | 1.32 | 1.32 | 1.32 |
| COP relative to Reference | | 109.8% | 109.9% | 109.9% | 110.0% | 110.1% | 110.1% | 110.2% |
| Achieved cooling capacity | kW | 2.75 | 2.78 | 2.81 | 2.85 | 2.88 | 2.91 | 2.95 |
| Capacity relative to reference | | 110.5% | 111.9% | 113.3% | 114.6% | 115.9% | 117.3% | 118.6% |
| Suction pressure drop relative to reference | | 69.6% | 69.7% | 69.7% | 69.8% | 69.9% | 69.9% | 69.9% |
| Pressure ratio | | 11.31 | 11.23 | 11.15 | 11.07 | 10.99 | 10.91 | 10.84 |
| Mass flow through evaporator | kg/hr | 45.3 | 45.3 | 45.2 | 45.2 | 45.2 | 45.2 | 45.1 |
| Liquid injection mass flow | kg/hr | 7.0 | 7.0 | 7.1 | 7.2 | 7.2 | 7.3 | 7.4 |
| Compressor discharge temperature | °C. | 130.0 | 130.0 | 130.0 | 130.0 | 130.0 | 130.0 | 130.0 |
| Evaporator glide (out-in) | K | 4.2 | 4.0 | 3.9 | 3.7 | 3.4 | 3.2 | 3.0 |
| Compressor suction pressure | bar | 1.44 | 1.45 | 1.47 | 1.49 | 1.51 | 1.53 | 1.55 |
| Compressor discharge pressure | bar | 16.2 | 16.3 | 16.4 | 16.5 | 16.6 | 16.7 | 16.8 |
| Condenser glide (in-out) | K | 6.1 | 5.9 | 5.7 | 5.6 | 5.4 | 5.2 | 5.0 |

TABLE 66

Theoretical Performance Data of Selected R-32/R-161/R-134a/R-1234ze(E) blends containing 28% R-32, 10-22% R-161 and 14% R-134a

| | | Composition R-32/R-161/R-134a/R-1234ze(E) % by weight | | | | | | |
|---|---|---|---|---|---|---|---|---|
| | | 28/10/14/48 | 28/12/14/46 | 28/14/14/44 | 28/16/14/42 | 28/18/14/40 | 28/20/14/38 | 28/22/14/36 |
| COP | | 1.30 | 1.30 | 1.30 | 1.31 | 1.31 | 1.31 | 1.31 |
| COP relative to Reference | | 108.5% | 108.6% | 108.7% | 108.8% | 108.9% | 109.0% | 109.0% |
| Achieved cooling capacity | kW | 2.31 | 2.35 | 2.40 | 2.44 | 2.48 | 2.52 | 2.56 |
| Capacity relative to reference | | 92.8% | 94.6% | 96.4% | 98.2% | 99.9% | 101.6% | 103.2% |
| Suction pressure drop relative to reference | | 69.7% | 70.0% | 70.3% | 70.6% | 70.8% | 71.0% | 71.2% |

TABLE 66-continued

Theoretical Performance Data of Selected R-32/R-161/R-134a/R-1234ze(E) blends containing 28% R-32, 10-22% R-161 and 14% R-134a

| | | Composition R-32/R-161/R-134a/R-1234ze(E) % by weight | | | | | | |
|---|---|---|---|---|---|---|---|---|
| | | 28/10/14/48 | 28/12/14/46 | 28/14/14/44 | 28/16/14/42 | 28/18/14/40 | 28/20/14/38 | 28/22/14/36 |
| Pressure ratio | | 12.52 | 12.41 | 12.30 | 12.19 | 12.09 | 11.99 | 11.89 |
| Mass flow through evaporator | kg/hr | 46.3 | 46.5 | 46.6 | 46.7 | 46.8 | 46.9 | 46.9 |
| Liquid injection mass flow | kg/hr | 6.1 | 6.2 | 6.3 | 6.5 | 6.6 | 6.7 | 6.8 |
| Compressor discharge temperature | ° C. | 130.0 | 130.0 | 130.0 | 130.0 | 130.0 | 130.0 | 130.0 |
| Evaporator glide (out-in) | K | 5.9 | 5.9 | 5.9 | 5.8 | 5.8 | 5.7 | 5.6 |
| Compressor suction pressure | bar | 1.21 | 1.23 | 1.26 | 1.28 | 1.30 | 1.32 | 1.35 |
| Compressor discharge pressure | bar | 15.2 | 15.3 | 15.5 | 15.6 | 15.7 | 15.9 | 16.0 |
| Condenser glide (in-out) | K | 8.7 | 8.5 | 8.4 | 8.2 | 8.0 | 7.8 | 7.6 |

15

TABLE 67

Theoretical Performance Data of Selected R-32/R-161/R-134a/R-1234ze(E) blends containing 28% R-32, 24-36% R-161 and 14% R-134a

| | | Composition R-32/R-161/R-134a/R-1234ze(E) % by weight | | | | | | |
|---|---|---|---|---|---|---|---|---|
| | | 28/24/14/34 | 28/26/14/32 | 28/28/14/30 | 28/30/14/28 | 28/32/14/26 | 28/34/14/24 | 28/36/14/22 |
| COP | | 1.31 | 1.31 | 1.31 | 1.31 | 1.31 | 1.31 | 1.31 |
| COP relative to Reference | | 109.1% | 109.1% | 109.2% | 109.2% | 109.3% | 109.4% | 109.4% |
| Achieved cooling capacity | kW | 2.60 | 2.64 | 2.68 | 2.72 | 2.76 | 2.79 | 2.83 |
| Capacity relative to reference | | 104.8% | 106.4% | 107.9% | 109.4% | 110.9% | 112.4% | 113.9% |
| Suction pressure drop relative to reference | | 71.4% | 71.6% | 71.7% | 71.8% | 71.9% | 72.0% | 72.1% |
| Pressure ratio | | 11.80 | 11.70 | 11.61 | 11.52 | 11.43 | 11.35 | 11.26 |
| Mass flow through evaporator | kg/hr | 47.0 | 47.0 | 47.0 | 47.0 | 47.0 | 47.1 | 47.0 |
| Liquid injection mass flow | kg/hr | 7.0 | 7.1 | 7.2 | 7.3 | 7.4 | 7.4 | 7.5 |
| Compressor discharge temperature | ° C. | 130.0 | 130.0 | 130.0 | 130.0 | 130.0 | 130.0 | 130.0 |
| Evaporator glide (out-in) | K | 5.5 | 5.3 | 5.2 | 5.0 | 4.9 | 4.7 | 4.5 |
| Compressor suction pressure | bar | 1.37 | 1.39 | 1.41 | 1.43 | 1.45 | 1.47 | 1.49 |
| Compressor discharge pressure | bar | 16.1 | 16.2 | 16.4 | 16.5 | 16.6 | 16.7 | 16.8 |
| Condenser glide (in-out) | K | 7.4 | 7.2 | 7.0 | 6.8 | 6.6 | 6.4 | 6.2 |

TABLE 68

Theoretical Performance Data of Selected R-32/R-161/R-134a/R-1234ze(E) blends containing 28% R-32, 38-50% R-161 and 14% R-134a

| | | Composition R-32/R-161/R-134a/R-1234ze(E) % by weight | | | | | | |
|---|---|---|---|---|---|---|---|---|
| | | 28/38/14/20 | 28/40/14/18 | 28/42/14/16 | 28/44/14/14 | 28/46/14/12 | 28/48/14/10 | 28/50/14/8 |
| COP | | 1.31 | 1.31 | 1.31 | 1.32 | 1.32 | 1.32 | 1.32 |
| COP relative to Reference | | 109.5% | 109.5% | 109.6% | 109.6% | 109.7% | 109.7% | 109.8% |
| Achieved cooling capacity | kW | 2.87 | 2.90 | 2.94 | 2.97 | 3.00 | 3.04 | 3.07 |
| Capacity relative to reference | | 115.3% | 116.7% | 118.1% | 119.5% | 120.9% | 122.2% | 123.6% |
| Suction pressure drop relative to reference | | 72.2% | 72.3% | 72.3% | 72.4% | 72.4% | 72.5% | 72.5% |
| Pressure ratio | | 11.18 | 11.10 | 11.02 | 10.94 | 10.86 | 10.78 | 10.71 |
| Mass flow through evaporator | kg/hr | 47.0 | 47.0 | 47.0 | 47.0 | 47.0 | 46.9 | 46.9 |
| Liquid injection mass flow | kg/hr | 7.6 | 7.7 | 7.8 | 7.8 | 7.9 | 8.0 | 8.0 |
| Compressor discharge temperature | ° C. | 130.0 | 130.0 | 130.0 | 130.0 | 130.0 | 130.0 | 130.0 |
| Evaporator glide (out-in) | K | 4.3 | 4.1 | 3.9 | 3.7 | 3.5 | 3.2 | 3.0 |
| Compressor suction pressure | bar | 1.51 | 1.53 | 1.55 | 1.57 | 1.59 | 1.60 | 1.62 |
| Compressor discharge pressure | bar | 16.9 | 17.0 | 17.1 | 17.1 | 17.2 | 17.3 | 17.4 |
| Condenser glide (in-out) | K | 6.0 | 5.8 | 5.6 | 5.4 | 5.2 | 5.0 | 4.9 |

TABLE 69

Theoretical Performance Data of Selected R-32/R-161/R-134a/R-1234ze(E) blends containing 32% R-32, 10-22% R-161 and 14% R-134a

| | | Composition R-32/R-161/R-134a/R-1234ze(E) % by weight | | | | | | |
|---|---|---|---|---|---|---|---|---|
| | | 32/10/14/44 | 32/12/14/42 | 32/14/14/40 | 32/16/14/38 | 32/18/14/36 | 32/20/14/34 | 32/22/14/32 |
| COP | | 1.30 | 1.30 | 1.30 | 1.30 | 1.30 | 1.30 | 1.30 |
| COP relative to Reference | | 108.3% | 108.4% | 108.5% | 108.6% | 108.6% | 108.7% | 108.7% |
| Achieved cooling capacity | kW | 2.46 | 2.50 | 2.55 | 2.59 | 2.63 | 2.67 | 2.71 |
| Capacity relative to reference | | 98.8% | 100.6% | 102.4% | 104.2% | 105.9% | 107.6% | 109.2% |
| Suction pressure drop relative to reference | | 72.4% | 72.7% | 73.0% | 73.2% | 73.4% | 73.6% | 73.8% |
| Pressure ratio | | 12.26 | 12.15 | 12.05 | 11.95 | 11.85 | 11.75 | 11.66 |
| Mass flow through evaporator | kg/hr | 48.1 | 48.3 | 48.4 | 48.5 | 48.5 | 48.6 | 48.6 |
| Liquid injection mass flow | kg/hr | 6.9 | 7.0 | 7.2 | 7.3 | 7.4 | 7.5 | 7.6 |
| Compressor discharge temperature | ° C. | 130.0 | 130.0 | 130.0 | 130.0 | 130.0 | 130.0 | 130.0 |
| Evaporator glide (out-in) | K | 6.0 | 5.9 | 5.9 | 5.8 | 5.7 | 5.6 | 5.5 |
| Compressor suction pressure | bar | 1.30 | 1.32 | 1.34 | 1.37 | 1.39 | 1.41 | 1.44 |
| Compressor discharge pressure | bar | 15.9 | 16.0 | 16.2 | 16.3 | 16.5 | 16.6 | 16.7 |
| Condenser glide (in-out) | K | 8.3 | 8.1 | 7.9 | 7.7 | 7.5 | 7.3 | 7.1 |

TABLE 70

Theoretical Performance Data of Selected R-32/R-161/R-134a/R-1234ze(E) blends containing 32% R-32, 24-34% R-161 and 14% R-134a

| | | Composition R-32/R-161/R-134a/R-1234ze(E) % by weight | | | | | |
|---|---|---|---|---|---|---|---|
| | | 32/24/14/30 | 32/26/14/28 | 32/28/14/26 | 32/30/14/24 | 32/32/14/22 | 32/34/14/20 |
| COP | | 1.31 | 1.31 | 1.31 | 1.31 | 1.31 | 1.31 |
| COP relative to Reference | | 108.8% | 108.8% | 108.9% | 108.9% | 109.0% | 109.0% |
| Achieved cooling capacity | kW | 2.75 | 2.79 | 2.83 | 2.87 | 2.91 | 2.95 |
| Capacity relative to reference | | 110.8% | 112.4% | 114.0% | 115.5% | 117.0% | 118.5% |
| Suction pressure drop relative to reference | | 74.0% | 74.1% | 74.3% | 74.4% | 74.5% | 74.6% |
| Pressure ratio | | 11.56 | 11.47 | 11.39 | 11.30 | 11.21 | 11.13 |
| Mass flow through evaporator | kg/hr | 48.7 | 48.7 | 48.7 | 48.7 | 48.8 | 48.8 |
| Liquid injection mass flow | kg/hr | 7.7 | 7.9 | 7.9 | 8.0 | 8.1 | 8.2 |
| Compressor discharge temperature | ° C. | 130.0 | 130.0 | 130.0 | 130.0 | 130.0 | 130.0 |
| Evaporator glide (out-in) | K | 5.3 | 5.2 | 5.0 | 4.8 | 4.6 | 4.4 |
| Compressor suction pressure | bar | 1.46 | 1.48 | 1.50 | 1.52 | 1.54 | 1.56 |
| Compressor discharge pressure | bar | 16.9 | 17.0 | 17.1 | 17.2 | 17.3 | 17.4 |
| Condenser glide (in-out) | K | 6.9 | 6.7 | 6.5 | 6.3 | 6.1 | 5.9 |

TABLE 71

Theoretical Performance Data of Selected R-32/R-161/R-134a/R-1234ze(E) blends containing 32% R-32, 36-46% R-161 and 14% R-134a

| | | Composition R-32/R-161/R-134a/R-1234ze(E) % by weight | | | | | |
|---|---|---|---|---|---|---|---|
| | | 32/36/14/18 | 32/38/14/16 | 32/40/14/14 | 32/42/14/12 | 32/44/14/10 | 32/46/14/8 |
| COP | | 1.31 | 1.31 | 1.31 | 1.31 | 1.31 | 1.31 |
| COP relative to Reference | | 109.1% | 109.1% | 109.2% | 109.2% | 109.3% | 109.4% |
| Achieved cooling capacity | kW | 2.98 | 3.02 | 3.05 | 3.09 | 3.12 | 3.16 |
| Capacity relative to reference | | 120.0% | 121.4% | 122.8% | 124.3% | 125.7% | 127.1% |
| Suction pressure drop relative to reference | | 74.7% | 74.8% | 74.8% | 74.9% | 75.0% | 75.0% |
| Pressure ratio | | 11.05 | 10.97 | 10.89 | 10.81 | 10.73 | 10.66 |
| Mass flow through evaporator | kg/hr | 48.7 | 48.7 | 48.7 | 48.7 | 48.7 | 48.6 |
| Liquid injection mass flow | kg/hr | 8.3 | 8.4 | 8.4 | 8.5 | 8.6 | 8.6 |
| Compressor discharge temperature | ° C. | 130.0 | 130.0 | 130.0 | 130.0 | 130.0 | 130.0 |
| Evaporator glide (out-in) | K | 4.2 | 4.0 | 3.8 | 3.6 | 3.3 | 3.1 |
| Compressor suction pressure | bar | 1.58 | 1.60 | 1.62 | 1.64 | 1.66 | 1.68 |
| Compressor discharge pressure | bar | 17.5 | 17.6 | 17.7 | 17.8 | 17.8 | 17.9 |
| Condenser glide (in-out) | K | 5.7 | 5.5 | 5.3 | 5.2 | 5.0 | 4.8 |

TABLE 72

Theoretical Performance Data of Selected R-32/R-161/R-134a/R-1234ze(E) blends containing 36% R-32, 10-20% R-161 and 14% R-134a

| | | Composition R-32/R-161/R-134a/R-1234ze(E) % by weight | | | | | |
|---|---|---|---|---|---|---|---|
| | | 36/10/14/40 | 36/12/14/38 | 36/14/14/36 | 36/16/14/34 | 36/18/14/32 | 36/20/14/30 |
| COP | | 1.30 | 1.30 | 1.30 | 1.30 | 1.30 | 1.30 |
| COP relative to Reference | | 108.1% | 108.2% | 108.2% | 108.3% | 108.3% | 108.4% |
| Achieved cooling capacity | kW | 2.60 | 2.65 | 2.69 | 2.74 | 2.78 | 2.82 |
| Capacity relative to reference | | 104.7% | 106.5% | 108.3% | 110.1% | 111.8% | 113.5% |
| Suction pressure drop relative to reference | | 74.8% | 75.1% | 75.4% | 75.6% | 75.9% | 76.1% |
| Pressure ratio | | 12.02 | 11.91 | 11.81 | 11.72 | 11.62 | 11.53 |
| Mass flow through evaporator | kg/hr | 49.8 | 49.9 | 50.0 | 50.1 | 50.2 | 50.2 |
| Liquid injection mass flow | kg/hr | 7.7 | 7.9 | 8.0 | 8.1 | 8.2 | 8.4 |
| Compressor discharge temperature | °C. | 130.0 | 130.0 | 130.0 | 130.0 | 130.0 | 130.0 |
| Evaporator glide (out-in) | K | 5.9 | 5.8 | 5.7 | 5.6 | 5.5 | 5.4 |
| Compressor suction pressure | bar | 1.38 | 1.41 | 1.43 | 1.46 | 1.48 | 1.50 |
| Compressor discharge pressure | bar | 16.6 | 16.8 | 16.9 | 17.0 | 17.2 | 17.3 |
| Condenser glide (in-out) | K | 7.7 | 7.6 | 7.4 | 7.2 | 7.0 | 6.8 |

TABLE 73

Theoretical Performance Data of Selected R-32/R-161/R-134a/R-1234ze(E) blends containing 36% R-32, 22-32% R-161 and 14% R-134a

| | | Composition R-32/R-161/R-134a/R-1234ze(E) % by weight | | | | | |
|---|---|---|---|---|---|---|---|
| | | 36/22/14/28 | 36/24/14/26 | 36/26/14/24 | 36/28/14/22 | 36/30/14/20 | 36/32/14/18 |
| COP | | 1.30 | 1.30 | 1.30 | 1.30 | 1.30 | 1.30 |
| COP relative to Reference | | 108.4% | 108.4% | 108.5% | 108.5% | 108.6% | 108.6% |
| Achieved cooling capacity | kW | 2.86 | 2.90 | 2.94 | 2.98 | 3.02 | 3.06 |
| Capacity relative to reference | | 115.1% | 116.7% | 118.3% | 119.9% | 121.5% | 123.0% |
| Suction pressure drop relative to reference | | 76.2% | 76.4% | 76.6% | 76.7% | 76.8% | 76.9% |
| Pressure ratio | | 11.44 | 11.35 | 11.26 | 11.17 | 11.09 | 11.00 |
| Mass flow through evaporator | kg/hr | 50.3 | 50.3 | 50.4 | 50.4 | 50.4 | 50.4 |
| Liquid injection mass flow | kg/hr | 8.5 | 8.6 | 8.7 | 8.7 | 8.8 | 8.9 |
| Compressor discharge temperature | °C. | 130.0 | 130.0 | 130.0 | 130.0 | 130.0 | 130.0 |
| Evaporator glide (out-in) | K | 5.2 | 5.1 | 4.9 | 4.7 | 4.5 | 4.3 |
| Compressor suction pressure | bar | 1.52 | 1.55 | 1.57 | 1.59 | 1.61 | 1.63 |
| Compressor discharge pressure | bar | 17.4 | 17.6 | 17.7 | 17.8 | 17.9 | 18.0 |
| Condenser glide (in-out) | K | 6.6 | 6.4 | 6.2 | 6.0 | 5.8 | 5.6 |

TABLE 74

Theoretical Performance Data of Selected R-32/R-161/R-134a/R-1234ze(E) blends containing 36% R-32, 34-42% R-161 and 14% R-134a

| | | Composition R-32/R-161/R-134a/R-1234ze(E) % by weight | | | | |
|---|---|---|---|---|---|---|
| | | 36/34/14/16 | 36/36/14/14 | 36/38/14/12 | 36/40/14/10 | 36/42/14/8 |
| COP | | 1.30 | 1.30 | 1.30 | 1.31 | 1.31 |
| COP relative to Reference | | 108.7% | 108.7% | 108.8% | 108.8% | 108.9% |
| Achieved cooling capacity | kW | 3.09 | 3.13 | 3.17 | 3.20 | 3.24 |
| Capacity relative to reference | | 124.5% | 126.0% | 127.5% | 128.9% | 130.4% |
| Suction pressure drop relative to reference | | 77.0% | 77.1% | 77.2% | 77.3% | 77.4% |
| Pressure ratio | | 10.92 | 10.84 | 10.76 | 10.69 | 10.61 |
| Mass flow through evaporator | kg/hr | 50.4 | 50.4 | 50.4 | 50.4 | 50.3 |
| Liquid injection mass flow | kg/hr | 9.0 | 9.1 | 9.1 | 9.2 | 9.2 |
| Compressor discharge temperature | °C. | 130.0 | 130.0 | 130.0 | 130.0 | 130.0 |
| Evaporator glide (out-in) | K | 4.1 | 3.8 | 3.6 | 3.4 | 3.1 |
| Compressor suction pressure | bar | 1.66 | 1.68 | 1.70 | 1.72 | 1.74 |
| Compressor discharge pressure | bar | 18.1 | 18.2 | 18.3 | 18.4 | 18.4 |
| Condenser glide (in-out) | K | 5.4 | 5.2 | 5.0 | 4.8 | 4.6 |

TABLE 75

Theoretical Performance Data of Selected R-32/R-161/R-134a/R-1234ze(E) blends containing 40% R-32, 10-24% R-161 and 14% R-134a

| | | Composition R-32/R-161/R-134a/R-1234ze(E) % by weight | | | | | | | |
|---|---|---|---|---|---|---|---|---|---|
| | | 40/10/14/36 | 40/12/14/34 | 40/14/14/32 | 40/16/14/30 | 40/18/14/28 | 40/20/14/26 | 40/22/14/24 | 40/24/14/22 |
| COP | | 1.29 | 1.29 | 1.29 | 1.30 | 1.30 | 1.30 | 1.30 | 1.30 |
| COP relative to Reference | | 107.8% | 107.9% | 107.9% | 107.9% | 108.0% | 108.0% | 108.0% | 108.1% |
| Achieved cooling capacity | kW | 2.74 | 2.79 | 2.83 | 2.88 | 2.92 | 2.96 | 3.01 | 3.05 |
| Capacity relative to reference | | 110.4% | 112.3% | 114.1% | 115.8% | 117.6% | 119.3% | 120.9% | 122.6% |
| Suction pressure drop relative to reference | | 77.0% | 77.3% | 77.6% | 77.9% | 78.1% | 78.3% | 78.5% | 78.7% |
| Pressure ratio | | 11.79 | 11.69 | 11.59 | 11.50 | 11.41 | 11.31 | 11.23 | 11.14 |
| Mass flow through evaporator | kg/hr | 51.3 | 51.5 | 51.6 | 51.6 | 51.7 | 51.8 | 51.8 | 51.9 |
| Liquid injection mass flow | kg/hr | 8.6 | 8.7 | 8.9 | 9.0 | 9.1 | 9.2 | 9.3 | 9.4 |
| Compressor discharge temperature | °C. | 130.0 | 130.0 | 130.0 | 130.0 | 130.0 | 130.0 | 130.0 | 130.0 |
| Evaporator glide (out-in) | K | 5.6 | 5.6 | 5.4 | 5.3 | 5.2 | 5.0 | 4.8 | 4.7 |
| Compressor suction pressure | bar | 1.47 | 1.49 | 1.52 | 1.54 | 1.57 | 1.59 | 1.62 | 1.64 |
| Compressor discharge pressure | bar | 17.3 | 17.5 | 17.6 | 17.7 | 17.9 | 18.0 | 18.1 | 18.2 |
| Condenser glide (in-out) | K | 7.1 | 7.0 | 6.8 | 6.6 | 6.4 | 6.2 | 6.0 | 5.8 |

TABLE 76

Theoretical Performance Data of Selected R-32/R-161/R-134a/R-1234ze(E) blends containing 40% R-32, 26-38% R-161 and 14% R-134a

| | | Composition R-32/R-161/R-134a/R-1234ze(E) % by weight | | | | | | |
|---|---|---|---|---|---|---|---|---|
| | | 40/26/14/20 | 40/28/14/18 | 40/30/14/16 | 40/32/14/14 | 40/34/14/12 | 40/36/14/10 | 40/38/14/8 |
| COP | | 1.30 | 1.30 | 1.30 | 1.30 | 1.30 | 1.30 | 1.30 |
| COP relative to Reference | | 108.1% | 108.2% | 108.2% | 108.2% | 108.3% | 108.4% | 108.4% |
| Achieved cooling capacity | kW | 3.09 | 3.13 | 3.17 | 3.20 | 3.24 | 3.28 | 3.32 |
| Capacity relative to reference | | 124.2% | 125.8% | 127.4% | 128.9% | 130.5% | 132.0% | 133.5% |
| Suction pressure drop relative to reference | | 78.9% | 79.0% | 79.1% | 79.3% | 79.4% | 79.5% | 79.6% |
| Pressure ratio | | 11.05 | 10.97 | 10.89 | 10.80 | 10.72 | 10.64 | 10.57 |
| Mass flow through evaporator | kg/hr | 51.9 | 51.9 | 52.0 | 52.0 | 52.0 | 52.0 | 52.0 |
| Liquid injection mass flow | kg/hr | 9.5 | 9.6 | 9.6 | 9.7 | 9.8 | 9.8 | 9.9 |
| Compressor discharge temperature | °C. | 130.0 | 130.0 | 130.0 | 130.0 | 130.0 | 130.0 | 130.0 |
| Evaporator glide (out-in) | K | 4.5 | 4.2 | 4.0 | 3.8 | 3.6 | 3.3 | 3.1 |
| Compressor suction pressure | bar | 1.66 | 1.68 | 1.71 | 1.73 | 1.75 | 1.77 | 1.79 |
| Compressor discharge pressure | bar | 18.4 | 18.5 | 18.6 | 18.7 | 18.8 | 18.9 | 18.9 |
| Condenser glide (in-out) | K | 5.6 | 5.4 | 5.2 | 5.0 | 4.8 | 4.6 | 4.4 |

TABLE 77

Theoretical Performance Data of Selected R-32/R-161/R-134a/R-1234ze(E) blends containing 44% R-32, 10-22% R-161 and 14% R-134a

| | | Composition R-32/R-161/R-134a/R-1234ze(E) % by weight | | | | | | |
|---|---|---|---|---|---|---|---|---|
| | | 44/10/14/32 | 44/12/14/30 | 44/14/14/28 | 44/16/14/26 | 44/18/14/24 | 44/20/14/22 | 44/22/14/20 |
| COP | | 1.29 | 1.29 | 1.29 | 1.29 | 1.29 | 1.29 | 1.29 |
| COP relative to Reference | | 107.6% | 107.6% | 107.6% | 107.6% | 107.6% | 107.7% | 107.7% |
| Achieved cooling capacity | kW | 2.88 | 2.93 | 2.98 | 3.02 | 3.06 | 3.11 | 3.15 |
| Capacity relative to reference | | 116.0% | 117.9% | 119.7% | 121.5% | 123.3% | 125.0% | 126.7% |
| Suction pressure drop relative to reference | | 79.1% | 79.4% | 79.7% | 80.0% | 80.2% | 80.4% | 80.7% |
| Pressure ratio | | 11.57 | 11.48 | 11.38 | 11.29 | 11.20 | 11.11 | 11.02 |
| Mass flow through evaporator | kg/hr | 52.8 | 52.9 | 53.0 | 53.1 | 53.2 | 53.3 | 53.3 |
| Liquid injection mass flow | kg/hr | 9.5 | 9.6 | 9.7 | 9.8 | 9.9 | 10.0 | 10.1 |
| Compressor discharge temperature | °C. | 130.0 | 130.0 | 130.0 | 130.0 | 130.0 | 130.0 | 130.0 |
| Evaporator glide (out-in) | K | 5.3 | 5.2 | 5.0 | 4.9 | 4.7 | 4.5 | 4.4 |
| Compressor suction pressure | bar | 1.55 | 1.58 | 1.61 | 1.63 | 1.66 | 1.68 | 1.71 |
| Compressor discharge pressure | bar | 18.0 | 18.1 | 18.3 | 18.4 | 18.6 | 18.7 | 18.8 |
| Condenser glide (in-out) | K | 6.5 | 6.3 | 6.1 | 5.9 | 5.7 | 5.5 | 5.3 |

TABLE 78

Theoretical Performance Data of Selected R-32/R-161/R-134a/R-1234ze(E) blends containing 44% R-32, 24-34% R-161 and 14% R-134a

| | | Composition R-32/R-161/R-134a/R-1234ze(E) % by weight | | | | | |
|---|---|---|---|---|---|---|---|
| | | 44/24/14/18 | 44/26/14/16 | 44/28/14/14 | 44/30/14/12 | 44/32/14/10 | 44/34/14/8 |
| COP | | 1.29 | 1.29 | 1.29 | 1.29 | 1.29 | 1.30 |
| COP relative to Reference | | 107.7% | 107.8% | 107.8% | 107.8% | 107.9% | 108.0% |
| Achieved cooling capacity | kW | 3.19 | 3.23 | 3.27 | 3.31 | 3.35 | 3.39 |
| Capacity relative to reference | | 128.4% | 130.0% | 131.7% | 133.3% | 134.9% | 136.4% |
| Suction pressure drop relative to reference | | 80.9% | 81.0% | 81.2% | 81.4% | 81.5% | 81.7% |
| Pressure ratio | | 10.94 | 10.85 | 10.77 | 10.69 | 10.61 | 10.53 |
| Mass flow through evaporator | kg/hr | 53.4 | 53.4 | 53.4 | 53.5 | 53.5 | 53.5 |
| Liquid injection mass flow | kg/hr | 10.2 | 10.3 | 10.4 | 10.4 | 10.5 | 10.6 |
| Compressor discharge temperature | ° C. | 130.0 | 130.0 | 130.0 | 130.0 | 130.0 | 130.0 |
| Evaporator glide (out-in) | K | 4.1 | 3.9 | 3.7 | 3.5 | 3.2 | 3.0 |
| Compressor suction pressure | bar | 1.73 | 1.75 | 1.78 | 1.80 | 1.82 | 1.85 |
| Compressor discharge pressure | bar | 18.9 | 19.0 | 19.1 | 19.2 | 19.3 | 19.4 |
| Condenser glide (in-out) | K | 5.1 | 4.9 | 4.7 | 4.5 | 4.4 | 4.2 |

TABLE 79

Theoretical Performance Data of Selected R-32/R-161/R-134a/R-1234ze(E) blends containing 20% R-32, 10-24% R-161 and 18% R-134a

| | | Composition R-32/R-161/R-134a/R-1234ze(E) % by weight | | | | | | | |
|---|---|---|---|---|---|---|---|---|---|
| | | 20/10/18/52 | 20/12/18/50 | 20/14/18/48 | 20/16/18/46 | 20/18/18/44 | 20/20/18/42 | 20/22/18/40 | 20/24/18/38 |
| COP | | 1.30 | 1.30 | 1.30 | 1.31 | 1.31 | 1.31 | 1.31 | 1.31 |
| COP relative to Reference | | 108.3% | 108.5% | 108.7% | 108.8% | 108.9% | 109.1% | 109.2% | 109.3% |
| Achieved cooling capacity | kW | 2.02 | 2.06 | 2.11 | 2.15 | 2.20 | 2.24 | 2.28 | 2.32 |
| Capacity relative to reference | | 81.2% | 83.0% | 84.8% | 86.6% | 88.3% | 90.0% | 91.7% | 93.3% |
| Suction pressure drop relative to reference | | 64.4% | 64.8% | 65.1% | 65.5% | 65.8% | 66.0% | 66.3% | 66.5% |
| Pressure ratio | | 13.05 | 12.92 | 12.80 | 12.68 | 12.57 | 12.45 | 12.34 | 12.24 |
| Mass flow through evaporator | kg/hr | 42.8 | 43.0 | 43.1 | 43.3 | 43.4 | 43.5 | 43.6 | 43.7 |
| Liquid injection mass flow | kg/hr | 4.5 | 4.7 | 4.9 | 5.0 | 5.1 | 5.3 | 5.4 | 5.5 |
| Compressor discharge temperature | ° C. | 130.0 | 130.0 | 130.0 | 130.0 | 130.0 | 130.0 | 130.0 | 130.0 |
| Evaporator glide (out-in) | K | 5.0 | 5.0 | 5.1 | 5.1 | 5.0 | 5.0 | 4.9 | 4.9 |
| Compressor suction pressure | bar | 1.05 | 1.07 | 1.10 | 1.12 | 1.14 | 1.16 | 1.18 | 1.20 |
| Compressor discharge pressure | bar | 13.7 | 13.9 | 14.0 | 14.2 | 14.3 | 14.5 | 14.6 | 14.7 |
| Condenser glide (in-out) | K | 8.6 | 8.5 | 8.4 | 8.2 | 8.1 | 7.9 | 7.7 | 7.5 |

TABLE 80

Theoretical Performance Data of Selected R-32/R-161/R-134a/R-1234ze(E) blends containing 20% R-32, 26-40% R-161 and 18% R-134a

| | | Composition R-32/R-161/R-134a/R-1234ze(E) % by weight | | | | | | | |
|---|---|---|---|---|---|---|---|---|---|
| | | 20/26/18/36 | 20/28/18/34 | 20/30/18/32 | 20/32/18/30 | 20/34/18/28 | 20/36/18/26 | 20/38/18/24 | 20/40/18/22 |
| COP | | 1.31 | 1.31 | 1.31 | 1.31 | 1.32 | 1.32 | 1.32 | 1.32 |
| COP relative to Reference | | 109.4% | 109.4% | 109.5% | 109.6% | 109.7% | 109.7% | 109.8% | 109.9% |
| Achieved cooling capacity | kW | 2.36 | 2.40 | 2.44 | 2.47 | 2.51 | 2.55 | 2.58 | 2.62 |
| Capacity relative to reference | | 94.9% | 96.5% | 98.0% | 99.5% | 101.0% | 102.5% | 103.9% | 105.3% |
| Suction pressure drop relative to reference | | 66.7% | 66.9% | 67.1% | 67.3% | 67.4% | 67.6% | 67.7% | 67.8% |
| Pressure ratio | | 12.13 | 12.03 | 11.93 | 11.84 | 11.74 | 11.65 | 11.56 | 11.47 |
| Mass flow through evaporator | kg/hr | 43.8 | 43.8 | 43.9 | 43.9 | 44.0 | 44.0 | 44.0 | 44.0 |
| Liquid injection mass flow | kg/hr | 5.6 | 5.8 | 5.9 | 6.0 | 6.1 | 6.2 | 6.3 | 6.4 |
| Compressor discharge temperature | ° C. | 130.0 | 130.0 | 130.0 | 130.0 | 130.0 | 130.0 | 130.0 | 130.0 |

TABLE 80-continued

Theoretical Performance Data of Selected R-32/R-161/R-134a/R-1234ze(E) blends containing 20% R-32, 26-40% R-161 and 18% R-134a

| | | Composition R-32/R-161/R-134a/R-1234ze(E) % by weight | | | | | | | |
|---|---|---|---|---|---|---|---|---|---|
| | | 20/26/18/36 | 20/28/18/34 | 20/30/18/32 | 20/32/18/30 | 20/34/18/28 | 20/36/18/26 | 20/38/18/24 | 20/40/18/22 |
| Evaporator glide (out-in) | K | 4.8 | 4.7 | 4.6 | 4.4 | 4.3 | 4.2 | 4.0 | 3.8 |
| Compressor suction pressure | bar | 1.22 | 1.25 | 1.27 | 1.29 | 1.30 | 1.32 | 1.34 | 1.36 |
| Compressor discharge pressure | bar | 14.9 | 15.0 | 15.1 | 15.2 | 15.3 | 15.4 | 15.5 | 15.6 |
| Condenser glide (in-out) | K | 7.3 | 7.1 | 6.9 | 6.7 | 6.5 | 6.3 | 6.1 | 5.9 |

TABLE 81

Theoretical Performance Data of Selected R-32/R-161/R-134a/R-1234ze(E) blends containing 20% R-32, 42-54% R-161 and 18% R-134a

| | | Composition R-32/R-161/R-134a/R-1234ze(E) % by weight | | | | | | |
|---|---|---|---|---|---|---|---|---|
| | | 20/42/18/20 | 20/44/18/18 | 20/46/18/16 | 20/48/18/14 | 20/50/18/12 | 20/52/18/10 | 20/54/18/8 |
| COP | | 1.32 | 1.32 | 1.32 | 1.32 | 1.32 | 1.32 | 1.32 |
| COP relative to Reference | | 109.9% | 110.0% | 110.0% | 110.1% | 110.2% | 110.2% | 110.3% |
| Achieved cooling capacity | kW | 2.65 | 2.69 | 2.72 | 2.76 | 2.79 | 2.82 | 2.85 |
| Capacity relative to reference | | 106.7% | 108.1% | 109.5% | 110.9% | 112.2% | 113.5% | 114.8% |
| Suction pressure drop relative to reference | | 67.9% | 68.0% | 68.1% | 68.1% | 68.2% | 68.3% | 68.3% |
| Pressure ratio | | 11.38 | 11.30 | 11.22 | 11.13 | 11.05 | 10.97 | 10.90 |
| Mass flow through evaporator | kg/hr | 44.0 | 44.0 | 44.0 | 44.0 | 44.0 | 44.0 | 44.0 |
| Liquid injection mass flow | kg/hr | 6.4 | 6.5 | 6.6 | 6.7 | 6.8 | 6.8 | 6.9 |
| Compressor discharge temperature | °C. | 130.0 | 130.0 | 130.0 | 130.0 | 130.0 | 130.0 | 130.0 |
| Evaporator glide (out-in) | K | 3.7 | 3.5 | 3.3 | 3.1 | 2.9 | 2.7 | 2.5 |
| Compressor suction pressure | bar | 1.38 | 1.40 | 1.42 | 1.44 | 1.45 | 1.47 | 1.49 |
| Compressor discharge pressure | bar | 15.7 | 15.8 | 15.9 | 16.0 | 16.1 | 16.2 | 16.2 |
| Condenser glide (in-out) | K | 5.7 | 5.5 | 5.3 | 5.1 | 5.0 | 4.8 | 4.6 |

TABLE 82

Theoretical Performance Data of Selected R-32/R-161/R-134a/R-1234ze(E) blends containing 24% R-32, 10-22% R-161 and 18% R-134a

| | | Composition R-32/R-161/R-134a/R-1234ze(E) % by weight | | | | | | |
|---|---|---|---|---|---|---|---|---|
| | | 24/10/18/48 | 24/12/18/46 | 24/14/18/44 | 24/16/18/42 | 24/18/18/40 | 24/20/18/38 | 24/22/18/36 |
| COP | | 1.30 | 1.30 | 1.30 | 1.30 | 1.31 | 1.31 | 1.31 |
| COP relative to Reference | | 108.4% | 108.5% | 108.6% | 108.7% | 108.8% | 108.9% | 109.0% |
| Achieved cooling capacity | kW | 2.17 | 2.22 | 2.26 | 2.31 | 2.35 | 2.39 | 2.43 |
| Capacity relative to reference | | 87.5% | 89.3% | 91.1% | 92.9% | 94.6% | 96.3% | 97.9% |
| Suction pressure drop relative to reference | | 67.4% | 67.8% | 68.1% | 68.4% | 68.7% | 69.0% | 69.2% |
| Pressure ratio | | 12.75 | 12.63 | 12.52 | 12.40 | 12.29 | 12.19 | 12.08 |
| Mass flow through evaporator | kg/hr | 44.8 | 45.0 | 45.1 | 45.3 | 45.4 | 45.5 | 45.5 |
| Liquid injection mass flow | kg/hr | 5.4 | 5.5 | 5.6 | 5.8 | 5.9 | 6.1 | 6.2 |
| Compressor discharge temperature | °C. | 130.0 | 130.0 | 130.0 | 130.0 | 130.0 | 130.0 | 130.0 |
| Evaporator glide (out-in) | K | 5.4 | 5.4 | 5.4 | 5.4 | 5.3 | 5.3 | 5.2 |
| Compressor suction pressure | bar | 1.14 | 1.16 | 1.18 | 1.21 | 1.23 | 1.25 | 1.27 |
| Compressor discharge pressure | bar | 14.5 | 14.7 | 14.8 | 15.0 | 15.1 | 15.2 | 15.4 |
| Condenser glide (in-out) | K | 8.5 | 8.4 | 8.2 | 8.1 | 7.9 | 7.7 | 7.5 |

TABLE 83

Theoretical Performance Data of Selected R-32/R-161/R-134a/R-1234ze(E) blends containing 24% R-32, 24-36% R-161 and 18% R-134a

| | | Composition R-32/R-161/R-134a/R-1234ze(E) % by weight | | | | | | |
|---|---|---|---|---|---|---|---|---|
| | | 24/24/18/34 | 24/26/18/32 | 24/28/18/30 | 24/30/18/28 | 24/32/18/26 | 24/34/18/24 | 24/36/18/22 |
| COP | | 1.31 | 1.31 | 1.31 | 1.31 | 1.31 | 1.31 | 1.31 |
| COP relative to Reference | | 109.1% | 109.2% | 109.2% | 109.3% | 109.4% | 109.4% | 109.5% |

TABLE 83-continued

Theoretical Performance Data of Selected R-32/R-161/R-134a/R-1234ze(E) blends containing 24% R-32, 24-36% R-161 and 18% R-134a

| | | Composition R-32/R-161/R-134a/R-1234ze(E) % by weight | | | | | | |
|---|---|---|---|---|---|---|---|---|
| | | 24/24/18/34 | 24/26/18/32 | 24/28/18/30 | 24/30/18/28 | 24/32/18/26 | 24/34/18/24 | 24/36/18/22 |
| Achieved cooling capacity | kW | 2.47 | 2.51 | 2.55 | 2.59 | 2.63 | 2.67 | 2.70 |
| Capacity relative to reference | | 99.6% | 101.2% | 102.7% | 104.3% | 105.8% | 107.3% | 108.7% |
| Suction pressure drop relative to reference | | 69.4% | 69.6% | 69.8% | 70.0% | 70.1% | 70.2% | 70.4% |
| Pressure ratio | | 11.98 | 11.88 | 11.79 | 11.69 | 11.60 | 11.51 | 11.42 |
| Mass flow through evaporator | kg/hr | 45.6 | 45.7 | 45.7 | 45.8 | 45.8 | 45.8 | 45.8 |
| Liquid injection mass flow | kg/hr | 6.3 | 6.4 | 6.5 | 6.6 | 6.7 | 6.8 | 6.9 |
| Compressor discharge temperature | ° C. | 130.0 | 130.0 | 130.0 | 130.0 | 130.0 | 130.0 | 130.0 |
| Evaporator glide (out-in) | K | 5.1 | 5.0 | 4.8 | 4.7 | 4.5 | 4.4 | 4.2 |
| Compressor suction pressure | bar | 1.29 | 1.31 | 1.34 | 1.36 | 1.38 | 1.40 | 1.42 |
| Compressor discharge pressure | bar | 15.5 | 15.6 | 15.7 | 15.9 | 16.0 | 16.1 | 16.2 |
| Condenser glide (in-out) | K | 7.3 | 7.1 | 6.9 | 6.7 | 6.5 | 6.3 | 6.1 |

TABLE 84

Theoretical Performance Data of Selected R-32/R-161/R-134a/R-1234ze(E) blends containing 24% R-32, 38-50% R-161 and 18% R-134a

| | | Composition R-32/R-161/R-134a/R-1234ze(E) % by weight | | | | | | |
|---|---|---|---|---|---|---|---|---|
| | | 24/38/18/20 | 24/40/18/18 | 24/42/18/16 | 24/44/18/14 | 24/46/18/12 | 24/48/18/10 | 24/50/18/8 |
| COP | | 1.31 | 1.31 | 1.32 | 1.32 | 1.32 | 1.32 | 1.32 |
| COP relative to Reference | | 109.5% | 109.6% | 109.7% | 109.7% | 109.8% | 109.8% | 109.9% |
| Achieved cooling capacity | kW | 2.74 | 2.77 | 2.81 | 2.84 | 2.88 | 2.91 | 2.95 |
| Capacity relative to reference | | 110.2% | 111.6% | 113.0% | 114.4% | 115.8% | 117.2% | 118.5% |
| Suction pressure drop relative to reference | | 70.5% | 70.6% | 70.6% | 70.7% | 70.8% | 70.9% | 70.9% |
| Pressure ratio | | 11.33 | 11.25 | 11.16 | 11.08 | 11.00 | 10.92 | 10.84 |
| Mass flow through evaporator | kg/hr | 45.8 | 45.8 | 45.8 | 45.8 | 45.8 | 45.8 | 45.8 |
| Liquid injection mass flow | kg/hr | 7.0 | 7.1 | 7.2 | 7.2 | 7.3 | 7.4 | 7.4 |
| Compressor discharge temperature | ° C. | 130.0 | 130.0 | 130.0 | 130.0 | 130.0 | 130.0 | 130.0 |
| Evaporator glide (out-in) | K | 4.0 | 3.8 | 3.6 | 3.4 | 3.2 | 3.0 | 2.8 |
| Compressor suction pressure | bar | 1.44 | 1.46 | 1.47 | 1.49 | 1.51 | 1.53 | 1.55 |
| Compressor discharge pressure | bar | 16.3 | 16.4 | 16.5 | 16.5 | 16.6 | 16.7 | 16.8 |
| Condenser glide (in-out) | K | 5.9 | 5.7 | 5.5 | 5.3 | 5.1 | 5.0 | 4.8 |

TABLE 85

Theoretical Performance Data of Selected R-32/R-161/R-134a/R-1234ze(E) blends containing 28% R-32, 10-20% R-161 and 18% R-134a

| | | Composition R-32/R-161/R-134a/R-1234ze(E) % by weight | | | | | |
|---|---|---|---|---|---|---|---|
| | | 28/10/18/44 | 28/12/18/42 | 28/14/18/40 | 28/16/18/38 | 28/18/18/36 | 28/20/18/34 |
| COP | | 1.30 | 1.30 | 1.30 | 1.30 | 1.30 | 1.30 |
| COP relative to Reference | | 108.3% | 108.4% | 108.5% | 108.6% | 108.7% | 108.7% |
| Achieved cooling capacity | kW | 2.33 | 2.37 | 2.42 | 2.46 | 2.50 | 2.55 |
| Capacity relative to reference | | 93.6% | 95.4% | 97.2% | 99.0% | 100.7% | 102.4% |
| Suction pressure drop relative to reference | | 70.3% | 70.6% | 70.9% | 71.2% | 71.5% | 71.7% |
| Pressure ratio | | 12.48 | 12.36 | 12.25 | 12.14 | 12.04 | 11.94 |
| Mass flow through evaporator | kg/hr | 46.7 | 46.9 | 47.0 | 47.1 | 47.2 | 47.3 |
| Liquid injection mass flow | kg/hr | 6.2 | 6.3 | 6.5 | 6.6 | 6.7 | 6.9 |
| Compressor discharge temperature | ° C. | 130.0 | 130.0 | 130.0 | 130.0 | 130.0 | 130.0 |
| Evaporator glide (out-in) | K | 5.6 | 5.6 | 5.6 | 5.5 | 5.4 | 5.3 |
| Compressor suction pressure | bar | 1.22 | 1.25 | 1.27 | 1.29 | 1.32 | 1.34 |
| Compressor discharge pressure | bar | 15.3 | 15.4 | 15.6 | 15.7 | 15.8 | 16.0 |
| Condenser glide (in-out) | K | 8.3 | 8.1 | 7.9 | 7.8 | 7.6 | 7.4 |

TABLE 86

Theoretical Performance Data of Selected R-32/R-161/R-134a/R-1234ze(E) blends containing 28% R-32, 22-32% R-161 and 18% R-134a

| | | Composition R-32/R-161/R-134a/R-1234ze(E) % by weight | | | | | |
|---|---|---|---|---|---|---|---|
| | | 28/22/18/32 | 28/24/18/30 | 28/26/18/28 | 28/28/18/26 | 28/30/18/24 | 28/32/18/22 |
| COP | | 1.31 | 1.31 | 1.31 | 1.31 | 1.31 | 1.31 |
| COP relative to Reference | | 108.8% | 108.9% | 108.9% | 109.0% | 109.0% | 109.1% |
| Achieved cooling capacity | kW | 2.59 | 2.63 | 2.67 | 2.71 | 2.74 | 2.78 |
| Capacity relative to reference | | 104.1% | 105.7% | 107.3% | 108.9% | 110.4% | 112.0% |
| Suction pressure drop relative to reference | | 72.0% | 72.2% | 72.3% | 72.5% | 72.6% | 72.8% |
| Pressure ratio | | 11.84 | 11.74 | 11.64 | 11.55 | 11.46 | 11.37 |
| Mass flow through evaporator | kg/hr | 47.4 | 47.4 | 47.5 | 47.5 | 47.5 | 47.6 |
| Liquid injection mass flow | kg/hr | 7.0 | 7.1 | 7.2 | 7.3 | 7.4 | 7.5 |
| Compressor discharge temperature | °C. | 130.0 | 130.0 | 130.0 | 130.0 | 130.0 | 130.0 |
| Evaporator glide (out-in) | K | 5.2 | 5.1 | 4.9 | 4.8 | 4.6 | 4.5 |
| Compressor suction pressure | bar | 1.36 | 1.38 | 1.40 | 1.43 | 1.45 | 1.47 |
| Compressor discharge pressure | bar | 16.1 | 16.2 | 16.4 | 16.5 | 16.6 | 16.7 |
| Condenser glide (in-out) | K | 7.2 | 7.0 | 6.8 | 6.6 | 6.4 | 6.2 |

TABLE 87

Theoretical Performance Data of Selected R-32/R-161/R-134a/R-1234ze(E) blends containing 28% R-32, 34-46% R161 and 18% R-134a

| | | Composition R-32/R-161/R-134a/R-1234ze(E) % by weight | | | | | | |
|---|---|---|---|---|---|---|---|---|
| | | 28/34/18/20 | 28/36/18/18 | 28/38/18/16 | 28/40/18/14 | 28/42/18/12 | 28/44/18/10 | 28/46/18/8 |
| COP | | 1.31 | 1.31 | 1.31 | 1.31 | 1.31 | 1.31 | 1.31 |
| COP relative to Reference | | 109.1% | 109.2% | 109.2% | 109.3% | 109.4% | 109.4% | 109.5% |
| Achieved cooling capacity | kW | 2.82 | 2.86 | 2.89 | 2.93 | 2.96 | 3.00 | 3.03 |
| Capacity relative to reference | | 113.5% | 114.9% | 116.4% | 117.8% | 119.3% | 120.7% | 122.1% |
| Suction pressure drop relative to reference | | 72.9% | 73.0% | 73.1% | 73.2% | 73.3% | 73.4% | 73.4% |
| Pressure ratio | | 11.28 | 11.20 | 11.11 | 11.03 | 10.95 | 10.87 | 10.79 |
| Mass flow through evaporator | kg/hr | 47.6 | 47.6 | 47.6 | 47.6 | 47.6 | 47.6 | 47.5 |
| Liquid injection mass flow | kg/hr | 7.6 | 7.7 | 7.7 | 7.8 | 7.9 | 8.0 | 8.0 |
| Compressor discharge temperature | °C. | 130.0 | 130.0 | 130.0 | 130.0 | 130.0 | 130.0 | 130.0 |
| Evaporator glide (out-in) | K | 4.3 | 4.1 | 3.9 | 3.7 | 3.4 | 3.2 | 3.0 |
| Compressor suction pressure | bar | 1.49 | 1.51 | 1.53 | 1.55 | 1.57 | 1.59 | 1.61 |
| Compressor discharge pressure | bar | 16.8 | 16.9 | 17.0 | 17.1 | 17.2 | 17.3 | 17.3 |
| Condenser glide (in-out) | K | 6.0 | 5.8 | 5.6 | 5.4 | 5.2 | 5.0 | 4.8 |

TABLE 88

Theoretical Performance Data of Selected R-32/R-161/R-134a/R-1234ze(E) blends containing 32% R-32, 10-20% R-161 and 18% R-134a

| | | Composition R-32/R-161/R-134a/R-1234ze(E) % by weight | | | | | |
|---|---|---|---|---|---|---|---|
| | | 32/10/18/40 | 32/12/18/38 | 32/14/18/36 | 32/16/18/34 | 32/18/18/32 | 32/20/18/30 |
| COP | | 1.30 | 1.30 | 1.30 | 1.30 | 1.30 | 1.30 |
| COP relative to Reference | | 108.2% | 108.2% | 108.3% | 108.4% | 108.4% | 108.5% |
| Achieved cooling capacity | kW | 2.47 | 2.52 | 2.57 | 2.61 | 2.65 | 2.69 |
| Capacity relative to reference | | 99.5% | 101.4% | 103.2% | 105.0% | 106.7% | 108.4% |
| Suction pressure drop relative to reference | | 72.9% | 73.2% | 73.5% | 73.8% | 74.1% | 74.3% |
| Pressure ratio | | 12.22 | 12.11 | 12.00 | 11.90 | 11.80 | 11.70 |
| Mass flow through evaporator | kg/hr | 48.5 | 48.6 | 48.7 | 48.8 | 48.9 | 49.0 |
| Liquid injection mass flow | kg/hr | 7.0 | 7.2 | 7.3 | 7.4 | 7.6 | 7.7 |
| Compressor discharge temperature | °C. | 130.0 | 130.0 | 130.0 | 130.0 | 130.0 | 130.0 |
| Evaporator glide (out-in) | K | 5.7 | 5.6 | 5.5 | 5.5 | 5.3 | 5.2 |
| Compressor suction pressure | bar | 1.31 | 1.33 | 1.36 | 1.38 | 1.40 | 1.43 |
| Compressor discharge pressure | bar | 16.0 | 16.1 | 16.3 | 16.4 | 16.6 | 16.7 |
| Condenser glide (in-out) | K | 7.8 | 7.7 | 7.5 | 7.3 | 7.1 | 6.9 |

TABLE 89

Theoretical Performance Data of Selected R-32/R-161/R-134a/R-1234ze(E) blends containing 32% R-32, 22-32% R-161 and 18% R-134a

| | | Composition R-32/R-161/R-134a/R-1234ze(E) % by weight | | | | | |
|---|---|---|---|---|---|---|---|
| | | 32/22/18/28 | 32/24/18/26 | 32/16/18/24 | 32/28/18/22 | 32/30/18/20 | 32/32/18/18 |
| COP | | 1.30 | 1.30 | 1.30 | 1.30 | 1.30 | 1.30 |
| COP relative to Reference | | 108.5% | 108.6% | 108.6% | 108.7% | 108.7% | 108.8% |
| Achieved cooling capacity | kW | 2.74 | 2.78 | 2.82 | 2.86 | 2.90 | 2.93 |
| Capacity relative to reference | | 110.1% | 111.7% | 113.3% | 114.9% | 116.5% | 118.0% |
| Suction pressure drop relative to reference | | 74.5% | 74.7% | 74.9% | 75.0% | 75.2% | 75.3% |
| Pressure ratio | | 11.61 | 11.51 | 11.42 | 11.33 | 11.24 | 11.15 |
| Mass flow through evaporator | kg/hr | 49.1 | 49.1 | 49.2 | 49.2 | 49.2 | 49.3 |
| Liquid injection mass flow | kg/hr | 7.8 | 7.9 | 8.0 | 8.1 | 8.2 | 8.3 |
| Compressor discharge temperature | ° C. | 130.0 | 130.0 | 130.0 | 130.0 | 130.0 | 130.0 |
| Evaporator glide (out-in) | K | 5.1 | 4.9 | 4.8 | 4.6 | 4.4 | 4.2 |
| Compressor suction pressure | bar | 1.45 | 1.47 | 1.50 | 1.52 | 1.54 | 1.56 |
| Compressor discharge pressure | bar | 16.8 | 17.0 | 17.1 | 17.2 | 17.3 | 17.4 |
| Condenser glide (in-out) | K | 6.7 | 6.5 | 6.3 | 6.1 | 5.9 | 5.7 |

TABLE 90

Theoretical Performance Data of Selected R-32/R-161/R-134a/R-1234ze(E) blends containing 32% R-32, 34-42% R-161 and 18% R-134a

| | | Composition R-32/R-161/R-134a/R-1234ze(E) % by weight | | | | |
|---|---|---|---|---|---|---|
| | | 32/34/18/16 | 32/36/18/14 | 32/38/18/12 | 32/40/18/10 | 32/42/18/8 |
| COP | | 1.31 | 1.31 | 1.31 | 1.31 | 1.31 |
| COP relative to Reference | | 108.8% | 108.9% | 108.9% | 109.0% | 109.0% |
| Achieved cooling capacity | kW | 2.97 | 3.01 | 3.05 | 3.08 | 3.12 |
| Capacity relative to reference | | 119.6% | 121.1% | 122.5% | 124.0% | 125.5% |
| Suction pressure drop relative to reference | | 75.5% | 75.6% | 75.7% | 75.8% | 75.9% |
| Pressure ratio | | 11.07 | 10.99 | 10.90 | 10.82 | 10.74 |
| Mass flow through evaporator | kg/hr | 49.3 | 49.3 | 49.3 | 49.3 | 49.3 |
| Liquid injection mass flow | kg/hr | 8.4 | 8.4 | 8.5 | 8.6 | 8.6 |
| Compressor discharge temperature | ° C. | 130.0 | 130.0 | 130.0 | 130.0 | 130.0 |
| Evaporator glide (out-in) | K | 4.0 | 3.8 | 3.6 | 3.3 | 3.1 |
| Compressor suction pressure | bar | 1.58 | 1.60 | 1.62 | 1.64 | 1.66 |
| Compressor discharge pressure | bar | 17.5 | 17.6 | 17.7 | 17.8 | 17.9 |
| Condenser glide (in-out) | K | 5.5 | 5.3 | 5.1 | 4.9 | 4.8 |

TABLE 91

Theoretical Performance Data of Selected R-32/R-161/R-134a/R-1234ze(E) blends containing 36% R-32, 10-22% R-161 and 18% R-134a

| | | Composition R-32/R-161/R-134a/R-1234ze(E) % by weight | | | | | | |
|---|---|---|---|---|---|---|---|---|
| | | 36/10/18/36 | 36/12/18/34 | 36/14/18/32 | 36/16/18/30 | 36/18/18/28 | 36/20/18/26 | 36/22/18/24 |
| COP | | 1.30 | 1.30 | 1.30 | 1.30 | 1.30 | 1.30 | 1.30 |
| COP relative to Reference | | 107.9% | 108.0% | 108.0% | 108.1% | 108.1% | 108.2% | 108.2% |
| Achieved cooling capacity | kW | 2.62 | 2.67 | 2.71 | 2.75 | 2.80 | 2.84 | 2.88 |
| Capacity relative to reference | | 105.4% | 107.2% | 109.1% | 110.8% | 112.6% | 114.3% | 116.0% |
| Suction pressure drop relative to reference | | 75.3% | 75.6% | 75.9% | 76.2% | 76.4% | 76.7% | 76.9% |
| Pressure ratio | | 11.98 | 11.87 | 11.77 | 11.67 | 11.57 | 11.48 | 11.39 |
| Mass flow through evaporator | kg/hr | 50.1 | 50.2 | 50.4 | 50.5 | 50.6 | 50.6 | 50.7 |
| Liquid injection mass flow | kg/hr | 7.9 | 8.0 | 8.1 | 8.3 | 8.4 | 8.5 | 8.6 |
| Compressor discharge temperature | ° C. | 130.0 | 130.0 | 130.0 | 130.0 | 130.0 | 130.0 | 130.0 |
| Evaporator glide (out-in) | K | 5.5 | 5.5 | 5.4 | 5.3 | 5.1 | 5.0 | 4.8 |
| Compressor suction pressure | bar | 1.39 | 1.42 | 1.44 | 1.47 | 1.49 | 1.52 | 1.54 |
| Compressor discharge pressure | bar | 16.7 | 16.9 | 17.0 | 17.1 | 17.3 | 17.4 | 17.5 |
| Condenser glide (in-out) | K | 7.3 | 7.2 | 7.0 | 6.8 | 6.6 | 6.4 | 6.2 |

TABLE 92

Theoretical Performance Data of Selected R-32/R-161/R-134a/R-1234ze(E) blends containing 36% R-32, 24-38% R-161 and 18% R-134a

| | | Composition R-32/R-161/R-134a/R-1234ze(E) % by weight | | | | | | | |
|---|---|---|---|---|---|---|---|---|---|
| | | 36/24/18/22 | 36/26/18/20 | 36/28/18/18 | 36/30/18/16 | 36/32/18/14 | 36/34/18/12 | 36/36/18/10 | 36/38/18/8 |
| COP | | 1.30 | 1.30 | 1.30 | 1.30 | 1.30 | 1.30 | 1.30 | 1.30 |
| COP relative to Reference | | 108.2% | 108.3% | 108.3% | 108.4% | 108.4% | 108.5% | 108.5% | 108.6% |
| Achieved cooling capacity | kW | 2.92 | 2.96 | 3.00 | 3.04 | 3.08 | 3.12 | 3.16 | 3.20 |
| Capacity relative to reference | | 117.6% | 119.3% | 120.9% | 122.5% | 124.0% | 125.6% | 127.1% | 128.6% |
| Suction pressure drop relative to reference | | 77.1% | 77.3% | 77.5% | 77.6% | 77.8% | 77.9% | 78.0% | 78.1% |
| Pressure ratio | | 11.29 | 11.21 | 11.12 | 11.03 | 10.95 | 10.86 | 10.78 | 10.70 |
| Mass flow through evaporator | kg/hr | 50.8 | 50.8 | 50.8 | 50.9 | 50.9 | 50.9 | 50.9 | 50.9 |
| Liquid injection mass flow | kg/hr | 8.7 | 8.8 | 8.9 | 9.0 | 9.1 | 9.1 | 9.2 | 9.3 |
| Compressor discharge temperature | ° C. | 130.0 | 130.0 | 130.0 | 130.0 | 130.0 | 130.0 | 130.0 | 130.0 |
| Evaporator glide (out-in) | K | 4.6 | 4.5 | 4.3 | 4.1 | 3.8 | 3.6 | 3.4 | 3.1 |
| Compressor suction pressure | bar | 1.56 | 1.59 | 1.61 | 1.63 | 1.65 | 1.67 | 1.70 | 1.72 |
| Compressor discharge pressure | bar | 17.7 | 17.8 | 17.9 | 18.0 | 18.1 | 18.2 | 18.3 | 18.4 |
| Condenser glide (in-out) | K | 6.0 | 5.8 | 5.6 | 5.4 | 5.2 | 5.0 | 4.8 | 4.6 |

TABLE 93

Theoretical Performance Data of Selected R-32/R-161/R-134a/R-1234ze(E) blends containing 40% R-32, 10-20% R-161 and 18% R-134a

| | | Composition R-32/R-161/R-134a/R-1234ze(E) % by weight | | | | | |
|---|---|---|---|---|---|---|---|
| | | 40/10/18/32 | 40/12/18/30 | 40/14/18/28 | 40/16/18/26 | 40/18/18/24 | 40/20/18/22 |
| COP | | 1.29 | 1.29 | 1.29 | 1.29 | 1.29 | 1.29 |
| COP relative to Reference | | 107.7% | 107.7% | 107.8% | 107.8% | 107.8% | 107.8% |
| Achieved cooling capacity | kW | 2.76 | 2.81 | 2.85 | 2.90 | 2.94 | 2.99 |
| Capacity relative to reference | | 111.1% | 113.0% | 114.8% | 116.6% | 118.4% | 120.1% |
| Suction pressure drop relative to reference | | 77.5% | 77.8% | 78.1% | 78.4% | 78.7% | 78.9% |
| Pressure ratio | | 11.75 | 11.65 | 11.55 | 11.45 | 11.36 | 11.27 |
| Mass flow through evaporator | kg/hr | 51.6 | 51.7 | 51.9 | 52.0 | 52.1 | 52.2 |
| Liquid injection mass flow | kg/hr | 8.7 | 8.9 | 9.0 | 9.1 | 9.2 | 9.3 |
| Compressor discharge temperature | ° C. | 130.0 | 130.0 | 130.0 | 130.0 | 130.0 | 130.0 |
| Evaporator glide (out-in) | K | 5.3 | 5.2 | 5.1 | 4.9 | 4.8 | 4.6 |
| Compressor suction pressure | bar | 1.48 | 1.51 | 1.53 | 1.56 | 1.58 | 1.61 |
| Compressor discharge pressure | bar | 17.4 | 17.5 | 17.7 | 17.8 | 18.0 | 18.1 |
| Condenser glide (in-out) | K | 6.8 | 6.6 | 6.4 | 6.2 | 6.0 | 5.8 |

TABLE 94

Theoretical Performance Data of Selected R-32/R-161/R-134a/R-1234ze(E) blends containing 40% R-32, 22-34% R-161 and 18% R-134a

| | | Composition R-32/R-161/R-134a/R-1234ze(E) % by weight | | | | | | |
|---|---|---|---|---|---|---|---|---|
| | | 40/22/18/20 | 40/24/18/18 | 40/26/18/16 | 40/28/18/14 | 40/30/18/12 | 40/32/18/10 | 40/34/18/8 |
| COP | | 1.29 | 1.29 | 1.30 | 1.30 | 1.30 | 1.30 | 1.30 |
| COP relative to Reference | | 107.9% | 107.9% | 107.9% | 108.0% | 108.0% | 108.1% | 108.1% |
| Achieved cooling capacity | kW | 3.03 | 3.07 | 3.11 | 3.15 | 3.19 | 3.23 | 3.27 |
| Capacity relative to reference | | 121.8% | 123.5% | 125.1% | 126.8% | 128.4% | 130.0% | 131.6% |
| Suction pressure drop relative to reference | | 79.2% | 79.4% | 79.6% | 79.7% | 79.9% | 80.1% | 80.2% |
| Pressure ratio | | 11.18 | 11.09 | 11.00 | 10.91 | 10.83 | 10.75 | 10.67 |
| Mass flow through evaporator | kg/hr | 52.2 | 52.3 | 52.3 | 52.4 | 52.4 | 52.5 | 52.5 |
| Liquid injection mass flow | kg/hr | 9.4 | 9.5 | 9.6 | 9.7 | 9.8 | 9.9 | 9.9 |
| Compressor discharge temperature | ° C. | 130.0 | 130.0 | 130.0 | 130.0 | 130.0 | 130.0 | 130.0 |
| Evaporator glide (out-in) | K | 4.4 | 4.2 | 4.0 | 3.8 | 3.6 | 3.4 | 3.1 |
| Compressor suction pressure | bar | 1.63 | 1.65 | 1.68 | 1.70 | 1.72 | 1.75 | 1.77 |
| Compressor discharge pressure | bar | 18.2 | 18.3 | 18.5 | 18.6 | 18.7 | 18.8 | 18.9 |
| Condenser glide (in-out) | K | 5.6 | 5.4 | 5.2 | 5.0 | 4.8 | 4.6 | 4.4 |

TABLE 95

Theoretical Performance Data of Selected R-32/R-161/R-134a/R-1234ze(E) blends containing 20% R-32, 10-22% R-161 and 22% R-134a

| | | Composition R-32/R-161/R-134a/R-1234ze(E) % by weight | | | | | | |
|---|---|---|---|---|---|---|---|---|
| | | 20/10/22/48 | 20/12/22/46 | 20/14/22/44 | 20/16/22/42 | 20/18/22/40 | 20/20/22/38 | 20/22/22/36 |
| COP | | 1.30 | 1.30 | 1.30 | 1.30 | 1.30 | 1.31 | 1.31 |
| COP relative to Reference | | 108.2% | 108.3% | 108.5% | 108.6% | 108.7% | 108.8% | 108.9% |
| Achieved cooling capacity | kW | 2.04 | 2.08 | 2.13 | 2.17 | 2.22 | 2.26 | 2.30 |
| Capacity relative to reference | | 82.0% | 83.9% | 85.7% | 87.5% | 89.2% | 90.9% | 92.6% |
| Suction pressure drop relative to reference | | 65.0% | 65.4% | 65.8% | 66.2% | 66.5% | 66.8% | 67.1% |
| Pressure ratio | | 12.99 | 12.87 | 12.74 | 12.62 | 12.51 | 12.39 | 12.28 |
| Mass flow through evaporator | kg/hr | 43.2 | 43.4 | 43.6 | 43.7 | 43.9 | 44.0 | 44.1 |
| Liquid injection mass flow | kg/hr | 4.7 | 4.8 | 5.0 | 5.1 | 5.3 | 5.4 | 5.5 |
| Compressor discharge temperature | °C. | 130.0 | 130.0 | 130.0 | 130.0 | 130.0 | 130.0 | 130.0 |
| Evaporator glide (out-in) | K | 4.8 | 4.8 | 4.8 | 4.8 | 4.8 | 4.7 | 4.7 |
| Compressor suction pressure | bar | 1.06 | 1.09 | 1.11 | 1.13 | 1.16 | 1.18 | 1.20 |
| Compressor discharge pressure | bar | 13.8 | 14.0 | 14.1 | 14.3 | 14.4 | 14.6 | 14.7 |
| Condenser glide (in-out) | K | 8.2 | 8.1 | 8.0 | 7.8 | 7.6 | 7.5 | 7.3 |

TABLE 96

Theoretical Performance Data of Selected R-32/R-161/R-134a/R-1234ze(E) blends containing 20% R-32, 24-36% R-161 and 22% R-134a

| | | Composition R-32/R-161/R-134a/R-1234ze(E) % by weight | | | | | | |
|---|---|---|---|---|---|---|---|---|
| | | 20/24/22/34 | 20/26/22/32 | 20/28/22/30 | 20/30/22/28 | 20/32/22/26 | 20/34/22/24 | 20/36/22/22 |
| COP | | 1.31 | 1.31 | 1.31 | 1.31 | 1.31 | 1.31 | 1.31 |
| COP relative to Reference | | 109.0% | 109.1% | 109.2% | 109.3% | 109.4% | 109.4% | 109.5% |
| Achieved cooling capacity | kW | 2.34 | 2.38 | 2.42 | 2.46 | 2.50 | 2.54 | 2.57 |
| Capacity relative to reference | | 94.3% | 95.9% | 97.5% | 99.0% | 100.6% | 102.1% | 103.5% |
| Suction pressure drop relative to reference | | 67.3% | 67.6% | 67.8% | 68.0% | 68.2% | 68.3% | 68.5% |
| Pressure ratio | | 12.17 | 12.07 | 11.97 | 11.87 | 11.77 | 11.68 | 11.58 |
| Mass flow through evaporator | kg/hr | 44.2 | 44.3 | 44.3 | 44.4 | 44.5 | 44.5 | 44.5 |
| Liquid injection mass flow | kg/hr | 5.7 | 5.8 | 5.9 | 6.0 | 6.1 | 6.2 | 6.3 |
| Compressor discharge temperature | °C. | 130.0 | 130.0 | 130.0 | 130.0 | 130.0 | 130.0 | 130.0 |
| Evaporator glide (out-in) | K | 4.6 | 4.5 | 4.4 | 4.3 | 4.1 | 4.0 | 3.8 |
| Compressor suction pressure | bar | 1.22 | 1.24 | 1.26 | 1.28 | 1.30 | 1.32 | 1.34 |
| Compressor discharge pressure | bar | 14.9 | 15.0 | 15.1 | 15.2 | 15.3 | 15.4 | 15.6 |
| Condenser glide (in-out) | K | 7.1 | 6.9 | 6.7 | 6.5 | 6.3 | 6.1 | 5.9 |

TABLE 97

Theoretical Performance Data of Selected R-32/R-161/R-134a/R-1234ze(E) blends containing 20% R-32, 38-48% R-161 and 22% R-134a

| | | Composition R-32/R-161/R-134a/R-1234ze(E) % by weight | | | | | |
|---|---|---|---|---|---|---|---|
| | | 20/38/22/20 | 20/40/22/18 | 20/42/22/16 | 20/44/22/14 | 20/46/22/12 | 20/48/22/10 |
| COP | | 1.31 | 1.32 | 1.32 | 1.32 | 1.32 | 1.32 |
| COP relative to Reference | | 109.6% | 109.6% | 109.7% | 109.8% | 109.8% | 109.9% |
| Achieved cooling capacity | kW | 2.61 | 2.65 | 2.68 | 2.72 | 2.75 | 2.79 |
| Capacity relative to reference | | 105.0% | 106.5% | 107.9% | 109.3% | 110.7% | 112.1% |
| Suction pressure drop relative to reference | | 68.6% | 68.7% | 68.9% | 69.0% | 69.1% | 69.2% |
| Pressure ratio | | 11.49 | 11.40 | 11.31 | 11.23 | 11.14 | 11.06 |
| Mass flow through evaporator | kg/hr | 44.6 | 44.6 | 44.6 | 44.6 | 44.6 | 44.6 |
| Liquid injection mass flow | kg/hr | 6.4 | 6.5 | 6.6 | 6.7 | 6.7 | 6.8 |
| Compressor discharge temperature | °C. | 130.0 | 130.0 | 130.0 | 130.0 | 130.0 | 130.0 |
| Evaporator glide (out-in) | K | 3.6 | 3.5 | 3.3 | 3.1 | 2.9 | 2.7 |
| Compressor suction pressure | bar | 1.36 | 1.38 | 1.40 | 1.42 | 1.44 | 1.46 |
| Compressor discharge pressure | bar | 15.7 | 15.8 | 15.9 | 15.9 | 16.0 | 16.1 |
| Condenser glide (in-out) | K | 5.7 | 5.5 | 5.3 | 5.1 | 4.9 | 4.8 |

TABLE 98

Theoretical Performance Data of Selected R-32/R-161/R-134a/R-1234ze(E) blends containing 24% R-32, 10-20% R-161 and 22% R-134a

| | | Composition R-32/R-161/R-134a/R-1234ze(E) % by weight | | | | | |
|---|---|---|---|---|---|---|---|
| | | 24/10/22/44 | 24/12/22/42 | 24/14/22/40 | 24/16/22/38 | 24/18/22/36 | 24/20/22/34 |
| COP | | 1.30 | 1.30 | 1.30 | 1.30 | 1.30 | 1.30 |
| COP relative to Reference | | 108.2% | 108.3% | 108.4% | 108.5% | 108.6% | 108.7% |
| Achieved cooling capacity | kW | 2.19 | 2.2.4 | 2.28 | 2.33 | 2.37 | 2.42 |
| Capacity relative to reference | | 88.2% | 90.1% | 91.9% | 93.7% | 95.4% | 97.2% |
| Suction pressure drop relative to reference | | 68.0% | 68.4% | 68.8% | 69.1% | 69.4% | 69.7% |
| Pressure ratio | | 12.70 | 12.58 | 12.47 | 12.35 | 12.24 | 12.13 |
| Mass flow through evaporator | kg/hr | 45.2 | 45.4 | 45.5 | 45.7 | 45.8 | 45.9 |
| Liquid injection mass flow | kg/hr | 5.5 | 5.6 | 5.8 | 5.9 | 6.1 | 6.2 |
| Compressor discharge temperature | ° C. | 130.0 | 130.0 | 130.0 | 130.0 | 130.0 | 130.0 |
| Evaporator glide (out-in) | K | 5.1 | 5.1 | 5.1 | 5.1 | 5.0 | 4.9 |
| Compressor suction pressure | bar | 1.15 | 1.17 | 1.20 | 1.22 | 1.24 | 1.27 |
| Compressor discharge pressure | bar | 14.6 | 14.8 | 14.9 | 15.1 | 15.2 | 15.3 |
| Condenser glide (in-out) | K | 8.1 | 8.0 | 7.8 | 7.7 | 7.5 | 7.3 |

TABLE 99

Theoretical Performance Data of Selected R-32/R-161/R-134a/R-1234ze(E) blends containing 24% R-32, 22-32% R-161 and 22% R-134a

| | | Composition R-32/R-161/R-134a/R-1234ze(E) % by weight | | | | | |
|---|---|---|---|---|---|---|---|
| | | 24/22/22/32 | 24/24/22/30 | 24/26/22/28 | 24/28/22/26 | 24/30/22/24 | 24/32/22/22 |
| COP | | 1.31 | 1.31 | 1.31 | 1.31 | 1.31 | 1.31 |
| COP relative to Reference | | 108.8% | 108.9% | 108.9% | 109.0% | 109.1% | 109.1% |
| Achieved cooling capacity | kW | 2.46 | 2.50 | 2.54 | 2.58 | 2.62 | 2.65 |
| Capacity relative to reference | | 98.8% | 100.5% | 102.1% | 103.7% | 105.3% | 106.8% |
| Suction pressure drop relative to reference | | 70.0% | 70.2% | 70.4% | 70.6% | 70.8% | 71.0% |
| Pressure ratio | | 12.03 | 11.92 | 11.82 | 11.73 | 11.63 | 11.54 |
| Mass flow through evaporator | kg/hr | 46.0 | 46.1 | 46.1 | 46.2 | 46.3 | 46.3 |
| Liquid injection mass flow | kg/hr | 6.3 | 6.4 | 6.5 | 6.7 | 6.8 | 6.9 |
| Compressor discharge temperature | ° C. | 130.0 | 130.0 | 130.0 | 130.0 | 130.0 | 130.0 |
| Evaporator glide (out-in) | K | 4.9 | 4.7 | 4.6 | 4.5 | 4.3 | 4.2 |
| Compressor suction pressure | bar | 1.29 | 1.31 | 1.33 | 1.35 | 1.37 | 1.39 |
| Compressor discharge pressure | bar | 15.5 | 15.6 | 15.7 | 15.9 | 16.0 | 16.1 |
| Condenser glide (in-out) | K | 7.1 | 6.9 | 6.7 | 6.5 | 6.3 | 6.1 |

TABLE 100

Theoretical Performance Data of Selected R-32/R-161/R-134a/R-1234ze(E) blends containing 24% R-32, 34-46% R-161 and 22% R-134a

| | | Composition R-32/R-161/R-134a/R-1234ze(E) % by weight | | | | | | |
|---|---|---|---|---|---|---|---|---|
| | | 24/34/22/20 | 24/36/22/18 | 24/38/22/16 | 24/40/22/14 | 24/42/22/12 | 24/44/22/10 | 24/46/22/8 |
| COP | | 1.31 | 1.31 | 1.31 | 1.31 | 1.31 | 1.31 | 1.31 |
| COP relative to Reference | | 109.2% | 109.2% | 109.3% | 109.4% | 109.4% | 109.5% | 109.6% |
| Achieved cooling capacity | kW | 2.69 | 2.73 | 2.77 | 2.80 | 2.84 | 2.87 | 2.91 |
| Capacity relative to reference | | 108.3% | 109.8% | 111.3% | 112.8% | 114.2% | 115.6% | 117.0% |
| Suction pressure drop relative to reference | | 71.1% | 71.2% | 71.4% | 71.5% | 71.6% | 71.7% | 71.8% |
| Pressure ratio | | 11.44 | 11.36 | 11.27 | 11.18 | 11.10 | 11.01 | 10.93 |
| Mass flow through evaporator | kg/hr | 46.3 | 46.4 | 46.4 | 46.4 | 46.4 | 46.4 | 46.4 |
| Liquid injection mass flow | kg/hr | 7.0 | 7.0 | 7.1 | 7.2 | 7.3 | 7.4 | 7.4 |
| Compressor discharge temperature | ° C. | 130.0 | 130.0 | 130.0 | 130.0 | 130.0 | 130.0 | 130.0 |
| Evaporator glide (out-in) | K | 4.0 | 3.8 | 3.6 | 3.4 | 3.2 | 3.0 | 2.8 |
| Compressor suction pressure | bar | 1.41 | 1.43 | 1.45 | 1.47 | 1.49 | 1.51 | 1.53 |
| Compressor discharge pressure | bar | 16.2 | 16.3 | 16.4 | 16.5 | 16.6 | 16.7 | 16.8 |
| Condenser glide (in-out) | K | 5.9 | 5.7 | 5.5 | 5.3 | 5.1 | 4.9 | 4.7 |

TABLE 101

Theoretical Performance Data of Selected R-32/R-161/R-134a/R-1234ze(E) blends containing 28% R-32, 10-24% R-161 and 22% R-134a

| | | Composition R-32/R-161/R-134a/R-1234ze(E) % by weight | | | | | | | |
|---|---|---|---|---|---|---|---|---|---|
| | | 28/10/22/40 | 28/12/22/38 | 38/14/22/36 | 28/16/22/34 | 28/18/22/32 | 28/20/22/30 | 28/22/22/28 | 28/24/22/26 |
| COP | | 1.30 | 1.30 | 1.30 | 1.30 | 1.30 | 1.30 | 1.30 | 1.30 |
| COP relative to Reference | | 108.1% | 108.2% | 108.3% | 108.4% | 108.5% | 108.5% | 108.6% | 108.6% |
| Achieved cooling capacity | kW | 2.34 | 2.39 | 2.44 | 2.48 | 2.52 | 2.57 | 2.61 | 2.65 |
| Capacity relative to reference | | 94.3% | 96.2% | 98.0% | 99.8% | 101.5% | 103.3% | 105.0% | 106.6% |
| Suction pressure drop relative to reference | | 70.8% | 71.2% | 71.5% | 71.9% | 72.1% | 72.4% | 72.7% | 72.9% |
| Pressure ratio | | 12.43 | 12.32 | 12.20 | 12.09 | 11.99 | 11.88 | 11.78 | 11.68 |
| Mass flow through evaporator | kg/hr | 47.0 | 47.2 | 47.4 | 47.5 | 47.6 | 47.7 | 47.8 | 47.9 |
| Liquid injection mass flow | kg/hr | 6.3 | 6.5 | 6.6 | 6.7 | 6.9 | 7.0 | 7.1 | 7.2 |
| Compressor discharge temperature | °C. | 130.0 | 130.0 | 130.0 | 130.0 | 130.0 | 130.0 | 130.0 | 130.0 |
| Evaporator glide (out-in) | K | 5.3 | 5.3 | 5.2 | 5.2 | 5.1 | 5.0 | 4.9 | 4.7 |
| Compressor suction pressure | bar | 1.23 | 1.26 | 1.28 | 1.31 | 1.33 | 1.35 | 1.38 | 1.40 |
| Compressor discharge pressure | bar | 15.4 | 15.5 | 15.7 | 15.8 | 16.0 | 16.1 | 16.2 | 16.3 |
| Condenser glide (in-out) | K | 7.9 | 7.7 | 7.5 | 7.3 | 7.2 | 7.0 | 6.8 | 6.6 |

TABLE 102

Theoretical Performance Data of Selected R-32/R-161/R-134a/R-1234ze(E) blends containing 28% R-32, 26-40% R-161 and 22% R-134a

| | | Composition R-32/R-161/R-134a/R-1234ze(E) % by weight | | | | | | | |
|---|---|---|---|---|---|---|---|---|---|
| | | 28/26/22/24 | 28/28/22/22 | 28/30/22/20 | 28/32/22/18 | 28/34/22/16 | 28/36/22/14 | 28/38/22/12 | 28/40/22/10 |
| COP | | 1.30 | 1.30 | 1.31 | 1.31 | 1.31 | 1.31 | 1.31 | 1.31 |
| COP relative to Reference | | 108.7% | 108.7% | 108.8% | 108.9% | 108.9% | 109.0% | 109.0% | 109.1% |
| Achieved cooling capacity | kW | 2.69 | 2.73 | 2.77 | 2.81 | 2.85 | 2.88 | 2.92 | 2.96 |
| Capacity relative to reference | | 108.2% | 109.8% | 111.4% | 113.0% | 114.5% | 116.0% | 117.5% | 119.0% |
| Suction pressure drop relative to reference | | 73.1% | 73.3% | 73.5% | 73.6% | 73.8% | 73.9% | 74.0% | 74.1% |
| Pressure ratio | | 11.59 | 11.49 | 11.40 | 11.31 | 11.22 | 11.14 | 11.05 | 10.97 |
| Mass flow through evaporator | kg/hr | 47.9 | 48.0 | 48.0 | 48.1 | 48.1 | 48.1 | 48.1 | 48.1 |
| Liquid injection mass flow | kg/hr | 7.3 | 7.4 | 7.5 | 7.6 | 7.7 | 7.8 | 7.9 | 8.0 |
| Compressor discharge temperature | °C. | 130.0 | 130.0 | 130.0 | 130.0 | 130.0 | 130.0 | 130.0 | 130.0 |
| Evaporator glide (out-in) | K | 4.6 | 4.4 | 4.2 | 4.1 | 3.9 | 3.7 | 3.4 | 3.2 |
| Compressor suction pressure | bar | 1.42 | 1.44 | 1.46 | 1.49 | 1.51 | 1.53 | 1.55 | 1.57 |
| Compressor discharge pressure | bar | 16.5 | 16.6 | 16.7 | 16.8 | 16.9 | 17.0 | 17.1 | 17.2 |
| Condenser glide (in-out) | K | 6.4 | 6.2 | 6.0 | 5.8 | 5.6 | 5.4 | 5.2 | 5.0 |

TABLE 102

Theoretical Performance Data of Selected R-32/R-161/R-134a/R-1234ze(E) blends containing 32% R-32, 10-22% R-161 and 22% R-134a

| | | Composition R-32/R-161/R-134a/R-1234ze(E) % by weight | | | | | | |
|---|---|---|---|---|---|---|---|---|
| | | 32/10/22/36 | 32/12/22/34 | 32/14/22/32 | 32/16/22/30 | 32/18/22/28 | 32/20/22/26 | 32/22/22/24 |
| COP | | 1.30 | 1.30 | 1.30 | 1.30 | 1.30 | 1.30 | 1.30 |
| COP relative to Reference | | 108.0% | 108.1% | 108.1% | 108.2% | 108.2% | 108.3% | 108.3% |
| Achieved cooling capacity | kW | 2.49 | 2.54 | 2.58 | 2.63 | 2.67 | 2.72 | 2.76 |
| Capacity relative to reference | | 100.2% | 102.1% | 103.9% | 105.8% | 107.5% | 109.3% | 110.9% |
| Suction pressure drop relative to reference | | 73.3% | 73.7% | 74.1% | 74.4% | 74.7% | 74.9% | 75.2% |
| Pressure ratio | | 12.18 | 12.07 | 11.96 | 11.85 | 11.75 | 11.65 | 11.55 |
| Mass flow through evaporator | kg/hr | 48.8 | 48.9 | 49.1 | 49.2 | 49.3 | 49.4 | 49.5 |
| Liquid injection mass flow | kg/hr | 7.1 | 7.3 | 7.4 | 7.6 | 7.7 | 7.8 | 7.9 |
| Compressor discharge temperature | °C. | 130.0 | 130.0 | 130.0 | 130.0 | 130.0 | 130.0 | 130.0 |

TABLE 102-continued

Theoretical Performance Data of Selected R-32/R-161/R-134a/R-1234ze(E) blends containing 32% R-32, 10-22% R-161 and 22% R-134a

| | | Composition R-32/R-161/R-134a/R-1234ze(E) % by weight | | | | | | |
|---|---|---|---|---|---|---|---|---|
| | | 32/10/22/36 | 32/12/22/34 | 32/14/22/32 | 32/16/22/30 | 32/18/22/28 | 32/20/22/26 | 32/22/22/24 |
| Evaporator glide (out-in) | K | 5.3 | 5.3 | 5.2 | 5.1 | 5.0 | 4.9 | 4.7 |
| Compressor suction pressure | bar | 1.32 | 1.35 | 1.37 | 1.39 | 1.42 | 1.44 | 1.47 |
| Compressor discharge pressure | bar | 16.1 | 16.2 | 16.4 | 16.5 | 16.7 | 16.8 | 16.9 |
| Condenser glide (in-out) | K | 7.5 | 7.3 | 7.1 | 6.9 | 6.7 | 6.5 | 6.3 |

TABLE 103

Theoretical Performance Data of Selected R-32/R-161/R-134a/R-1234ze(E) blends containing 32% R-32, 24-36% R-161 and 22% R-134a

| | | Composition R-32/R-161/R-134a/R-1234ze(E) % by weight | | | | | | |
|---|---|---|---|---|---|---|---|---|
| | | 32/24/22/22 | 32/26/22/20 | 32/28/22/18 | 32/30/22/16 | 32/32/22/14 | 32/34/22/12 | 32/36/22/10 |
| COP | | 1.30 | 1.30 | 1.30 | 1.30 | 1.30 | 1.30 | 1.30 |
| COP relative to Reference | | 108.4% | 108.4% | 108.5% | 108.5% | 108.6% | 108.6% | 108.7% |
| Achieved cooling capacity | kW | 2.80 | 2.84 | 2.88 | 2.92 | 2.96 | 3.00 | 3.04 |
| Capacity relative to reference | | 112.6% | 114.3% | 115.9% | 117.5% | 119.1% | 120.6% | 122.1% |
| Suction pressure drop relative to reference | | 75.4% | 75.6% | 75.8% | 76.0% | 76.1% | 76.3% | 76.4% |
| Pressure ratio | | 11.46 | 11.37 | 11.27 | 11.18 | 11.10 | 11.01 | 10.93 |
| Mass flow through evaporator | kg/hr | 49.6 | 49.6 | 49.7 | 49.7 | 49.7 | 49.8 | 49.8 |
| Liquid injection mass flow | kg/hr | 8.0 | 8.1 | 8.2 | 8.3 | 8.4 | 8.5 | 8.6 |
| Compressor discharge temperature | ° C. | 130.0 | 130.0 | 130.0 | 130.0 | 130.0 | 130.0 | 130.0 |
| Evaporator glide (out-in) | K | 4.6 | 4.4 | 4.2 | 4.0 | 3.8 | 3.6 | 3.4 |
| Compressor suction pressure | bar | 1.49 | 1.51 | 1.53 | 1.56 | 1.58 | 1.60 | 1.62 |
| Compressor discharge pressure | bar | 17.1 | 17.2 | 17.3 | 17.4 | 17.5 | 17.6 | 17.7 |
| Condenser glide (in-out) | K | 6.1 | 5.9 | 5.7 | 5.5 | 5.3 | 5.1 | 4.9 |

TABLE 104

Theoretical Performance Data of Selected R-32/R-161/R-134a/R-1234ze(E) blends containing 36% R-32, 10-20% R-161 and 22% R-134a

| | | Composition R-32/R-161/R-134a/R-1234ze(E) % by weight | | | | | |
|---|---|---|---|---|---|---|---|
| | | 36/10/22/32 | 36/12/22/30 | 36/14/22/28 | 36/16/22/26 | 36/18/22/24 | 36/20/22/22 |
| COP | | 1.29 | 1.29 | 1.29 | 1.29 | 1.30 | 1.30 |
| COP relative to Reference | | 107.8% | 107.8% | 107.9% | 107.9% | 108.0% | 108.0% |
| Achieved cooling capacity | kW | 2.64 | 2.68 | 2.73 | 2.77 | 2.82 | 2.86 |
| Capacity relative to reference | | 106.0% | 107.9% | 109.8% | 111.6% | 113.4% | 115.1% |
| Suction pressure drop relative to reference | | 75.7% | 76.1% | 76.4% | 76.7% | 77.0% | 77.3% |
| Pressure ratio | | 11.94 | 11.83 | 11.73 | 11.63 | 11.53 | 11.43 |
| Mass flow through evaporator | kg/hr | 50.4 | 50.5 | 50.7 | 50.8 | 50.9 | 51.0 |
| Liquid injection mass flow | kg/hr | 8.0 | 8.1 | 8.3 | 8.4 | 8.5 | 8.6 |
| Compressor discharge temperature | ° C. | 130.0 | 130.0 | 130.0 | 130.0 | 130.0 | 130.0 |
| Evaporator glide (out-in) | K | 5.2 | 5.1 | 5.0 | 4.9 | 4.8 | 4.6 |
| Compressor suction pressure | bar | 1.41 | 1.43 | 1.46 | 1.48 | 1.51 | 1.53 |
| Compressor discharge pressure | bar | 16.8 | 16.9 | 17.1 | 17.2 | 17.4 | 17.5 |
| Condenser glide (in-out) | K | 7.0 | 6.8 | 6.6 | 6.4 | 6.2 | 6.0 |

TABLE 105

Theoretical Performance Data of Selected R-32/R-161/R-134a/R-1234ze(E) blends containing 36% R-32, 22-32% R-161 and 22% R-134a

| | | Composition R-32/R-161/R-134a/R-1234ze(E) % by weight | | | | | |
|---|---|---|---|---|---|---|---|
| | | 36/22/22/20 | 36/24/22/18 | 36/26/22/16 | 36/28/22/14 | 36/30/22/12 | 36/32/22/10 |
| COP | | 1.30 | 1.30 | 1.30 | 1.30 | 1.30 | 1.30 |
| COP relative to Reference | | 108.0% | 108.1% | 108.1% | 108.1% | 108.2% | 108.2% |

TABLE 105-continued

Theoretical Performance Data of Selected R-32/R-161/R-134a/R-1234ze(E) blends containing 36% R-32, 22-32% R-161 and 22% R-134a

| | | Composition R-32/R-161/R-134a/R-1234ze(E) % by weight | | | | | |
|---|---|---|---|---|---|---|---|
| | | 36/22/22/20 | 36/24/22/18 | 36/26/22/16 | 36/28/22/14 | 36/30/22/12 | 36/32/22/10 |
| Achieved cooling capacity | kW | 2.90 | 2.95 | 2.99 | 3.03 | 3.07 | 3.11 |
| Capacity relative to reference | | 116.8% | 118.5% | 120.2% | 121.8% | 123.5% | 125.1% |
| Suction pressure drop relative to reference | | 77.5% | 77.8% | 78.0% | 78.2% | 78.4% | 78.6% |
| Pressure ratio | | 11.34 | 11.24 | 11.15 | 11.06 | 10.98 | 10.89 |
| Mass flow through evaporator | kg/hr | 51.1 | 51.2 | 51.2 | 51.3 | 51.3 | 51.4 |
| Liquid injection mass flow | kg/hr | 8.7 | 8.8 | 8.9 | 9.0 | 9.1 | 9.2 |
| Compressor discharge temperature | °C. | 130.0 | 130.0 | 130.0 | 130.0 | 130.0 | 130.0 |
| Evaporator glide (out-in) | K | 4.4 | 4.3 | 4.1 | 3.9 | 3.6 | 3.4 |
| Compressor suction pressure | bar | 1.56 | 1.58 | 1.60 | 1.63 | 1.65 | 1.67 |
| Compressor discharge pressure | bar | 17.6 | 17.8 | 17.9 | 18.0 | 18.1 | 18.2 |
| Condenser glide (in-out) | K | 5.8 | 5.6 | 5.4 | 5.2 | 5.0 | 4.8 |

TABLE 106

Theoretical Performance Data of Selected R-32/R-125/R-161/R-1234ze(E) blends containing 16-40% R-32, 10% R-125 and 10% R-161

| | | Composition R-32/R-125/R-161/R-1234ze(E) % by weight | | | | | | |
|---|---|---|---|---|---|---|---|---|
| | | 16/10/10/64 | 20/10/10/60 | 24/10/10/56 | 28/10/10/52 | 32/10/10/48 | 36/10/10/44 | 40/10/10/40 |
| COP | | 1.29 | 1.29 | 1.29 | 1.29 | 1.29 | 1.28 | 1.28 |
| COP relative to Reference | | 107.6% | 107.8% | 107.8% | 107.6% | 107.4% | 107.1% | 106.7% |
| Achieved cooling capacity | kW | 1.91 | 2.08 | 2.24 | 2.40 | 2.55 | 2.71 | 2.85 |
| Capacity relative to reference | | 76.7% | 83.5% | 90.1% | 96.5% | 102.8% | 108.9% | 114.8% |
| Suction pressure drop relative to reference | | 64.7% | 68.5% | 71.9% | 75.1% | 78.0% | 80.7% | 83.2% |
| Pressure ratio | | 13.36 | 13.02 | 12.70 | 12.41 | 12.15 | 11.90 | 11.67 |
| Mass flow through evaporator | kg/hr | 42.9 | 45.3 | 47.6 | 49.7 | 51.6 | 53.4 | 55.1 |
| Liquid injection mass flow | kg/hr | 3.7 | 4.5 | 5.3 | 6.2 | 7.1 | 8.1 | 9.0 |
| Compressor discharge temperature | °C. | 130.0 | 130.0 | 130.0 | 130.0 | 130.0 | 130.0 | 130.0 |
| Evaporator glide (out-in) | K | 5.6 | 6.3 | 6.6 | 6.8 | 6.7 | 6.5 | 6.1 |
| Compressor suction pressure | bar | 1.00 | 1.09 | 1.18 | 1.27 | 1.36 | 1.45 | 1.55 |
| Compressor discharge pressure | bar | 13.3 | 14.1 | 15.0 | 15.8 | 16.5 | 17.3 | 18.0 |
| Condenser glide (in-out) | K | 10.0 | 10.1 | 9.8 | 9.4 | 8.8 | 8.1 | 7.3 |

TABLE 107

Theoretical Performance Data of Selected R-32/R-125/R-161/R-1234ze(E) blends containing 16-40% R-32, 10% R-125 and 15% R-161

| | | Composition R-32/R-125/R-161/R-1234ze(E) % by weight | | | | | | |
|---|---|---|---|---|---|---|---|---|
| | | 16/10/15/59 | 29/10/15/55 | 24/10/15/51 | 28/10/15/47 | 32/10/15/43 | 36/10/15/39 | 40/10/15/35 |
| COP | | 1.30 | 1.30 | 1.30 | 1.30 | 1.29 | 1.29 | 1.28 |
| COP relative to Reference | | 108.2% | 108.3% | 108.2% | 108.0% | 107.6% | 107.3% | 106.9% |
| Achieved cooling capacity | kW | 2.02 | 2.18 | 2.35 | 2.51 | 2.66 | 2.81 | 2.96 |
| Capacity relative to reference | | 81.1% | 87.9% | 94.5% | 100.9% | 107.1% | 113.2% | 119.2% |
| Suction pressure drop relative to reference | | 65.4% | 69.0% | 72.4% | 75.5% | 78.4% | 81.0% | 83.5% |
| Pressure ratio | | 13.04 | 12.72 | 12.43 | 12.15 | 11.90 | 11.66 | 11.43 |
| Mass flow through evaporator | kg/hr | 43.1 | 45.5 | 47.7 | 49.7 | 51.7 | 53.5 | 55.2 |
| Liquid injection mass flow | kg/hr | 4.1 | 4.9 | 5.7 | 6.6 | 7.5 | 8.4 | 9.3 |
| Compressor discharge temperature | °C. | 130.0 | 130.0 | 130.0 | 130.0 | 130.0 | 130.0 | 130.0 |
| Evaporator glide (out-in) | K | 5.7 | 6.3 | 6.6 | 6.7 | 6.5 | 6.3 | 5.8 |
| Compressor suction pressure | bar | 1.05 | 1.14 | 1.23 | 1.33 | 1.42 | 1.51 | 1.61 |
| Compressor discharge pressure | bar | 13.7 | 14.5 | 15.3 | 16.1 | 16.9 | 17.6 | 18.4 |
| Condenser glide (in-out) | K | 9.7 | 9.7 | 9.4 | 8.9 | 8.3 | 7.6 | 6.8 |

TABLE 108

Theoretical Performance Data of Selected R-32/R-125/R-161/R-1234ze(E) blends containing 16-40% R-32, 10% R-125 and 20% R-161

| | | Composition R-32/R-125/R-161/R-1234ze(E) % by weight | | | | | | |
|---|---|---|---|---|---|---|---|---|
| | | 16/10/20/54 | 20/10/20/50 | 24/10/20/46 | 28/10/20/42 | 32/10/20/38 | 36/10/20/34 | 40/10/20/30 |
| COP | | 1.30 | 1.30 | 1.30 | 1.30 | 1.29 | 1.29 | 1.28 |
| COP relative to Reference | | 108.7% | 108.7% | 108.5% | 108.2% | 107.8% | 107.4% | 107.0% |
| Achieved cooling capacity | kW | 2.12 | 2.29 | 2.45 | 2.61 | 2.77 | 2.92 | 3.07 |
| Capacity relative to reference | | 85.2% | 92.0% | 98.6% | 105.0% | 111.2% | 117.4% | 123.4% |
| Suction pressure drop relative to reference | | 65.9% | 69.4% | 72.7% | 75.8% | 78.6% | 81.3% | 83.8% |
| Pressure ratio | | 12.74 | 12.45 | 12.16 | 11.90 | 11.66 | 11.43 | 11.21 |
| Mass flow through evaporator | kg/hr | 43.3 | 45.6 | 47.7 | 49.7 | 51.6 | 53.4 | 55.1 |
| Liquid injection mass flow | kg/hr | 4.4 | 5.2 | 6.1 | 6.9 | 7.8 | 8.7 | 9.6 |
| Compressor discharge temperature | ° C. | 130.0 | 130.0 | 130.0 | 130.0 | 130.0 | 130.0 | 130.0 |
| Evaporator glide (out-in) | K | 5.6 | 6.1 | 6.4 | 6.4 | 6.2 | 5.9 | 5.4 |
| Compressor suction pressure | bar | 1.10 | 1.19 | 1.29 | 1.38 | 1.47 | 1.57 | 1.67 |
| Compressor discharge pressure | bar | 14.0 | 14.8 | 15.6 | 16.4 | 17.2 | 17.9 | 18.7 |
| Condenser glide (in-out) | K | 9.2 | 9.2 | 8.9 | 8.4 | 7.8 | 7.1 | 6.3 |

TABLE 109

Theoretical Performance Data of Selected R-32/R-125/R-161/R-1234ze(E) blends containing 16-40% R-32, 10% R-125 and 25% R-161

| | | Composition R-32/R-125/R-161/R-1234ze(E) % by weight | | | | | | |
|---|---|---|---|---|---|---|---|---|
| | | 16/10/25/49 | 20/10/25/45 | 24/10/25/41 | 28/10/25/37 | 32/10/25/33 | 36/10/25/29 | 49/10/25/25 |
| COP | | 1.31 | 1.31 | 1.30 | 1.30 | 1.30 | 1.29 | 1.29 |
| COP relative to Reference | | 109.1% | 109.0% | 108.7% | 108.4% | 108.0% | 107.6% | 107.1% |
| Achieved cooling capacity | kW | 2.22 | 2.38 | 2.55 | 2.71 | 2.86 | 3.02 | 3.17 |
| Capacity relative to reference | | 89.2% | 95.9% | 102.5% | 108.9% | 115.2% | 121.3% | 127.4% |
| Suction pressure drop relative to reference | | 66.3% | 69.7% | 72.9% | 75.9% | 78.7% | 81.4% | 83.9% |
| Pressure ratio | | 12.47 | 12.19 | 11.92 | 11.67 | 11.44 | 11.22 | 11.00 |
| Mass flow through evaporator | kg/hr | 43.4 | 45.6 | 47.7 | 49.7 | 51.6 | 53.3 | 55.1 |
| Liquid injection mass flow | kg/hr | 4.8 | 5.6 | 6.4 | 7.2 | 8.0 | 8.9 | 9.8 |
| Compressor discharge temperature | ° C. | 130.0 | 130.0 | 130.0 | 130.0 | 130.0 | 130.0 | 130.0 |
| Evaporator glide (out-in) | K | 5.5 | 5.9 | 6.1 | 6.1 | 5.9 | 5.5 | 4.9 |
| Compressor suction pressure | bar | 1.15 | 1.24 | 1.34 | 1.43 | 1.53 | 1.62 | 1.72 |
| Compressor discharge pressure | bar | 14.3 | 15.1 | 15.9 | 16.7 | 17.5 | 18.2 | 18.9 |
| Condenser glide (in-out) | K | 8.7 | 8.6 | 8.3 | 7.8 | 7.2 | 6.5 | 5.8 |

TABLE 110

Theoretical Performance Data of Selected R-32/R-125/R-161/R-1234ze(E) blends containing 16-40% R-32, 10% R-125 and 30% R-161

| | | Composition R-32/R-125/R-161/R-1234ze(E) % by weight | | | | | | |
|---|---|---|---|---|---|---|---|---|
| | | 16/10/30/44 | 20/10/30/40 | 24/10/30/36 | 28/10/30/32 | 32/10/30/28 | 36/10/30/24 | 40/10/30/20 |
| COP | | 1.31 | 1.31 | 1.31 | 1.30 | 1.30 | 1.29 | 1.29 |
| COP relative to Reference | | 109.4% | 109.2% | 109.0% | 108.6% | 108.2% | 107.7% | 107.3% |
| Achieved cooling capacity | kW | 2.31 | 2.48 | 2.64 | 2.80 | 2.96 | 3.11 | 3.26 |
| Capacity relative to reference | | 93.0% | 99.7% | 106.2% | 112.6% | 118.9% | 125.1% | 131.3% |
| Suction pressure drop relative to reference | | 66.6% | 69.9% | 73.0% | 76.0% | 78.8% | 81.4% | 84.0% |
| Pressure ratio | | 12.21 | 11.94 | 11.69 | 11.45 | 11.23 | 11.01 | 10.80 |
| Mass flow through evaporator | kg/hr | 43.4 | 45.6 | 47.6 | 49.6 | 51.4 | 53.2 | 54.9 |
| Liquid injection mass flow | kg/hr | 5.1 | 5.8 | 6.6 | 7.5 | 8.3 | 9.1 | 10.0 |
| Compressor discharge temperature | ° C. | 130.0 | 130.0 | 130.0 | 130.0 | 130.0 | 130.0 | 130.0 |
| Evaporator glide (out-in) | K | 5.3 | 5.6 | 5.8 | 5.7 | 5.4 | 4.9 | 4.4 |
| Compressor suction pressure | bar | 1.19 | 1.29 | 1.39 | 1.48 | 1.58 | 1.68 | 1.78 |
| Compressor discharge pressure | bar | 14.6 | 15.4 | 16.2 | 17.0 | 17.7 | 18.5 | 19.2 |
| Condenser glide (in-out) | K | 8.2 | 8.1 | 7.8 | 7.3 | 6.7 | 6.0 | 5.3 |

TABLE 111

Theoretical Performance Data of Selected R-32/R-125/R-161/R-1234ze(E) blends containing 16-40% R-32, 15% R-125 and 10% R-161

| | | Composition R-32/R-125/R-161/R-1234ze(E) % by weight | | | | | | |
|---|---|---|---|---|---|---|---|---|
| | | 16/15/10/59 | 20/15/10/55 | 24/15/10/51 | 28/15/10/47 | 32/15/10/43 | 36/15/10/39 | 40/15/10/35 |
| COP | | 1.28 | 1.28 | 1.28 | 1.28 | 1.28 | 1.27 | 1.27 |
| COP relative to Reference | | 106.9% | 107.0% | 106.9% | 106.7% | 106.4% | 106.1% | 105.7% |
| Achieved cooling capacity | kW | 1.98 | 2.16 | 2.32 | 2.48 | 2.64 | 2.79 | 2.95 |
| Capacity relative to reference | | 79.9% | 86.7% | 93.4% | 99.9% | 106.2% | 112.4% | 118.5% |
| Suction pressure drop relative to reference | | 68.7% | 72.5% | 76.0% | 79.3% | 82.3% | 85.0% | 87.6% |
| Pressure ratio | | 13.19 | 12.86 | 12.55 | 12.27 | 12.00 | 11.76 | 11.53 |
| Mass flow through evaporator | kg/hr | 45.3 | 47.8 | 50.1 | 52.2 | 54.2 | 56.1 | 57.8 |
| Liquid injection mass flow | kg/hr | 3.9 | 4.7 | 5.6 | 6.6 | 7.5 | 8.5 | 9.5 |
| Compressor discharge temperature | °C. | 130.0 | 130.0 | 130.0 | 130.0 | 130.0 | 130.0 | 130.0 |
| Evaporator glide (out-in) | K | 5.7 | 6.2 | 6.5 | 6.5 | 6.4 | 6.0 | 5.6 |
| Compressor suction pressure | bar | 1.04 | 1.14 | 1.23 | 1.33 | 1.42 | 1.52 | 1.61 |
| Compressor discharge pressure | bar | 13.8 | 14.6 | 15.5 | 16.3 | 17.1 | 17.8 | 18.6 |
| Condenser glide (in-out) | K | 9.8 | 9.7 | 9.3 | 8.8 | 8.2 | 7.4 | 6.6 |

TABLE 112

Theoretical Performance Data of Selected R-32/R-125/R-161/R-1234ze(E) blends containing 16-40% R-32, 15% R-125 and 15% R-161

| | | Composition R-32/R-125/R-161/R-1234ze(E) % by weight | | | | | | |
|---|---|---|---|---|---|---|---|---|
| | | 16/15/15/54 | 20/15/15/50 | 24/15/15/46 | 28/15/15/42 | 32/15/15/38 | 36/15/15/34 | 40/15/15/30 |
| COP | | 1.29 | 1.29 | 1.29 | 1.28 | 1.28 | 1.28 | 1.27 |
| COP relative to Reference | | 107.5% | 107.5% | 107.3% | 107.0% | 106.7% | 106.3% | 105.9% |
| Achieved cooling capacity | kW | 2.09 | 2.26 | 2.43 | 2.59 | 2.75 | 2.90 | 3.06 |
| Capacity relative to reference | | 84.2% | 91.1% | 97.8% | 104.3% | 110.6% | 116.8% | 123.0% |
| Suction pressure drop relative to reference | | 69.3% | 73.0% | 76.4% | 79.6% | 82.6% | 85.3% | 87.9% |
| Pressure ratio | | 12.88 | 12.57 | 12.28 | 12.01 | 11.75 | 11.52 | 11.29 |
| Mass flow through evaporator | kg/hr | 45.5 | 47.9 | 50.1 | 52.2 | 54.2 | 56.1 | 57.9 |
| Liquid injection mass flow | kg/hr | 4.3 | 5.1 | 6.0 | 6.9 | 7.9 | 8.8 | 9.8 |
| Compressor discharge temperature | °C. | 130.0 | 130.0 | 130.0 | 130.0 | 130.0 | 130.0 | 130.0 |
| Evaporator glide (out-in) | K | 5.7 | 6.2 | 6.4 | 6.3 | 6.1 | 5.7 | 5.2 |
| Compressor suction pressure | bar | 1.10 | 1.19 | 1.29 | 1.38 | 1.48 | 1.58 | 1.68 |
| Compressor discharge pressure | bar | 14.1 | 15.0 | 15.8 | 16.6 | 17.4 | 18.2 | 18.9 |
| Condenser glide (in-out) | K | 9.3 | 9.2 | 8.8 | 8.3 | 7.6 | 6.9 | 6.1 |

TABLE 113

Theoretical Performance Data of Selected R-32/R-125/R-161/R-1234ze(E) blends containing 16-40% R-32, 15% R-125 and 20% R-161

| | | Composition R-32/R-125/R-161/R-1234ze(E) % by weight | | | | | | |
|---|---|---|---|---|---|---|---|---|
| | | 16/15/20/49 | 20/15/20/45 | 24/15/20/41 | 28/15/20/37 | 32/15/20/33 | 36/15/20/29 | 40/15/20/25 |
| COP | | 1.30 | 1.29 | 1.29 | 1.29 | 1.28 | 1.28 | 1.27 |
| COP relative to Reference | | 108.0% | 107.9% | 107.6% | 107.3% | 106.9% | 106.5% | 106.1% |
| Achieved cooling capacity | kW | 2.20 | 2.37 | 2.53 | 2.70 | 2.85 | 3.01 | 3.16 |
| Capacity relative to reference | | 88.4% | 95.3% | 101.9% | 108.4% | 114.8% | 121.1% | 127.3% |
| Suction pressure drop relative to reference | | 69.7% | 73.3% | 76.7% | 79.8% | 82.7% | 85.5% | 88.1% |
| Pressure ratio | | 12.59 | 12.29 | 12.02 | 11.76 | 11.52 | 11.29 | 11.07 |
| Mass flow through evaporator | kg/hr | 45.6 | 47.9 | 50.1 | 52.2 | 54.2 | 56.0 | 57.8 |
| Liquid injection mass flow | kg/hr | 4.7 | 5.5 | 6.4 | 7.3 | 8.2 | 9.1 | 10.1 |
| Compressor discharge temperature | °C. | 130.0 | 130.0 | 130.0 | 130.0 | 130.0 | 130.0 | 130.0 |
| Evaporator glide (out-in) | K | 5.6 | 6.0 | 6.1 | 6.0 | 5.7 | 5.3 | 4.7 |
| Compressor suction pressure | bar | 1.15 | 1.24 | 1.34 | 1.44 | 1.54 | 1.64 | 1.74 |
| Compressor discharge pressure | bar | 14.4 | 15.3 | 16.1 | 16.9 | 17.7 | 18.5 | 19.2 |
| Condenser glide (in-out) | K | 8.8 | 8.7 | 8.3 | 7.8 | 7.1 | 6.4 | 5.6 |

TABLE 114

Theoretical Performance Data of Selected R-32/R-125/R-161/R-1234ze(E) blends containing 16-40% R-32, 15% R-125 and 25% R-161

| | | Composition R-32/R-125/R-161/R-1234ze(E) % by weight | | | | | | |
|---|---|---|---|---|---|---|---|---|
| | | 16/15/25/44 | 20/15/25/40 | 24/15/25/36 | 28/15/25/32 | 32/15/25/28 | 36/15/25/24 | 40/15/25/20 |
| COP | | 1.30 | 1.30 | 1.29 | 1.29 | 1.29 | 1.28 | 1.28 |
| COP relative to Reference | | 108.4% | 108.2% | 107.9% | 107.5% | 107.1% | 106.7% | 106.3% |
| Achieved cooling capacity | kW | 2.30 | 2.47 | 2.63 | 2.79 | 2.95 | 3.11 | 3.27 |
| Capacity relative to reference | | 92.4% | 99.2% | 105.9% | 112.4% | 118.8% | 125.1% | 131.4% |
| Suction pressure drop relative to reference | | 70.0% | 73.5% | 76.8% | 79.9% | 82.8% | 85.6% | 88.3% |
| Pressure ratio | | 12.31 | 12.03 | 11.77 | 11.53 | 11.29 | 11.07 | 10.85 |
| Mass flow through evaporator | kg/hr | 45.6 | 47.9 | 50.0 | 52.1 | 54.0 | 55.9 | 57.7 |
| Liquid injection mass flow | kg/hr | 5.0 | 5.8 | 6.7 | 7.6 | 8.5 | 9.4 | 10.3 |
| Compressor discharge temperature | ° C. | 130.0 | 130.0 | 130.0 | 130.0 | 130.0 | 130.0 | 130.0 |
| Evaporator glide (out-in) | K | 5.4 | 5.7 | 5.8 | 5.6 | 5.3 | 4.8 | 4.2 |
| Compressor suction pressure | bar | 1.20 | 1.30 | 1.39 | 1.49 | 1.59 | 1.69 | 1.79 |
| Compressor discharge pressure | bar | 14.7 | 15.6 | 16.4 | 17.2 | 18.0 | 18.7 | 19.5 |
| Condenser glide (in-out) | K | 8.3 | 8.1 | 7.8 | 7.2 | 6.6 | 5.8 | 5.1 |

TABLE 115

Theoretical Performance Data of Selected R-32/R-125/R-161/R-1234ze(E) blends containing 16-40% R-32, 15% R-125 and 30% R-161

| | | Composition R-32/R-125/R-161/R-1234ze(E) % by weight | | | | | | |
|---|---|---|---|---|---|---|---|---|
| | | 16/15/30/39 | 20/15/30/35 | 24/15/30/31 | 28/15/30/27 | 32/15/30/23 | 36/15/30/19 | 40/15/30/15 |
| COP | | 1.30 | 1.30 | 1.30 | 1.29 | 1.29 | 1.28 | 1.28 |
| COP relative to Reference | | 108.7% | 108.4% | 108.1% | 107.8% | 107.3% | 106.9% | 106.5% |
| Achieved cooling capacity | kW | 2.39 | 2.56 | 2.73 | 2.89 | 3.05 | 3.21 | 3.36 |
| Capacity relative to reference | | 96.2% | 103.0% | 109.7% | 116.2% | 122.6% | 129.0% | 135.4% |
| Suction pressure drop relative to reference | | 70.2% | 73.6% | 76.9% | 79.9% | 82.9% | 85.7% | 88.4% |
| Pressure ratio | | 12.06 | 11.79 | 11.54 | 11.31 | 11.08 | 10.86 | 10.65 |
| Mass flow through evaporator | kg/hr | 45.6 | 47.8 | 49.9 | 51.9 | 53.9 | 55.8 | 57.6 |
| Liquid injection mass flow | kg/hr | 5.3 | 6.1 | 7.0 | 7.8 | 8.7 | 9.6 | 10.5 |
| Compressor discharge temperature | ° C. | 130.0 | 130.0 | 130.0 | 130.0 | 130.0 | 130.0 | 130.0 |
| Evaporator glide (out-in) | K | 5.1 | 5.3 | 5.3 | 5.1 | 4.8 | 4.2 | 3.5 |
| Compressor suction pressure | bar | 1.25 | 1.34 | 1.44 | 1.54 | 1.64 | 1.75 | 1.85 |
| Compressor discharge pressure | bar | 15.0 | 15.9 | 16.7 | 17.5 | 18.2 | 19.0 | 19.7 |
| Condenser glide (in-out) | K | 7.7 | 7.6 | 7.2 | 6.7 | 6.0 | 5.3 | 4.6 |

TABLE 116

Theoretical Performance Data of Selected R-32/R-125/R-161/R-1234ze(E) blends containing 16-40% R-32, 20% R-125 and 10% R-161

| | | Composition R-32/R-125/R-161/R-1234ze(E) % by weight | | | | | | |
|---|---|---|---|---|---|---|---|---|
| | | 16/20/10/54 | 20/20/10/50 | 24/20/10/46 | 28/20/10/42 | 32/20/10/38 | 36/20/10/34 | 40/20/10/30 |
| COP | | 1.27 | 1.27 | 1.27 | 1.27 | 1.27 | 1.26 | 1.26 |
| COP relative to Reference | | 106.1% | 106.1% | 106.0% | 105.7% | 105.5% | 105.1% | 104.8% |
| Achieved cooling capacity | kW | 2.06 | 2.24 | 2.41 | 2.57 | 2.73 | 2.89 | 3.04 |
| Capacity relative to reference | | 83.1% | 90.0% | 96.8% | 103.4% | 109.8% | 116.1% | 122.4% |
| Suction pressure drop relative to reference | | 72.9% | 76.8% | 80.4% | 83.8% | 86.8% | 89.7% | 92.3% |
| Pressure ratio | | 13.03 | 12.70 | 12.40 | 12.12 | 11.86 | 11.61 | 11.38 |
| Mass flow through evaporator | kg/hr | 47.9 | 50.4 | 52.7 | 54.9 | 57.0 | 58.9 | 60.8 |
| Liquid injection mass flow | kg/hr | 4.1 | 5.0 | 5.9 | 6.9 | 7.9 | 9.0 | 10.0 |
| Compressor discharge temperature | ° C. | 130.0 | 130.0 | 130.0 | 130.0 | 130.0 | 130.0 | 130.0 |
| Evaporator glide (out-in) | K | 5.7 | 6.1 | 6.3 | 6.2 | 5.9 | 5.5 | 4.9 |
| Compressor suction pressure | bar | 1.09 | 1.19 | 1.29 | 1.39 | 1.49 | 1.59 | 1.69 |
| Compressor discharge pressure | bar | 14.3 | 15.1 | 16.0 | 16.8 | 17.6 | 18.4 | 19.2 |
| Condenser glide (in-out) | K | 9.4 | 9.2 | 8.8 | 8.2 | 7.5 | 6.7 | 5.9 |

TABLE 117

Theoretical Performance Data of Selected R-32/R-125/R-161/R-1234ze(E) blends containing 16-40% R-32, 20% R-125 and 15% R-161

| | | Composition R-32/R-125/R-161/R-1234ze(E) % by weight | | | | | | |
|---|---|---|---|---|---|---|---|---|
| | | 16/20/15/49 | 20/20/15/45 | 24/20/15/41 | 28/20/15/37 | 32/20/15/33 | 36/20/15/29 | 40/20/15/25 |
| COP | | 1.28 | 1.28 | 1.28 | 1.27 | 1.27 | 1.26 | 1.26 |
| COP relative to Reference | | 106.7% | 106.6% | 106.4% | 106.1% | 105.7% | 105.4% | 105.0% |
| Achieved cooling capacity | kW | 2.17 | 2.35 | 2.52 | 2.68 | 2.84 | 3.00 | 3.16 |
| Capacity relative to reference | | 87.5% | 94.4% | 101.2% | 107.8% | 114.3% | 120.6% | 127.0% |
| Suction pressure drop relative to reference | | 73.4% | 77.2% | 80.7% | 84.0% | 87.1% | 89.9% | 92.7% |
| Pressure ratio | | 12.71 | 12.41 | 12.12 | 11.86 | 11.60 | 11.37 | 11.14 |
| Mass flow through evaporator | kg/hr | 48.0 | 50.4 | 52.7 | 54.9 | 57.0 | 58.9 | 60.8 |
| Liquid injection mass flow | kg/hr | 4.5 | 5.4 | 6.3 | 7.3 | 8.3 | 9.3 | 10.3 |
| Compressor discharge temperature | °C. | 130.0 | 130.0 | 130.0 | 130.0 | 130.0 | 130.0 | 130.0 |
| Evaporator glide (out-in) | K | 5.7 | 6.0 | 6.1 | 5.9 | 5.6 | 5.1 | 4.5 |
| Compressor suction pressure | bar | 1.15 | 1.25 | 1.35 | 1.45 | 1.55 | 1.65 | 1.75 |
| Compressor discharge pressure | bar | 14.6 | 15.5 | 16.3 | 17.1 | 17.9 | 18.7 | 19.5 |
| Condenser glide (in-out) | K | 8.9 | 8.7 | 8.3 | 7.6 | 6.9 | 6.2 | 5.3 |

TABLE 118

Theoretical Performance Data of Selected R-32/R-125/R-161/R-1234ze(E) blends containing 16-40% R-32, 20% R-125 and 20% R-161

| | | Composition R-32/R-125/R-161/R-1234ze(E) % by weight | | | | | | |
|---|---|---|---|---|---|---|---|---|
| | | 16/20/20/44 | 20/20/20/40 | 24/20/20/36 | 28/20/20/32 | 32/20/20/28 | 36/20/20/24 | 40/20/20/20 |
| COP | | 1.29 | 1.28 | 1.28 | 1.28 | 1.27 | 1.27 | 1.26 |
| COP relative to Reference | | 107.2% | 107.0% | 106.7% | 106.4% | 106.0% | 105.6% | 105.2% |
| Achieved cooling capacity | kW | 2.28 | 2.45 | 2.62 | 2.78 | 2.95 | 3.11 | 3.26 |
| Capacity relative to reference | | 91.7% | 98.6% | 105.4% | 112.0% | 118.5% | 124.9% | 131.3% |
| Suction pressure drop relative to reference | | 73.7% | 77.4% | 80.9% | 84.2% | 87.2% | 90.1% | 92.9% |
| Pressure ratio | | 12.42 | 12.14 | 11.86 | 11.61 | 11.37 | 11.14 | 10.91 |
| Mass flow through evaporator | kg/hr | 48.0 | 50.4 | 52.7 | 54.8 | 56.9 | 58.8 | 60.7 |
| Liquid injection mass flow | kg/hr | 4.9 | 5.8 | 6.7 | 7.6 | 8.6 | 9.6 | 10.6 |
| Compressor discharge temperature | °C. | 130.0 | 130.0 | 130.0 | 130.0 | 130.0 | 130.0 | 130.0 |
| Evaporator glide (out-in) | K | 5.5 | 5.7 | 5.7 | 5.5 | 5.1 | 4.6 | 3.9 |
| Compressor suction pressure | bar | 1.20 | 1.30 | 1.40 | 1.50 | 1.60 | 1.71 | 1.81 |
| Compressor discharge pressure | bar | 14.9 | 15.8 | 16.6 | 17.4 | 18.2 | 19.0 | 19.8 |
| Condenser glide (in-out) | K | 8.4 | 8.2 | 7.7 | 7.1 | 6.4 | 5.6 | 4.8 |

TABLE 119

Theoretical Performance Data of Selected R-32/R-125/R-161/R-1234ze(E) blends containing 16-40% R-32, 20% R-125 and 25% R-161

| | | Composition R-32/R-125/R-161/R-1234ze(E) % by weight | | | | | | |
|---|---|---|---|---|---|---|---|---|
| | | 16/20/25/39 | 20/20/25/35 | 24/20/25/31 | 28/20/25/27 | 32/20/25/23 | 36/20/25/19 | 40/20/25/15 |
| COP | | 1.29 | 1.29 | 1.28 | 1.28 | 1.27 | 1.27 | 1.26 |
| COP relative to Reference | | 107.5% | 107.3% | 107.0% | 106.6% | 106.2% | 105.8% | 105.4% |
| Achieved cooling capacity | kW | 2.38 | 2.55 | 2.72 | 2.88 | 3.05 | 3.21 | 3.37 |
| Capacity relative to reference | | 95.7% | 102.6% | 109.4% | 116.0% | 122.6% | 129.1% | 135.6% |
| Suction pressure drop relative to reference | | 74.0% | 77.6% | 81.0% | 84.2% | 87.3% | 90.2% | 93.1% |
| Pressure ratio | | 12.15 | 11.88 | 11.62 | 11.37 | 11.14 | 10.91 | 10.69 |
| Mass flow through evaporator | kg/hr | 48.0 | 50.3 | 52.6 | 54.7 | 56.7 | 58.7 | 60.6 |
| Liquid injection mass flow | kg/hr | 5.3 | 6.1 | 7.0 | 7.9 | 8.9 | 9.8 | 10.8 |
| Compressor discharge temperature | °C. | 130.0 | 130.0 | 130.0 | 130.0 | 130.0 | 130.0 | 130.0 |
| Evaporator glide (out-in) | K | 5.2 | 5.4 | 5.3 | 5.1 | 4.6 | 4.0 | 3.3 |
| Compressor suction pressure | bar | 1.25 | 1.35 | 1.45 | 1.56 | 1.66 | 1.77 | 1.87 |
| Compressor discharge pressure | bar | 15.2 | 16.1 | 16.9 | 17.7 | 18.5 | 19.3 | 20.0 |
| Condenser glide (in-out) | K | 7.8 | 7.6 | 7.1 | 6.5 | 5.8 | 5.1 | 4.3 |

TABLE 120

Theoretical Performance Data of Selected R-32/R-125/R-161/R-1234ze(E) blends containing 16-40% R-32, 20% R-125 and 30% R-161

| | | Composition R-32/R-125/R-161/R-1234ze(E) % by weight | | | | | | |
|---|---|---|---|---|---|---|---|---|
| | | 16/20/30/34 | 20/20/30/30 | 24/20/30/26 | 28/20/30/22 | 32/20/30/18 | 36/20/30/14 | 40/20/30/10 |
| COP | | 1.29 | 1.29 | 1.29 | 1.28 | 1.28 | 1.27 | 1.27 |
| COP relative to Reference | | 107.9% | 107.6% | 107.3% | 106.9% | 106.5% | 106.1% | 105.7% |
| Achieved cooling capacity | kW | 2.47 | 2.65 | 2.81 | 2.98 | 3.14 | 3.31 | 3.47 |
| Capacity relative to reference | | 99.5% | 106.4% | 113.2% | 119.9% | 126.5% | 133.1% | 139.7% |
| Suction pressure drop relative to reference | | 74.1% | 77.6% | 81.0% | 84.2% | 87.3% | 90.3% | 93.2% |
| Pressure ratio | | 11.90 | 11.64 | 11.39 | 11.15 | 10.92 | 10.70 | 10.48 |
| Mass flow through evaporator | kg/hr | 47.9 | 50.2 | 52.4 | 54.5 | 56.5 | 58.5 | 60.5 |
| Liquid injection mass flow | kg/hr | 5.6 | 6.4 | 7.3 | 8.2 | 9.1 | 10.0 | 11.0 |
| Compressor discharge temperature | °C. | 130.0 | 130.0 | 130.0 | 130.0 | 130.0 | 130.0 | 130.0 |
| Evaporator glide (out-in) | K | 4.9 | 5.0 | 4.8 | 4.5 | 4.0 | 3.4 | 2.6 |
| Compressor suction pressure | bar | 1.30 | 1.40 | 1.51 | 1.61 | 1.72 | 1.82 | 1.93 |
| Compressor discharge pressure | bar | 15.5 | 16.3 | 17.2 | 18.0 | 18.7 | 19.5 | 20.2 |
| Condenser glide (in-out) | K | 7.3 | 7.0 | 6.6 | 6.0 | 5.3 | 4.6 | 3.8 |

TABLE 121

Theoretical Performance Data of Selected R-32/R-125/R-161/R-1234ze(E) blends containing 16-40% R-32, 25% R-125 and 10% R-161

| | | Composition R-32/R-125/R-161/R-1234ze(E) % by weight | | | | | | |
|---|---|---|---|---|---|---|---|---|
| | | 16/25/10/49 | 20/25/10/45 | 24/25/10/41 | 28/25/10/37 | 32/25/10/33 | 36/25/10/29 | 40/25/10/25 |
| COP | | 1.26 | 1.26 | 1.26 | 1.26 | 1.25 | 1.25 | 1.25 |
| COP relative to Reference | | 105.2% | 105.2% | 105.0% | 104.7% | 104.4% | 104.1% | 103.8% |
| Achieved cooling capacity | kW | 2.15 | 2.32 | 2.49 | 2.66 | 2.82 | 2.98 | 3.14 |
| Capacity relative to reference | | 86.4% | 93.4% | 100.2% | 106.9% | 113.5% | 120.0% | 126.4% |
| Suction pressure drop relative to reference | | 77.5% | 81.5% | 85.2% | 88.6% | 91.8% | 94.7% | 97.5% |
| Pressure ratio | | 12.86 | 12.54 | 12.24 | 11.96 | 11.70 | 11.45 | 11.22 |
| Mass flow through evaporator | kg/hr | 50.6 | 53.2 | 55.6 | 57.9 | 60.0 | 62.0 | 64.0 |
| Liquid injection mass flow | kg/hr | 4.3 | 5.3 | 6.3 | 7.3 | 8.4 | 9.4 | 10.5 |
| Compressor discharge temperature | °C. | 130.0 | 130.0 | 130.0 | 130.0 | 130.0 | 130.0 | 130.0 |
| Evaporator glide (out-in) | K | 5.7 | 5.9 | 5.9 | 5.7 | 5.3 | 4.8 | 4.2 |
| Compressor suction pressure | bar | 1.15 | 1.25 | 1.35 | 1.45 | 1.55 | 1.66 | 1.76 |
| Compressor discharge pressure | bar | 14.8 | 15.7 | 16.5 | 17.4 | 18.2 | 19.0 | 19.8 |
| Condenser glide (in-out) | K | 9.0 | 8.7 | 8.2 | 7.5 | 6.7 | 5.9 | 5.1 |

TABLE 122

Theoretical Performance Data of Selected R-32/R-125/R-161/R-1234ze(E) blends containing 16-40% R-32, 25% R-125 and 15% R-161

| | | Composition R-32/R-125/R-161/R-1234ze(E) % by weight | | | | | | |
|---|---|---|---|---|---|---|---|---|
| | | 16/25/15/44 | 20/25/15/40 | 24/25/15/36 | 28/25/15/32 | 32/25/15/28 | 36/25/15/24 | 40/25/15/20 |
| COP | | 1.27 | 1.27 | 1.26 | 1.26 | 1.26 | 1.25 | 1.25 |
| COP relative to Reference | | 105.8% | 105.7% | 105.4% | 105.1% | 104.7% | 104.4% | 104.0% |
| Achieved cooling capacity | kW | 2.26 | 2.43 | 2.60 | 2.77 | 2.93 | 3.10 | 3.26 |
| Capacity relative to reference | | 90.8% | 97.9% | 104.7% | 111.5% | 118.1% | 124.6% | 131.2% |
| Suction pressure drop relative to reference | | 77.9% | 81.8% | 85.4% | 88.8% | 92.0% | 95.0% | 97.9% |
| Pressure ratio | | 12.55 | 12.25 | 11.97 | 11.70 | 11.45 | 11.21 | 10.98 |
| Mass flow through evaporator | kg/hr | 50.6 | 53.2 | 55.6 | 57.8 | 59.9 | 62.0 | 64.0 |
| Liquid injection mass flow | kg/hr | 4.8 | 5.7 | 6.7 | 7.7 | 8.7 | 9.8 | 10.8 |
| Compressor discharge temperature | °C. | 130.0 | 130.0 | 130.0 | 130.0 | 130.0 | 130.0 | 130.0 |
| Evaporator glide (out-in) | K | 5.5 | 5.7 | 5.7 | 5.4 | 4.9 | 4.4 | 3.6 |
| Compressor suction pressure | bar | 1.20 | 1.31 | 1.41 | 1.51 | 1.62 | 1.72 | 1.83 |
| Compressor discharge pressure | bar | 15.1 | 16.0 | 16.9 | 17.7 | 18.5 | 19.3 | 20.1 |
| Condenser glide (in-out) | K | 8.5 | 8.1 | 7.6 | 6.9 | 6.2 | 5.4 | 4.6 |

TABLE 123

Theoretical Performance Data of Selected R-32/R-125/R-161/R-1234ze(E) blends containing 16-40% R-32, 25% R-125 and 20% R-161

| | | Composition R-32/R-125/R-161/R-1234ze(E) % by weight | | | | | | |
|---|---|---|---|---|---|---|---|---|
| | | 16/25/20/39 | 20/25/20/35 | 24/25/20/31 | 28/25/20/27 | 32/25/20/23 | 36/25/20/19 | 40/25/20/15 |
| COP | | 1.28 | 1.27 | 1.27 | 1.26 | 1.26 | 1.26 | 1.25 |
| COP relative to Reference | | 106.3% | 106.1% | 105.8% | 105.4% | 105.0% | 104.6% | 104.3% |
| Achieved cooling capacity | kW | 2.36 | 2.54 | 2.71 | 2.88 | 3.04 | 3.21 | 3.37 |
| Capacity relative to reference | | 95.1% | 102.1% | 109.0% | 115.8% | 122.4% | 129.1% | 135.7% |
| Suction pressure drop relative to reference | | 78.1% | 81.9% | 85.5% | 88.9% | 92.1% | 95.2% | 98.2% |
| Pressure ratio | | 12.26 | 11.98 | 11.71 | 11.45 | 11.21 | 10.97 | 10.75 |
| Mass flow through evaporator | kg/hr | 50.6 | 53.1 | 55.4 | 57.7 | 59.8 | 61.9 | 63.9 |
| Liquid injection mass flow | kg/hr | 5.2 | 6.1 | 7.1 | 8.0 | 9.1 | 10.1 | 11.1 |
| Compressor discharge temperature | °C. | 130.0 | 130.0 | 130.0 | 130.0 | 130.0 | 130.0 | 130.0 |
| Evaporator glide (out-in) | K | 5.3 | 5.4 | 5.3 | 4.9 | 4.4 | 3.8 | 3.0 |
| Compressor suction pressure | bar | 1.26 | 1.36 | 1.47 | 1.57 | 1.68 | 1.79 | 1.89 |
| Compressor discharge pressure | bar | 15.4 | 16.3 | 17.2 | 18.0 | 18.8 | 19.6 | 20.4 |
| Condenser glide (in-out) | K | 7.9 | 7.6 | 7.0 | 6.4 | 5.6 | 4.8 | 4.0 |

TABLE 124

Theoretical Performance Data of Selected R-32/R-125/R-161/R-1234ze(E) blends containing 16-40% R-32, 25% R-125 and 25% R-161

| | | Composition R-32/R-125/R-161/R-1234ze(E) % by weight | | | | | | |
|---|---|---|---|---|---|---|---|---|
| | | 16/25/25/34 | 20/25/25/30 | 24/25/25/26 | 28/25/25/22 | 32/25/25/18 | 36/25/25/14 | 40/25/25/10 |
| COP | | 1.28 | 1.28 | 1.27 | 1.27 | 1.26 | 1.26 | 1.25 |
| COP relative to Reference | | 106.7% | 106.4% | 106.1% | 105.7% | 105.3% | 104.9% | 104.6% |
| Achieved cooling capacity | kW | 2.46 | 2.64 | 2.81 | 2.98 | 3.15 | 3.31 | 3.48 |
| Capacity relative to reference | | 99.1% | 106.2% | 113.1% | 119.9% | 126.6% | 133.4% | 140.1% |
| Suction pressure drop relative to reference | | 78.3% | 82.0% | 85.5% | 88.9% | 92.2% | 95.3% | 98.4% |
| Pressure ratio | | 11.99 | 11.72 | 11.46 | 11.22 | 10.98 | 10.75 | 10.52 |
| Mass flow through evaporator | kg/hr | 50.5 | 53.0 | 55.3 | 57.5 | 59.6 | 61.7 | 63.8 |
| Liquid injection mass flow | kg/hr | 5.5 | 6.4 | 7.4 | 8.3 | 9.3 | 10.3 | 11.3 |
| Compressor discharge temperature | °C. | 130.0 | 130.0 | 130.0 | 130.0 | 130.0 | 130.0 | 130.0 |
| Evaporator glide (out-in) | K | 4.9 | 5.0 | 4.8 | 4.4 | 3.9 | 3.2 | 2.4 |
| Compressor suction pressure | bar | 1.31 | 1.41 | 1.52 | 1.63 | 1.73 | 1.85 | 1.96 |
| Compressor discharge pressure | bar | 15.7 | 16.6 | 17.4 | 18.2 | 19.0 | 19.8 | 20.6 |
| Condenser glide (in-out) | K | 7.3 | 7.0 | 6.5 | 5.8 | 5.1 | 4.3 | 3.5 |

I claim:

1. A heat transfer composition comprising:
   (i) from about 5% to about 65% by weight trans-1,3,3,3-tetrafluoropropene (R-1234ze(E));
   (ii) from about 15% to about 50% by weight of difluoromethane (R-32);
   (iii) from about 10% to about 25% by weight pentafluoroethane (R-125), and
   (iv) from about 10% to about 40% by weight 1,1,1,2-tetrafluoroethane (R-134a); and,
   (v) optionally, fluoroethane (R-161), 1,1-difluoroethane (R-152a) and mixtures thereof.

2. A composition according to claim 1, comprising from about 5% to about 50% by weight of R-1234ze(E).

3. A composition according to claim 1, comprising from about 15% to about 40% by weight of R-32.

4. A composition according to claim 1, comprising from about 25% to about 60% by weight of the combined amount of R-125 and R-134a.

5. A composition according to claim 1, further comprising R-161.

6. A composition according to claim 1, comprising R-1234ze(E), R-32, R-134a and R-125.

7. A composition according to claim 1, comprising from about 10 to about 50% by weight R-1234ze(E), from about 20 to about 50% by weight R-32, from about 10 to about 25% by weight R-125, and from about 10 to about 25% by weight R-134a.

8. A composition according to claim 1, comprising from about 5 to about 65% by weight R-1234ze(E), from about 15 to about 40% by weight R-32, from about 10 to about 30% by weight R-134a, and from about 10 to about 25% by weight R-125.

9. A composition according to claim 8, comprising from about 5 to about 40% by weight R-1234ze(E), from about 20 to about 40% by weight R-32, from about 10 to about 25% by weight R-134a, and from about 10 to about 25% by weight R-125.

10. A composition according to claim 1, wherein the composition has a GWP of less than 1500.

11. A composition according to claim 1, wherein the temperature glide is less than about 10k.

12. A composition according to claim 1, wherein the composition has a volumetric refrigeration capacity within about 15% of a refrigerant selected from the group consisting of R-22, R404A, R-407A, R-407B, R-407C, R-407D, R-407F, R-410A and R507.

13. A composition according to claim 1, wherein the composition is less flammable than R-32 alone.

14. A composition according to claim 13, wherein the composition has:
   (a) a higher flammable limit;
   (b) a higher ignition energy; and/or
   (c) a lower flame velocity compared to R-32 alone.

15. A composition according to claim 1, wherein the composition has a cycle efficiency within about 10% of the existing refrigerant that it is intended to replace, the existing refrigerant selected from the group consisting of R-22, R404A, R-407A, R-407B, R-407C, R-407D, R-407F, R-410A and R507.

16. A composition according to claim 1, wherein the composition has a compressor discharge temperature within about 15K of a refrigerant selected from the group consisting of R-22, R404A, R-407A, R-407B, R-407C, R-407D, R-407F, R-410A and R507.

17. A composition according to claim 1, consisting essentially of R-1234ze(E), R-32, R-134a and R-125.

18. A composition according to claim 1, comprising a quaternary refrigerant composition.

19. A composition according to claim 1, wherein the composition has a volumetric refrigeration capacity within 10% of a refrigerant selected from the group consisting of R-22, R404A, R-407A, R-407B, R-407C, and R-410A.

* * * * *

UNITED STATES PATENT AND TRADEMARK OFFICE
CERTIFICATE OF CORRECTION

| | | |
|---|---|---|
| PATENT NO. | : 11,760,911 B2 | Page 1 of 1 |
| APPLICATION NO. | : 17/094434 | |
| DATED | : September 19, 2023 | |
| INVENTOR(S) | : Robert E. Low | |

It is certified that error appears in the above-identified patent and that said Letters Patent is hereby corrected as shown below:

In the Specification

Column 1, Line 21, delete "neat" and insert in its place --heat--.

Column 1, Line 24, delete "R15sa," and insert in its place --R-152a,--.

Column 2, Line 25, delete "Flow ever" and insert in its place --However--.

Column 2, Lines 48 and 51, delete "heart" and insert in its place --heat--.

Column 3, Line 53, delete "sire" and insert in its place --are--.

Column 7, Line 12, delete "resist" and insert in its place --least--.

Column 9, Line 35, delete "neat" and insert in its place --heat--.

Column 9, Line 45, delete "am" and insert in its place --an--.

Column 9, Line 46, delete "heart" and insert in its place --heat--.

Column 15, Lines 66 and 67, delete "GWF" and insert in its place --GWP--.

Column 16, Line 9, delete "RFC" and insert in its place --HFC--.

Table 6, title heading for columns starting with "Composition", delete "weigh" and insert in its place --weight--.

Signed and Sealed this
Fourteenth Day of November, 2023

Katherine Kelly Vidal
*Director of the United States Patent and Trademark Office*